(12) United States Patent
Harel et al.

(10) Patent No.: US 9,001,320 B2
(45) Date of Patent: Apr. 7, 2015

(54) REAL-TIME MAPPING OF ELECTRONIC STRUCTURE WITH SINGLE-SHOT TWO-DIMENSIONAL ELECTRONIC SPECTROSCOPY

(75) Inventors: Elad Harel, Chicago, IL (US); Gregory S. Engel, Flossmoor, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 13/814,427

(22) PCT Filed: Aug. 16, 2011

(86) PCT No.: PCT/US2011/048001
§ 371 (c)(1),
(2), (4) Date: May 15, 2013

(87) PCT Pub. No.: WO2012/024347
PCT Pub. Date: Feb. 23, 2012

(65) Prior Publication Data
US 2013/0222801 A1    Aug. 29, 2013

Related U.S. Application Data

(60) Provisional application No. 61/401,610, filed on Aug. 16, 2010.

(51) Int. Cl.
| | |
|---|---|
| *G01J 3/00* | (2006.01) |
| *G01N 21/00* | (2006.01) |
| *G01J 3/40* | (2006.01) |
| *G01J 3/453* | (2006.01) |
| *G01J 3/10* | (2006.01) |
| *G01J 3/447* | (2006.01) |

(52) U.S. Cl.
CPC .. *G01J 3/40* (2013.01); *G01J 3/453* (2013.01); *G01J 3/10* (2013.01); *G01J 3/447* (2013.01)

(58) Field of Classification Search
USPC ................................. 356/300–334
See application file for complete search history.

(56) References Cited

U.S. PATENT DOCUMENTS

| | | |
|---|---|---|
| 7,760,342 B2 | 7/2010 | Zanni et al. |
| 7,771,938 B2 | 8/2010 | Zanni et al. |

(Continued)

FOREIGN PATENT DOCUMENTS

| | | | |
|---|---|---|---|
| WO | WO-2009-147425 A1 | 12/2009 | |
| WO | WO 2009143957 A1 | * 12/2009 | |

OTHER PUBLICATIONS

International search report from Application No. PCT/US2011/048001 dated Dec. 12, 2011.

(Continued)

*Primary Examiner* — Tri T Ton
*Assistant Examiner* — Willie Merrell, II
(74) *Attorney, Agent, or Firm* — Marshall, Gerstein & Borun LLP

(57) ABSTRACT

A technique for forming a two-dimensional electronic spectrum of a sample includes illuminating a line within a portion of the sample with four laser pulses; where along the entire line the difference in the arrival times between two of the laser pulses varies as a function of the position and the difference in the arrival times between the other two pulses is constant along the entire line. A spectroscopic analysis may then be performed on the resulting pulsed output signal from the illuminated line to produce a single-shot two dimensional electronic spectroscopy.

11 Claims, 34 Drawing Sheets

(56) References Cited

U.S. PATENT DOCUMENTS

| | | | |
|---|---|---|---|
| 8,526,002 | B2 | 9/2013 | DeFlores et al. |
| 2003/0025911 | A1* | 2/2003 | Walmsley et al. ............ 356/450 |
| 2006/0192969 | A1* | 8/2006 | Marks et al. .................. 356/451 |
| 2006/0243890 | A1 | 11/2006 | Bock |
| 2007/0152154 | A1* | 7/2007 | DeCamp et al. ......... 250/339.07 |
| 2009/0161092 | A1* | 6/2009 | Zanni et al. ..................... 356/51 |
| 2010/0041987 | A1 | 2/2010 | Manohar et al. |
| 2010/0171952 | A1 | 7/2010 | DeFlores et al. |
| 2011/0141467 | A1* | 6/2011 | Brixner et al. ................ 356/323 |
| 2013/0141606 | A1 | 6/2013 | Shimizu |

OTHER PUBLICATIONS

International Preliminary Report on Patentability from Application No. PCT/US2011/048001 dated Feb. 28, 2013.

Brixner, et al., "Phase-stabilized Two-Dimensional Electronic Spectroscopy," *J. Chem. Phys.* 121:4221-4236 (2004).

Caruso, et al., "Highly Efficient Energy Excitation Transfer in Light-Harvesting Complexes: The Fundamental Role of Noise-Assisted Transport," *Journal of Chemical Physics* 131, 105106-1-105106-15 (2009).

DeCamp, et al. "Single-shot two-dimensional infrared spectroscopy," *Optics Express* 15, 233-241 (2007).

Dorrer, et al. "Spectral resolution and sampling issues in Fourier-transform spectral interferometry," *Journal of the Optical Society of America B-Optical Physics*, 17:1795-1802 (2000).

Frydman, et al., "The acquisition of multidimensional NMR spectra within a single scan," *PNAS*, 99:15858-15862 (2002).

Hayes, et al., "Extracting the Excitonic Hamiltonian of the Fenna-Matthews-Olson Complex Using Three-Dimensional Third-Order Electronic Spectroscopy," *Biophysical Journal*, 100(8), 2043-2052 (2011).

Hybl, et al., "Two-Dimensional Fourier Transform Electronic Spectroscopy," *Journal of Chemical Physics*, 115(14), 6606-6622 (2001).

Jang, et al., "Single complex line shapes of the B850 band of LH2," *Journal of Chemical Physics* 118(20), 9324-9336 (2003).

Joffre, et al., "Linear techniques of phase measurement by femtosecond spectral interferometry for applications in spectroscopy," *J Opt Soc Am B* 12(12), 2467-2474 (1995).

Krueger, et al., "Electronic Excitation Transfer from Carotenoid to Bacteriochlorophyll in the Purple Bacterium *Rhodopseudomonas acidophila*," *J. Phys. Chem. B* 102(12), 2284-2292 (1998).

Mercer, et al., "Instantaneous Mapping of Coherently Coupled Electronic Transitions and Energy Transfers in a Photosynthetic Complex Using Angle-Resolved Coherent Optical Wave-Mixing," *Phys. Rev. Lett.* 102(5), 057402-1-057402-4 (2009).

Mishkovsky, et al., "Principles and Prograss in Ultrafast Multidimensional Nuclear Magnetic Resonance," Ann Rev Phys Chem, 60:429-448 (2009).

Poulin, et al., "Irreversible Organic Crystalline Chemistry Monitored in Real Time," *Science* 313, 1756-1760 (2006).

Silbey et al., "Optimization of Exciton Trapping in Energy Transfer Processes," *Journal of Physical Chemistry A* 113(50):13825-13838 (2009).

Stehling, et al., "Echo-Planar Imaging: Magnetic Resonance Imaging in a Fraction of a Second," *Science*, 254(5028):43-50 (1991).

Zunger, et al., "The Excitonic Exchange Splitting and Radiative Lifetime in PbSe Quantum Dots," *Nano Lett* 7(7):2129-2135 (2007).

* cited by examiner

A.

B.

A.

B.

$\omega_t$ (rad/fs)

Upper left cross-peak beating - electronic versus vibrational coherence:

REAL-TIME MAPPING OF ELECTRONIC STRUCTURE WITH SINGLE-SHOT TWO-DIMENSIONAL ELECTRONIC SPECTROSCOPY

CROSS-REFERENCE TO RELATED APPLICATION

The present disclosure claims the benefit of the U.S. Provisional Patent Application No. 61/401,610, filed on Aug. 16, 2010, the entire disclosure of which is incorporated herein by reference.

STATEMENT REGARDING FEDERALLY SPONSORED RESEARCH OR DEVELOPMENT

This invention was made with government support under grant numbers DMR 08-00254 and DMR 08-44115 awarded by the National Science Foundation (NSF) and grant number FA9550-09-0117 awarded by the Air Force Office of Scientific Research (AFOSR). The government has certain rights in the invention.

FIELD OF THE INVENTION

The present application generally relates to techniques for optical spectroscopy and, more particularly, to single laser-shot two-dimensional spectroscopic mapping techniques.

BACKGROUND

The electronic structure of a material and the dynamics within that material determine the properties and behavior of the material. Relatively mature processes, such as spectroscopic and other imaging techniques, are often used to measure the structure of a material. Measuring material dynamics, however, can be more challenging. This is in part because, to measure dynamics, the necessary timescales typically range from attoseconds to milliseconds. This range is vast and requires very specialized equipment, and even then the techniques are limited. Two-dimensional (2D) optical spectroscopy, for example, has been used to probe fast spatiotemporal electronic dynamics in complex multichromophoric systems. However, acquiring the desired spectra requires long point-by-point acquisitions that preclude observations on the millisecond and microsecond timescales.

SUMMARY OF THE INVENTION

The present disclosure provides techniques for imaging temporally encoded information within a homogeneous sample by mapping the evolution of the electronic Hamiltonian with femtosecond temporal resolution in a single laser-shot. The result is the first real-time mapping of electronic coupling within a sample. The techniques, termed herein GRadient-Assisted Photon Echo spectroscopy (GRAPE), largely eliminate phase errors deleterious to Fourier-based spectroscopic techniques, while reducing the acquisition time by orders of magnitude using only conventional optical components.

For explanation purposes only, the GRAPE spectroscopy techniques described herein take advantage of spatial encoding to construct electronic correlation maps, in a loosely similar manner to that of magnetic resonance imaging (MRI) in which magnetic field gradients are used to create spatial correlation maps. Unlike magnetic resonance, however, this spatial encoding of a nonlinear polarization along the excitation frequency axis of the 2D spectrum results in no loss in signal while simultaneously reducing overall noise. The techniques can thus provide substantial advantages over existing imaging techniques and allow for assessment of electronic structure in many different fields of study. For example, these present techniques can correlate energy transfer events and electronic coupling that occur in the tens of femtoseconds with much slower dynamics that occur on the sub-second timescale. This allows for the study of material structure and dynamics in photobiology and solar energy research, among others, and allows for, for example, improved nonlinear spectroscopy and optoelectronic device characterization. The techniques are useful in rapid chemical analysis of biomolecules for drug discovery, assaying, etc.

These techniques can replace current ultraviolet-visible (UV/Vis) spectrometers. UV/Vis spectrometers give you only a linear spectrum to characterize a sample. However, the present techniques may provide two-dimensional (2D) spectral data (static spectra) and a three-dimensional (3D) spectral data (static spectra plus dynamics). The additional dimensions of resolution remove ambiguities associated with current UV/Vis linear methods. Further, the present techniques are able to perform full 3D characterizations in the same amount of time or faster than linear UV/Vis spectrometers.

In an example, a method for performing a spectroscopic analysis on a sample using a single incident laser pulse comprises: converting the incident laser pulse into a plurality of laser pulses that each are made to generally propagate along a direction of propagation incident upon the sample, wherein the plurality of laser pulses includes the incident laser pulse; tilting the wavefronts of at least some of the plurality of laser pulses relative to the incident laser pulse and to at least one of the plurality of laser pulses; focusing the incident laser pulse and the plurality of laser pulses onto a sampling region of the sample; and performing a spectroscopic analysis of a resulting pulsed output signal from the sampling region.

In some examples, converting the incident laser pulse comprises coupling the incident laser pulse to a beam splitting mirror element for converting the incident laser pulse into four laser pulses, including the incident laser pulse. In some examples, the beam splitting mirror element is a set of wedges, which may be coated to increase the power of the reflected beams.

In some examples, converting the incident laser pulse comprises coupling the incident laser pulse to an acousto-optic modulator or spatial light modulator for converting the incident laser pulse into four laser pulses, including the incident laser pulse.

In some examples, converting the incident laser pulse comprises forming a first laser pulse, a second laser pulse, and a third laser pulse, and wherein tilting the wavefronts comprises tilting the incident laser pulse and the third laser pulse in opposite directions relative to the first laser pulse and the second laser pulse, wherein the first laser pulse and the second laser pulse have substantially parallel wavefronts.

In some of these examples, the method further includes focusing the incident laser pulse, the first laser pulse, the second laser pulse, and the third laser pulse onto a line in the sample region, wherein the line has a coherence time defined by the relative tilting of the wavefronts on the plurality of laser pulses. In some examples, any of the incident laser pulses may be focused onto a line in the sample region using a cylindrical lens or a cylinder mirror. The line may be longer than 1 mm, 2 mm, and 3 mm, in different examples. A cylinder mirror may be selected to optimize the bandwidth for a particular application, for example, to broaden the bandwidth.

In some examples, the coherence time is less than 10 picoseconds. In some of these examples, the coherence time is between about 100 to about 300 femtoseconds. In general, the coherence time is limited to a particular time range.

In some examples, the formed line extends within the sample and is substantially perpendicular to the direction of propagation.

In some examples, the method comprises imaging the pulsed output signal onto a two-dimensional photodetector of a spectrometer. In some examples, the two-dimensional photodetector of a spectrometer may be a fast camera.

In some examples, the method includes, in response to imaging the pulsed output signal onto the two-dimensional photodetector, converting data from the photodetector into a two-dimensional frequency spectra indicating a physical attribute of the sample over the sampling region.

In various examples, the physical attribute can be any of the following or a combination thereof: an electron state energy transfer event; a Stokes shift energy transfer event; a vibrational state shift in the ground or excited electronic states; inhomogeneous broadening within the sample; and homogenous linewidth of a molecule within the sample.

In some examples, the physical attribute demonstrates coupling between different chromophores forming the sample.

In yet some examples, the method further includes: performing the spectroscopic analysis of the resulting pulsed output signal at different times; in response to imaging the pulsed output signal onto the two-dimensional photodetector, converting data from the photodetector at the different times into two-dimensional frequency spectra; and comparing the two-dimensional frequency spectra at the different times to determine a dynamic attribute of the sample over the sampling region.

The dynamic attribute may be a relaxation effect and/or a memory effect. The dynamic attribute may be quantum beating, energy transfer, or absorption and emission spectra differences.

The dynamic attributes can provide information on relaxation effects, e.g., changes in the populations of each state during a delay, or relaxation to different states. Quantum beating may allow for efficient energy transfer in biological systems (e.g. photosynthetic complexes). By measuring 'memory' effects, the techniques could determine if a molecule that oscillates at one frequency 'remembers' its transition energy a certain amount of time later or if that information lost.

In some examples, a method for forming a two-dimensional electronic spectrum of a sample, includes: illuminating a line within a homogeneous portion of the sample with four laser pulses; wherein along the entire line the difference in the arrival times between the first and second laser pulses varies as a function of the position of the point on the line and the difference in the arrival times between the third and fourth laser pulses is constant along the entire line; and performing a spectroscopic analysis of a resulting pulsed output signal from the illuminated line.

In some examples, at at least one position on the line the second laser pulse arrives before the third laser pulse and wherein at at least one other position on the line the second laser pulse arrives after the third laser pulse.

In some examples, along the entire line the first laser pulse arrives before all of the second, third and fourth laser pulses.

In some examples, along the entire line the first laser pulse arrives after all of the second, third and fourth laser pulses.

In some examples, a method for forming a two-dimensional electronic spectrum of a sample, includes: illuminating a line within a homogeneous portion of the sample with four laser pulses; wherein along the entire line the interval between the arrival of the first laser pulse and the arrival of the third laser pulse varies, along the entire line the interval between the arrival of the second laser pulse and the arrival of the third laser pulse varies, and along the entire line the interval between the arrival of the third laser pulse and the arrival of the fourth laser pulse is constant; and performing a spectroscopic analysis of a resulting pulsed output signal from the illuminated line.

In some examples, along the entire line, the interval between the arrival of the first laser pulse and the arrival of the third laser pulse is greater than the interval between the arrival of the second laser pulse and the arrival of the third laser pulse.

In some examples, along the entire line, the first laser pulse arrives before the second, third and fourth laser pulses.

In some examples, along the entire line, the fourth laser pulse arrives after the first, second and third laser pulses.

In some examples, at certain points positions along the line, the second laser pulse arrives before the third laser pulse, and at other points positions along the line, the second laser pulse arrives after the third laser pulse.

In some examples, performing a spectroscopic analysis comprises filtering out the first, second and third laser pulses, and collecting and binning the pulsed output signal along the line using a grating and spectrometer.

DETAILED DESCRIPTION

Figure 1:
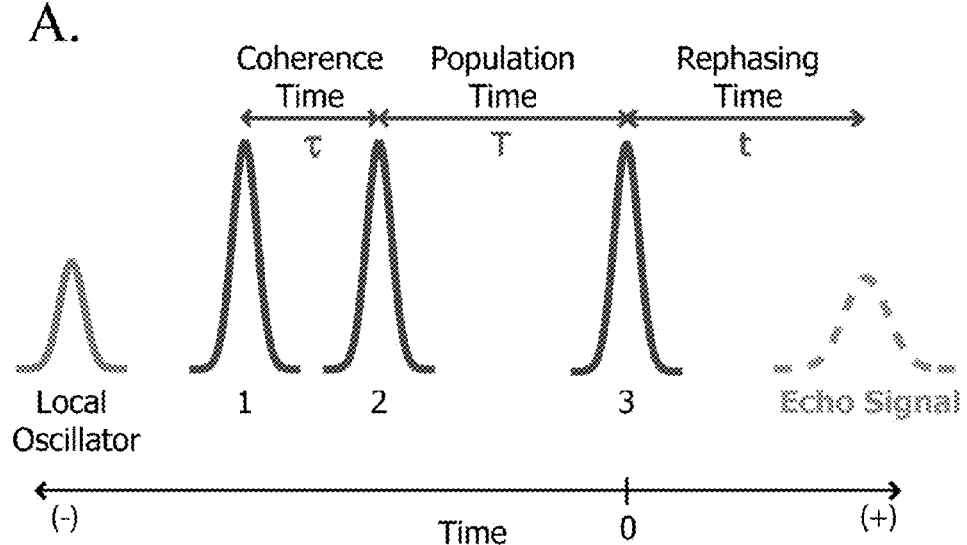
FIG. 1A illustrates a 2D photon echo pulse sequence. Pulse 1 creates a single-quantum coherence between ground and excited states of the system which evolves for a coherence time $\tau$. Pulse 2 stores the phase acquired during the coherence time as a zero-quantum coherence (i.e., population) for a waiting time, T. Pulse 3 then returns the system to a single-quantum coherence where, for inhomogeneously broadened systems, a photon echo forms after a rephasing time $t \approx \tau$. The photon echo interferes with a weak local oscillator (LO) pulse at the spectrometer to retrieve phase and amplitude information during detection.
FIG. 1B illustrates a glass wedge delay. Two anti-parallel glass wedges are used to create sub-wavelength accuracy delays between pulses 1 and 2. Movement of one wedge along a wedge angle, $\alpha$, by a distance d creates a delay of approximately $\alpha d/c$ for small angles without changing the direction of the propagating beam.
Figure 1:
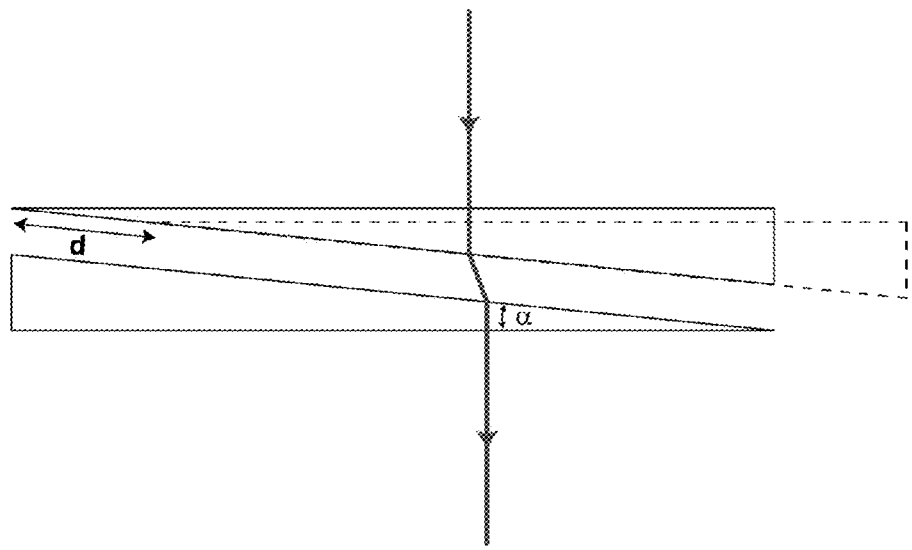

Ultrafast optical spectroscopy can elucidate sub-picosecond molecular dynamics, providing insight into vibrational and electronic structure and solute-solvent interactions in the IR and visible regions of the spectrum. Two-dimensional electronic spectroscopy directly probes correlations between electronic states providing detailed maps of energy transfer and coupling. However, as currently implemented two-dimensional spectroscopy provides no means by which to connect the initial dynamics in the first few hundred femtoseconds of electronic motion with slower dynamics associated with large structural changes.

Two-dimensional electronic spectroscopy (2D ES) maps the electronic structure of complex systems on a femtosecond timescale. While analogous to multidimensional NMR spectroscopy, 2D optical spectroscopy differs significantly in its implementation. 2D Fourier spectroscopies require point-by-point sampling of the time delay between two pulses responsible for creating quantum coherence among states. Unlike NMR, achieving the requisite phase stability at optical frequencies between these pulse pairs remains experimentally challenging. Nonetheless, 2D optical spectroscopy has been successfully demonstrated by combining passive and active phase stabilization along with precise control of optical delays and long-term temperature stability, although the widespread adoption of 2D ES has been significantly hampered by these technical challenges. Here, we exploit an analogy to magnetic resonance imaging (MRI) to demonstrate a single-shot method capable of acquiring the entire 2D spectrum in a single laser shot using only conventional optics. Unlike point-by-point sampling protocols typically used to record 2D spectra, this method, which we call GRadient-Assisted Photon Echo (GRAPE) spectroscopy, largely eliminates phase errors while reducing the acquisition time by orders of magnitude. By incorporating a spatiotemporal encoding of the nonlinear polarization along the excitation frequency axis of the 2D spectrum, GRAPE spectroscopy achieves no loss in signal while simultaneously reducing overall noise. Here, we describe the principles of GRAPE spectroscopy and discuss associated experimental considerations.

Ultrafast nonlinear spectroscopy can monitor vibrational and electronic dynamics in complex systems on a femtosecond timescale. As the complexity of the system increases, one-dimensional techniques no longer provide unambiguous assignment of energy eigenstates and their associated relaxation dynamics because couplings can only be measured indirectly. The extension of these methods to two-dimensions with 2D photon echo spectroscopy provides a direct probe of molecular structure, electronic coupling, energy transfer, and solute-solvent dynamics in the IR and visible regions of the electromagnetic spectrum. The potential of multidimensional spectroscopy in the optical regime was first recognized by Ernst during the development of two-dimensional NMR. Because of the need to record the signal as a function of two or more temporal dimensions of which only one is available for direct detection, multidimensional spectroscopy necessarily involves parametric sampling of one or more time delays. Unlike NMR where electronic gating permits near-arbitrary phase and temporal control, controlling propagating beams of light requires adjustments of optical path lengths to sub-wavelength accuracy. In the visible or UV, small errors in path length due to fluctuations in mirror positions and delay stages, index of refraction changes from eddies in the air, and temperature fluctuations in the environment all lead to phase errors which manifest themselves in the two-dimensional spectrum as increased noise and broadened linewidths. To date, successful implementation of two-dimensional optical spectroscopy has relied on either passive or active phase stabilization to limit these errors to provide a usable experimental window in which to carry out the data acquisition. GRAPE spectroscopy techniques described herein can eliminate the need for phase stabilization by acquiring the entire two-dimensional spectrum in a single laser shot with higher signal-to-noise than is achievable with point-by-point acquisition protocols currently in use.

In a departure from the existing paradigm of point-by-point Fourier sampling, the present techniques map the multidimensional spectroscopic problem onto an imaging one by trading a temporal scan for a spatial dimension. This mapping permits the acquisition of the entire two-dimensional (2D) optical spectrum using a single laser shot. Unlike other single-shot 2D methods (DeCamp, M. F., DeFlores, L. P., Jones, K. C., & Tokmakoff, A. (2007) Single-shot two-dimensional infrared spectroscopy. Optics Express 15, 233-241 and U.S. patent application Ser. No. 12/676,536 incorporated by reference herein in its entirety.), which spatially encode the optical frequencies of the pulse and hence only provide static spectra, the present GRAPE spectroscopy techniques capitalize on a temporal gradient imposed purely geometrically to encode time delays onto a spatial axis within the sample. The resultant spectrum provides an instantaneous snapshot of the electronic structure without losing the femtosecond time resolution needed to follow the electronic or vibrational dynamics of the system.

Mercer et al. (Mercer, I. P., El-Taha, Y. C., Kajumba, N., Marangos, J. P., Tisch, J. W. G., Gabrielsen, M., Cogdell, R. J., Springate, E., & Turcu, E. (2009) Instantaneous mapping of coherently coupled electronic transitions and energy transfers in a photosynthetic complex using angle-resolved coherent optical wave-mixing. Phys. Rev. Lett. 102, 4.) have utilized a type of angular encoding to resolve the transition energies involved in a particular four-wave mixing pathway in a single-laser shot. However, unlike photon echo spectroscopy, that the method described by Mercer et al. does not retain information encoded in the lineshape. So, for example, the technique is unable to distinguish inhomogeneous from homogeneous broadening. In addition, the angular encoding comes at the price of temporal smearing due to the finite crossing angles of the beams.

The idea to use space to encode time has been around for some time in optical spectroscopy. As early as 1971, echelon structures were used to subdivide the transverse profile of a beam into multiple pulses, each delayed by a different amount depending on the glass composition and step size. More recently, Poulin et al (Poulin, P. R.; Nelson, K. A. Science 2006, 313, 1756) used an echelon structure to monitor the irreversible photolysis of ions in organic crystals in real time using a single-shot pump-probe setup. The same group used crossed femtosecond pulses to record single-shot pump probe signals across multiple time points. Undoubtedly, the most prevalent use of spatial encoding by crossed beams is for pulse characterization using a single-shot version of frequency-resolved optical gating (FROG) called GRENIOULLE. Using a Fresnel biprism, a single pulse is split into two pulses that cross at variable delays inside a nonlinear crystal depending on their position in space. The second harmonic light is then frequency resolved by phase matching within the crystal and measured with a two-dimensional CCD camera. Recently, the same principle was used to record a single-shot transient grating FROG (TG FROG), which is not limited by the bandwidth limitations of the nonlinear doubling crystal. GRAPE uses an additional heterodyne pulse and Fourier transformation along the spatially encoded delay dimension.

Recently, another single-shot method using angular rather than spatial encoding was introduced by Mercer et al. (Mercer, I. P.; El-Taha, Y. C.; Kajumba, N.; Marangos, J. P.; Tisch, J. W. G.; Gabrielsen, M.; Cogdell, R. J.; Springate, E.; Turcu, E. *Physical Review Letters* 2009, 102) in order to resolve the transition energies involved in a particular Feynman pathway. This angle-resolved coherent (ARC) optical wave-mixing method takes advantage of the frequency-dependent phase matching geometry in order to separate coherently coupled quantum transitions from energy transfer. Another elegant single-shot approach was demonstrated by DeCamp et al (DeCamp, M. F.; DeFlores, L. P.; Jones, K. C.; Tokmakoff, A. *Optics Express* 2007, 15, 233.) to capture a two-dimensional spectrum in the frequency domain. Both of these methods differ from two-dimensional photon echo spectroscopy in several ways. For example, the ARC method separates response pathways while sacrificing time resolution and separation of inhomogeneous from homogeneous broadening.

In contrast, the present GRAPE spectroscopy techniques are able to circumvent these limitations by harnessing the full power of two-dimensional photon echo spectroscopy with no temporal smearing and no loss in signal. Further, the method can be easily implemented on existing spectrometers without linear delay stages, diffractive optics, pulse shapers, or phase stabilization.

The most notable difference between nuclear magnetic resonance (NMR) and optical spectroscopy is the relative size of the sample to the illuminating wavelength. In the visible region of the spectrum the sample size is typically $100\lambda$ instead of $\lambda/100$ as in NMR. For non-linear propagation, this results in a background-free signal that emerges in a unique phase-matched direction. In NMR, the signal is emitted isotropically, and the detectors encompassing must use phase cycling to isolate the desired coherence pathway to resolve the image. In the optical regime, the sample region illuminated by focused beams typically represents less than one part in $10^4$ of the total sample area. Defocusing the light increases the number of molecules contributing to the signal, but creates temporal broadening of the integrated signal due to the crossing angles of the beams. Previously, this effect had been regarded as an unwanted artifact and was avoided by creating a tight focus at the sample in which the temporal gradient was smaller than the duration of the pulse.

With the present techniques, we exploit this temporal gradient (and, in fact, magnify it) to generate a 2D photon echo (2D PE) spectrum using a single laser shot. There is no loss in signal, but the techniques are nonetheless able to reduce acquisition time by several orders of magnitude.

Connection to MRI

Our motivation to develop GRAPE spectroscopy arises from attempting to exploit the connection between NMR and nonlinear optical spectroscopy by extending the analogy to MRI. MRI is well known as an unparalleled imaging tool used to peer inside the human body. However, it was not until decades after its inception that the method came into widespread use. The discovery by Mansfield and coworkers (Stehling, M. K.; Turner, R.; Mansfield, P. *Science* 1991, 254, 43.) that rapid gradient switching could produce images in a single transient propelled the technique, known as echo planar imaging (EPI) from the laboratory to the clinical setting. EPI capitalizes on the reversible nature of the Zeeman interaction to acquire multiple spin echoes within a single time course. The cousin of MRI, NMR spectroscopy, is conceptually similar. Yet, MRI, which can be viewed as a multidimensional correlation technique that correlates spins in space across orthogonal spatial dimensions, and multidimensional NMR spectroscopy, which correlates frequencies over several spectral dimensions, differ significantly in their sampling schemes. Fundamentally, due to the irreversibility of the chemical shift and indirect couplings that serve to define the features in the NMR spectrum, multidimensional NMR spectroscopy requires a slow, multi-scan acquisition scheme in which the indirect temporal dimension is systematically scanned prior to Fourier transformation, regardless of the available sensitivity.

Recently, a powerful single-scan method in NMR introduced by Frydman et al (Frydman, L.; Scherf, T.; Lupulescu, A. PNAS 2002, 99, 15858; Mishkovsky, M.; Frydman, L. *Ann Rev Phys Chem* 2009, 60, 429.) was shown to circumvent this limitation by recording the entire multidimensional NMR spectrum in a single-scan utilizing imaging gradients on a homogeneous sample. Whereas the goal of imaging is to resolve spatial inhomogeneity, utilizing imaging gradients on a homogenous sample allows for a parallel encoding of the indirect time-domain in space. In its simplest incarnation, a radio frequency sweep is applied to the sample in the presence of a pulsed gradient to uniformly excite each position in the sample at a different moment in time. Owing to the linearity of the sweep and gradient, spins along the gradient axis undergo a phase evolution directly proportional to their position along the gradient. After a mixing sequence and a single Fourier transformation along the direct time domain, a suitable unwrapping of this spatial encoding results in an n-dimensional NMR spectrum.

Figure 9:
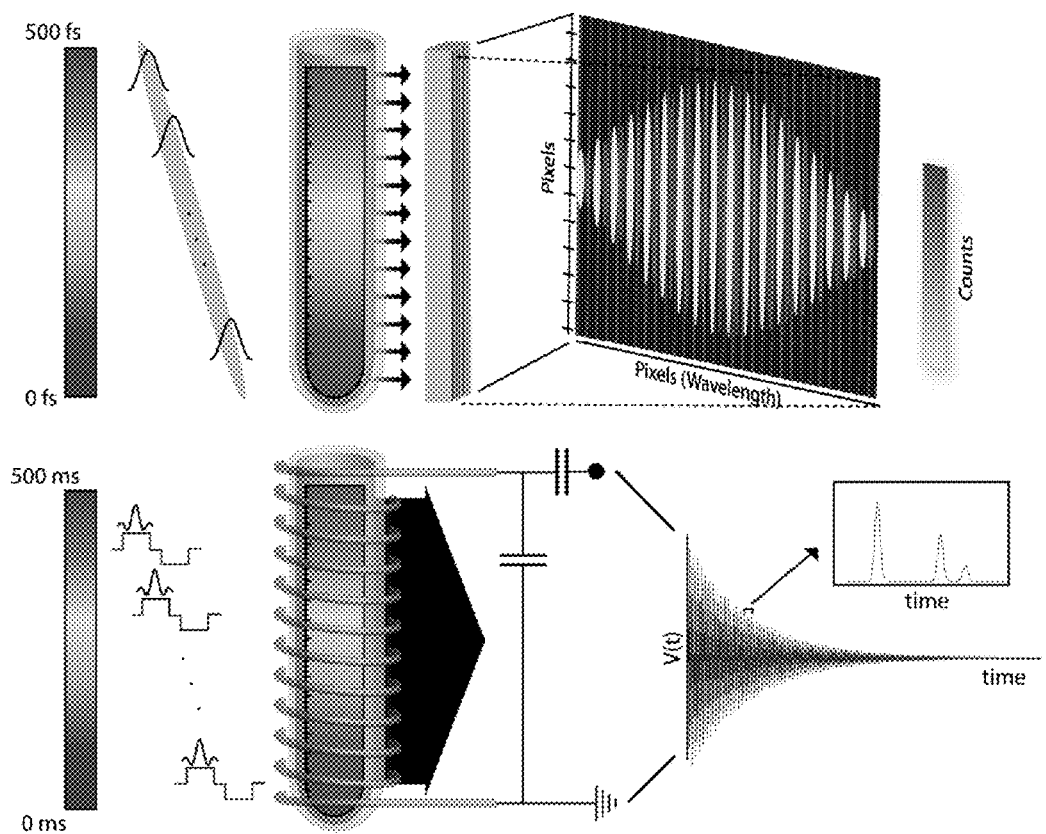
FIG. 9 illustrates an analogy between GRAPE and a conventional single scan nuclear magnetic resonance (NMR) technique. A heterogeneous excitation of the sample is achieved via the use of a tilted wavefront with GRAPE (top) and a magnetic field gradient with chirped pulse excitation in single scan NMR (bottom). The signal in GRAPE is spectrally resolved onto a two dimensional CCD via the use of a grating and interfered with a reference to yield the magnitude and phase of the resulting signal. In single scan NMR, an echo planar chemical-shift imaging protocol is used to encode the chemical information into the free induction decay which is monitored by the use of a coil around the sample.

While the analogy between optical spectroscopy and NMR has been appreciated for many years, the connection to MRI has thus far been neglected. As shown in FIG. 9, GRAPE spectroscopy and single-scan NMR share similarities, although each uses a very different type of gradient—NMR utilizes magnetic field gradients, while the gradient in GRAPE is imposed purely geometrically. Unlike the NMR case, GRAPE achieves no loss in signal even though the acquisition time is reduced by several orders of magnitude by eliminating an entire experimental dimension. This difference is fundamentally tied to the ratio of the wavelength to the sample size. In NMR, the wavelength is long compared to the sample, and the signal is emitted from the entire sample. In the optical regime, the wavelength is short compared to the sample permitting tight focussing such that only a small portion of the sample emits signal. By focussing on a larger area (a line) within the sample, more information can be acquired without sacrificing signal.

Two-Dimensional Photon Echo Spectroscopy

The two-dimensional photon echo electronic spectroscopic techniques described herein are degenerate four-wave mixing spectroscopic techniques that reveal the correlation between the absorption and emission frequencies of a material system. The 2D spectra, generated by measuring the third-order nonlinear polarization in a unique phase matched direction, links the dipole oscillation frequency during an initial period, $\tau$, with that of a final period, t, for each 'waiting time,' T. Peaks appearing on the diagonal provide a measure of the 'memory' of the system in which an oscillating dipole at a given frequency is correlated to the same oscillator a time, T, later. Cross-peaks provide information on electronic coupling between dipoles. Changes in the 2D spectrum as a function of the waiting time reveal the dynamics of energy transfer among chromophores as well as interactions of chromophores with their surroundings. In the case of the photon echo, inhomogeneous broadening along the direct, t-domain is reduced to the homogeneous limit, making it particularly useful for systems with broad or featureless linear spectra. 2D electronic spectroscopy has successfully elucidated dynamics and microscopic interactions in semiconductor quantum wells, carbon nanotubes, photosynthetic light-harvesting complexes, and other complex multichromophoric systems on an ultrafast timescale. For short waiting times, 2D optical spectroscopy is an analog of the 2D NMR COSY experiment, while for long population times it is conceptually similar to the 2D NMR NOESY experiment.

In 2D photon echo experiments, a femtosecond laser pulse may be split into four identical beams by using beam splitters or diffractive optics in the non-collinear geometry or by an acousto-optic modulator (AOM) in the collinear configuration. In certain embodiments, all four beams are focused onto a <100 μm diameter spot in the sample and the heterodyned signal is spectrally resolved using a spectrometer and CCD camera. The pulse sequence is shown in FIG. 1A. The first pulse, $k_1$, generates a one-quantum coherence in the sample that evolves for a specific amount of time, $\tau$, before application of the second pulse, $k_2$, that stores the phase as a zero-quantum coherence, commonly referred to as a population. After a "waiting time," T, the third pulse, $k_3$, returns the system to a single-quantum coherence where an echo forms a time, $t_{echo}$, later. Frequency-resolved detection occurs by heterodyning the emitted signal with the local oscillator pulse, $k_4$. The third-order nonlinear polarization is then measured as a function of the two delay times, $\tau$ and T, for each emitted frequency. The 2D spectrum generated for each waiting time by a double Fourier transform about the coherence times, correlates the dipole oscillation during the initial period, $\tau$, with that during the final period, t. Peaks on the diagonal therefore provide a measure of the "memory" of the system in which oscillating dipoles at a given frequency are correlated to one another at the same frequency at a later time, T. Cross-peaks provide information on electronic couplings between dipoles. Changes in the 2D spectrum as a function of the waiting time reveal the dynamics of energy transfer among chromophores as well as interactions of chromophores with the bath. In the case of photon echo spectroscopy, inhomogeneous broadening along the direct t-domain is reduced to the homogeneous limit, making it particularly useful for systems with unresolvable linear spectra.

All multi-dimensional optical Fourier-transform (FT) spectroscopies to date rely on point-by-point sampling schemes based on conventional 2D NMR protocols. In each case, r is systematically scanned for each population time. Due to the Fourier nature of the sampling, coherent multidimensional spectroscopy is highly susceptible to phase errors. Therefore, successful implementation of such spectroscopies, particularly in the visible region, requires either passive or active phase stabilization.

Figure 10:
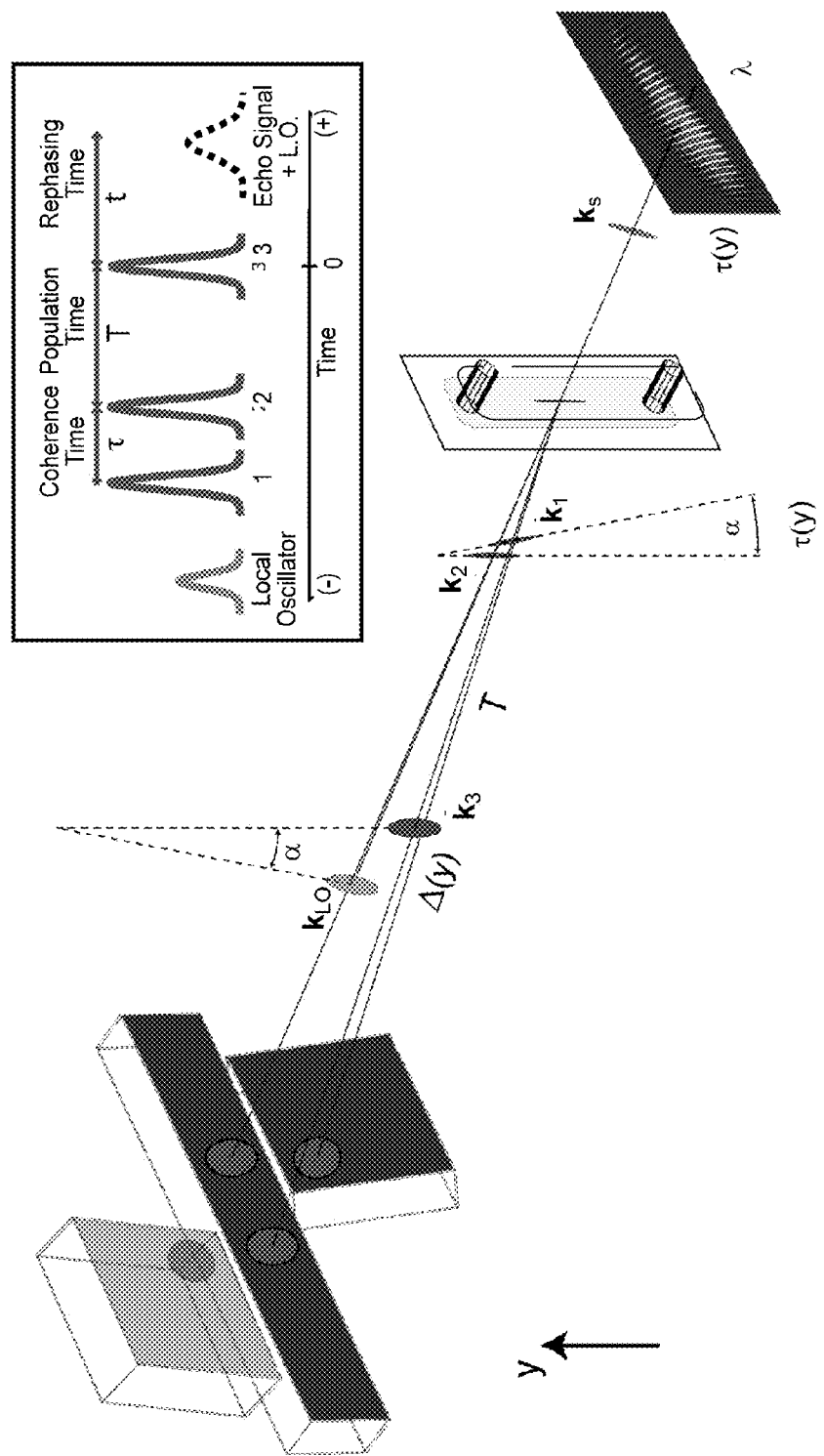
FIG. 10 illustrates a schematic diagram of the GRAPE mirror assembly, in accordance with an example. The inset shows the pulse sequence used in two-dimensional photon echo spectroscopy. Two phase-matched pairs of pulses reflect from a wedged beamsplitter (see FIG. 13) to form beams 1-4. Tilted wavefronts, created by reflections of a three-mirror assembly, are used to spatially encode the $\tau$ delay between pulses 1 and 2 while keeping pulses 2 and 3 at a constant delay time, T, across the sample. Beams 2 and 3 reflect off a single horizontal mirror and focus to parallel lines at the sample cell (cylindrical focusing lens not shown). Beam 1 is tilted at an angle, α, relative to beams 2 and 3, while the local oscillator (LO), beam 4, is titled at an equal, but opposite angle to beam 1 to form the phase-matched geometry yielding signal in the rotating frame. The signal emanates in the direction of the LO for each point along the unfocused beam waist (y-direction) before being spectrally dispersed by a diffraction grating. The resultant 2D image is recorded by a CCD camera.

In a GRAPE experiment introduced here, two pairs of, for example, 40 femtosecond pulses are generated using conventional beam splitters and mirrors, but rather than focusing to a point, the beams are focused to a line using a cylindrical lens (see the examples for details of the optical setup). As with 1D MRI, each point of this line (y-axis) along the sample contributes exactly one point to the overall signal. The variation in $\tau$ with space is created geometrically by tilting the wavefront of one beam relative to another by the relative angle, $\alpha$, between the focused lines using mirrors, resulting in a temporal gradient of slope $(\tan \alpha)/c$ along y (FIG. 10). For small angles, this gradient causes a delay across the unfocused beam diameter of a few hundred femtoseconds, which establishes the range of the $\tau$ values to be sampled. Similarly, all the pulses in the photon echo pulse sequence can be angled such that each position along the y-axis corresponds directly to a different indirect time-domain sequence, which in aggregate captures the whole 2D experiment. Measuring the spatially resolved signal requires the use of an imaging spectrograph that spectrally resolves this distribution of points by projecting it onto a two-dimensional CCD camera.

The various experimental apparatuses can differ in the way the pulse delays are generated. Typically, the $\tau$ delay would be created by accurate positioning of pairs of identical glass wedges in an anti-parallel orientation mounted on linear translation stages, where each set of wedges essentially acts like a glass plate of varying thickness (FIG. 1B). Delays can also be generated by use of pulse shaping technology such as spatial light modulation (SLM) or acousto-optic modulation (AOM). In each case, $\tau$ may be systematically scanned for each population time to sample the optical frequency of the signal or, for rotating frame detection, to sample the largest difference frequency of the oscillating dipoles in the sample. Because of the Fourier nature of the sampling in previously known techniques, phase stability, either passive or active, is an important consideration for their successful implementation, particularly in the visible region of the spectrum. As shown, by resolving the beams to (overlapping) lineshapes instead of point focuses, the present techniques are able to limit and even avoid the phase stability problems inherent in other optical spectroscopy techniques.

Spatial Encoding

Figure 2:
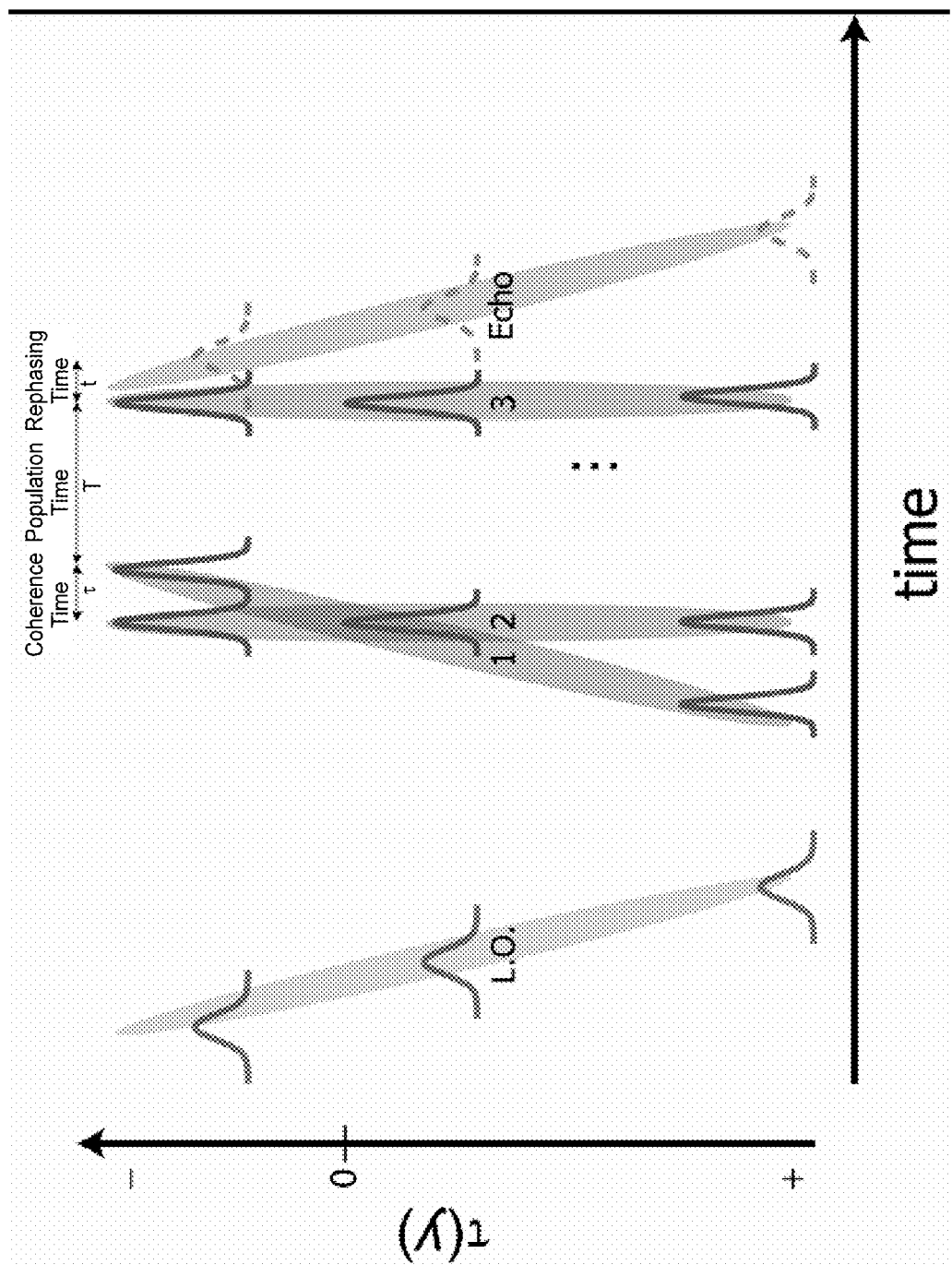
FIG. 2 illustrates a spatially encoded 2D pulse sequence. Tilted wavefronts serve to define the pulse sequence along the y-axis of the sample. The wavefronts of beams 2 and 3 are parallel, which act to define a constant population time, T, across the sample. Wavefronts of beams 1 and 4 (i.e. LO) are tilted in opposite directions relative to beams 2 and 3, creating a spatially encoded temporal delay, $\tau(y)$. Each position along the y-axis of the sample uniquely maps to a single delay of the coherence time, $\tau$, which in aggregate defines the entire 2D photon echo pulse sequence. The CCD camera then acts to bin a range of coherence times ($\Delta\tau \sim 0.5$ fs) for each pixel.

In the limit of zero pulse-front tilt (i.e., no angular dispersion or spatial chirp), the wavefront of a beam of light is perpendicular to its direction of propagation. For a well-collimated beam, the wavefront is approximately flat. When two non-collinear beams cross, their wavefronts are tilted with respect to one another, resulting in a time delay that is proportional to their position along the beam waist. This temporal gradient is dependent on the crossing angle, $\alpha$ and is given by $(\tan \alpha)/c$. For example, the maximum time delay across a five-millimeter beam waist for a crossing angle of 1° is 291 fs, within the range of single-quantum coherence times for many systems exhibiting electronic transitions in the visible region of the spectrum such as the laser dye examined in an example, here. If the time delay between pulses 2 and 3 remains constant, then each spatial location across the sample uniquely maps to a different four-wave mixing experiment, equivalent to parametric sampling of the $\tau$ delay for a fixed population time, T, as shown in FIG. 2. After passage through a spectrometer, the resultant two-dimensional image forms an instantaneous snapshot of a two-dimensional photon echo spectrum for a fixed population time.

Diffractive optics are not necessary for GRAPE and diffractive beam-splitters as currently used by many practioners of two-dimensional optical spectroscopy may be problematic in a single-shot design because of angular dispersion. In point-by-point methods, the point of focus from which the four beams originate is imaged onto the sample so that angular dispersion does not present a problem. That is, all colors, even though they are diffracted in different directions by the grating, are then refocused onto the sample and hence arrive at the same moment in time. This same approach cannot be used with a line of focus since the GRAPE apparatus is a non-imaging spectrometer; the focusing in the horizontal caused by the cylindrical mirror preserves the vertical tilts dictated by flat mirrors in the GRAPE mirror assembly which define the temporal gradient. Use of diffractive optics could result in different temporal gradients for each spectral component of the pulse as well as chip in the spatial axis.

Phase Matching

The conventional boxcar geometry (FIG. 3A) used for phase matching in two-dimensional spectroscopy in which all four pulses are focused to an isotropic beam waist creates a temporal gradient between all pairs of pulses. This effect, present in all non-collinear multi-wave mixing experiments causes a slight temporal smearing of the pulses due to the crossing angle and finite beam waist. For small fixed crossing angles, less than a few degrees, this smearing is roughly proportional to the beam waist. In point-by-point 2D spectroscopy where the signal is integrated over the focal volume, the beam waist is kept small (<100 μm) to minimize this smearing to less than a few femtoseconds. However, for a large beam waist (>5 mm) this smearing would be on the order of a few hundred femtoseconds, precluding the accurate acquisition of 2D spectra.

Figure 3:
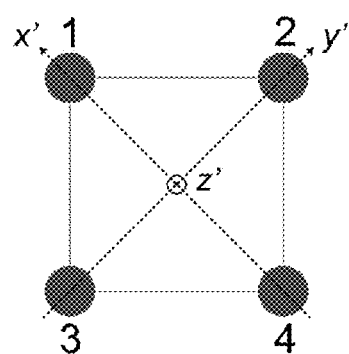
FIG. 3A illustrates a box-car geometry in accordance with a conventional point-by-point optical spectroscopy technique. This phase-matched geometry provides passive phase stability for point-by-point acquisition methods. The rephasing signal is emitted in the direction $k_s = -k_1 + k_2 + k_3$, which coincides with the local oscillator pulse labeled as beam 4 in the bottom right hand side of the square.
FIG. 3B illustrates a distorted box-car geometry in accordance with the present techniques. This phase-matched geometry provides passive phase stability for single-shot acquisition. The beams are focused in a direction parallel to the y-axis. This scheme allows beams 2 and 3 to maintain parallel wavefronts at the sample, while introducing a temporal gradient, $dt_{1,2(3)}/dy$ between beams 1 and 2 (3). Beam 4 (i.e., LO) coincides with the rephasing signal and has an opposite temporal gradient, $dt_{4,2(3)}/dy \approx -dt_{1,2(3)}/dy$, with respect to beam 2 (3).
Figure 3:
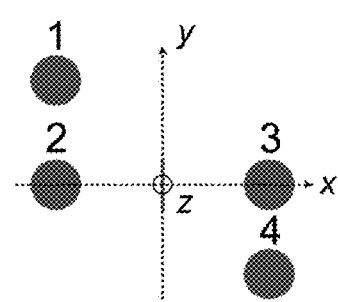

Instead of the conventional geometry of FIG. 3A, the present techniques consider the phase-matched geometry shown in FIG. 3B. Instead of focusing to a point, the beams now focus to a line perpendicular to the direction of propagation and the line connecting beams 2 and 3. At each position along the vertical axis of the focal plane, a small temporal smearing of the pulses exists due to the finite horizontal beam waist (<100 um); however, the wavefronts of beams 2 and 3 are exactly parallel in the unfocused direction, resulting in the spatially encoded pulse sequence shown in FIG. 2. The signal, emitted from the sample in the direction $k_s = -k_1 + k_2 + k_3$, is now in the form of a line, rather than a point, from the sample. Imaging this line onto a spectrometer input slit results in a two-dimensional map with the $\tau$ delay along the vertical direction (y) and wavelength along the horizontal direction (x). The image shares similarities with a trace formed by transient grating frequency resolved optical gating (TG FROG) used for pulse characterization. Unlike TG FROG, however, the signal is phase resolved by interference with a reference pulse. Fourier transformation of this two-dimensional signal along the $\tau$ direction yields the two-dimensional spectrum of the material system.

Example Experimental Setups

Figure 4:
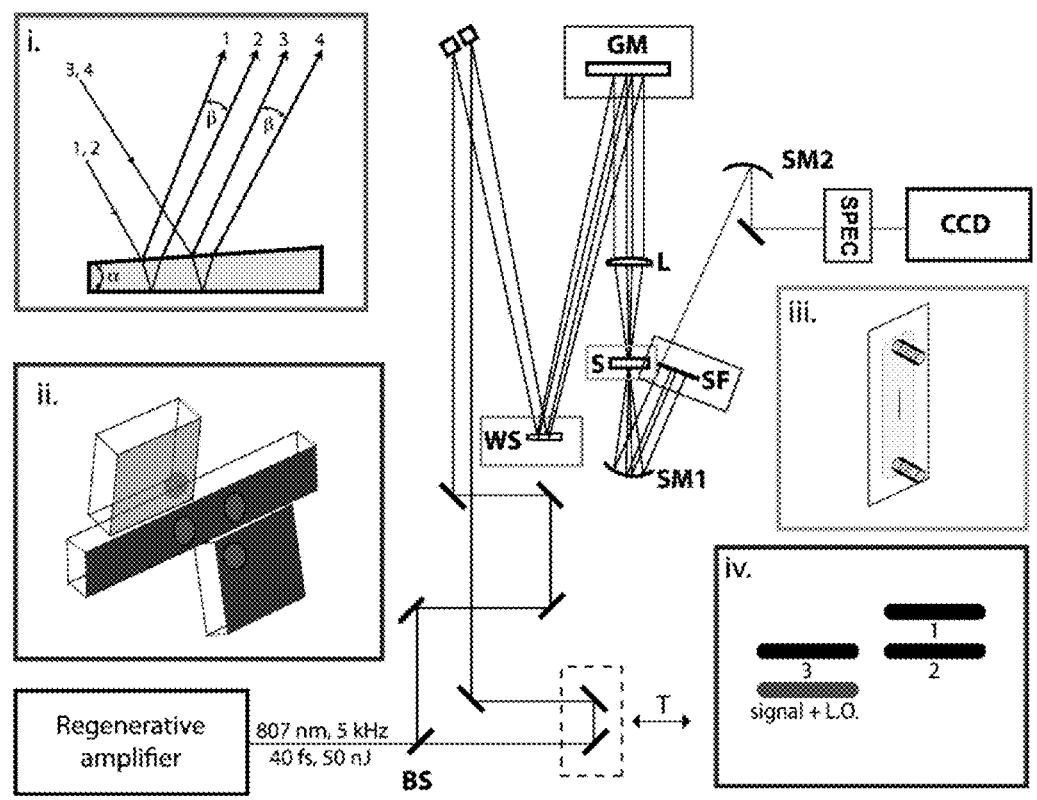
FIG. 4 illustrates an optical setup of a single-shot spectroscopy technique in accordance with the present examples. Two beams resulting from passing a 40 fs, 50 nJ pulse through a wedged beam splitter (BS) are delayed by a time, T, with respect to one another by a motorized translation stage (T). These time-delayed beams pass through another wedged beam splitter (WS—inset i.) to form the four beams, $k_1$-$k_4$, used in the GRAPE pulse sequence. These beams then reflect off the GRAPE mirror assembly (GM—inset ii.) toward a cylindrical lens (L) which focuses the beams along the x-axis of the sample (S—inset iii). The emitted non-linear signal is imaged onto the entrance slit of the spectrometer (SPEC) by two spherical mirrors SM1 and SM2 that form a 2× telescope. The signal and local oscillator are isolated from the pump beams using a spatial filter (SF—inset iv.) before detection by a thermoelectrically cooled CCD camera.

A schematic of an example optical layout in accordance with the present techniques is shown in FIG. 4. A Ti:sapphire oscillator (Micra, COHERENT Inc.) is used to seed a regenerative amplifier (Legend Elite USP-HE, COHERENT Inc.) to generate 40 fs pulses centered at 807 nm at a 5 kHz repetition rate. The pulse length is measured using single-shot second harmonic frequency-resolved optical gating (Grenouille, Swamp Optics) prior to the sample. A small fraction of the amplifier output pulse (20 μJ) passes through a beam splitter, creating two beams, each with a 1/e diameter of roughly 6 mm. The relative delay between the beams is controlled by a motorized translation stage (Aerotech Inc.), which defines the population time, T. The beams are then further split into two pulse pairs creating four pulses, labeled here as $k_1$-$k_4$, by the use of front and back Fresnel reflections from a 3 mm thick uncoated 0.5 degree wedged optic (FIG. 4, wedge beam splitter expanded in panel i). The input angles to the wedged optic are adjusted such that the back reflection of the 1,2 pair is parallel to the front reflection of the 3,4 pair. Assuming small angles, this results in identical relative angles between beams 1 and 2 and between beams 3 and 4, which are formed by the remaining front and back reflections. For a wedge of angle, $\beta$, the relative angle between the 1, 2 and 3, 4 beams is given by $\gamma=2n_g\beta$, where $n_g$ is the index of refraction of the glass. The wedged optic provides a convenient means of dumping excess pulse energy and reduces the number of optical components by eliminating additional pairs of beam splitters and mirrors necessary to steer the beams back towards the sample. The incident angles of the two input beams to the wedged optic are adjusted such that the reflection from the rear surface of one wedge ($k_2$) is parallel to the reflection from the front surface of the other ($k_3$). The remaining reflections comprise beams $k_1$ and $k_4$, respectively. The four beams are aligned to form the distorted boxcar geometry shown in FIG. 3B.

To generate the requisite temporal gradients at the sample, the four beams are reflected off a mirror assembly, which we refer to as the GRAPE mirror as shown in FIG. 4 (see panel ii). The mirrors in the GRAPE assembly are oriented such that the vertical position of the four beams overlaps at the sample to generate the required tilted wavefronts that spatially encode the temporal delays across the sample and permit acquisition of the echo signal in the rotating frame. Beams 2 and 3 reflect off a single mirror while pulses 1 and 4 reflect off separate mirrors, each mounted on a delay stage which acts to compensate for temporal delays caused by the finite thickness of the wedged beamsplitter. All four beams then pass through a cylindrical lens with 250 mm focal length, which focuses the beams in the horizontal dimension onto a 40 μm wide, 6 mm tall focal line at the sample (FIG. 4, panel iii). In the vertical direction, beams 1 and 4 are directed towards the sample where they overlap with beams 2 and 3. The vertical angle, $\alpha$, at which beam 1 crosses beam 2, serves to define the temporal gradient. This gradient can be adjusted by changing the distance of the cylinder lens and sample from the GRAPE mirror or, alternatively, by adjusting the distance from the wedged optic to the GRAPE mirror while maintaining the distance between the GRAPE mirror and the sample. The vertical angle at which beam $k_4$ is directed towards the sample, is roughly negative in sign to the vertical angle in which $k_1$ is directed towards the sample. These two angles serve to define the timing of the signal relative to the echo and hence the slope of the echo signals relative to the $\tau$ axis.

For heterodyne detection, beam 4 is attenuated by utilizing the front Fresnel reflection from an optical flat and neutral density placed after the mirror assembly, resulting in a total attenuation of roughly three orders of magnitude. In an example implementation, at the sample, the energy of pulse $k_1$-$k_3$ was roughly 50 nJ per pulse, which resulted in an energy flux of 20 μJ/cm² comparable to point-by-point methods or to other multi-scan setups that focus to a spot. The sample, 0.4 mM IR-144 in methanol, was recirculated through a flow cell (STARNA) by a peristaltic pump (COLE-PARMER). Two spherical optics of focal lengths 50 cm and 25 cm imaged the emitted signal (effectively a line source) from the sample onto a 25 μm slit at the spectrometer (ANDOR Technology). To isolate only the signal and local oscillator, which is beam $4 k_4$, a spatial filter was placed at the focus of SM1 after the sample (roughly 25 cm after the first spherical mirror), which isolated only the photon echo signal and LO. At this location, all four beams separated in the horizontal direction, which allowed beams $k_1$-$k_3$ to be blocked for background-free detection (FIG. 4 iv). After passage through the spatial filter, the heterodyned signal was spectrally resolved using a 1200 lines/mm diffraction grating and a 2048×2048 thermoelectrically cooled CCD array (Andor). The resulting interference pattern enabled determination of the phase and magnitude of the signal. Two-dimensional spectra were recorded for various population times from T=0 to T=100 fs in steps of 10 fs. All measurements were taken at ambient temperature, 21° C.

Pulse Timings

The spatially encoded pulse timings for the GRAPE technique were determined by spectral interferometry. A scattering element was placed at the sample position, and the timings of beams 1, 2, and 3 were separately measured with respect to beam 4. The timing of beam 1 with respect to beam 2 was set to create a temporal gradient from approximately −200 fs to 400 fs across the beam waist, corresponding to approximately 0.6 fs/pixel at the detector. Beam 4 was attenuated to avoid unwanted pump-probe signals and delayed by $\Delta(y)$ such that the center of the wavefront arrives approximately 1.3 ps before beam 3. Because of the orientation of the beam 1 and beam 4 mirrors, the temporal gradient of beam 4 relative to beam 3 is opposite in sign to the temporal gradient between beam 1 and 2, $\partial\tau(y)/\partial y = -\partial\Delta(y)/\partial y$. Since the signal in a photon echo experiment comes out a time $\tau$ after beam 3 (neglecting the photon echo peak shift), the time between beam 4 and the signal is constant at all positions in the sample. However, due to the delays caused by the back reflection in the wedged beam splitter, the position of the mirrors in the GRAPE assembly along the propagation direction are not exactly in the same vertical plane. This causes a slight tilt of the echo relative to the LO.

Figure 5:
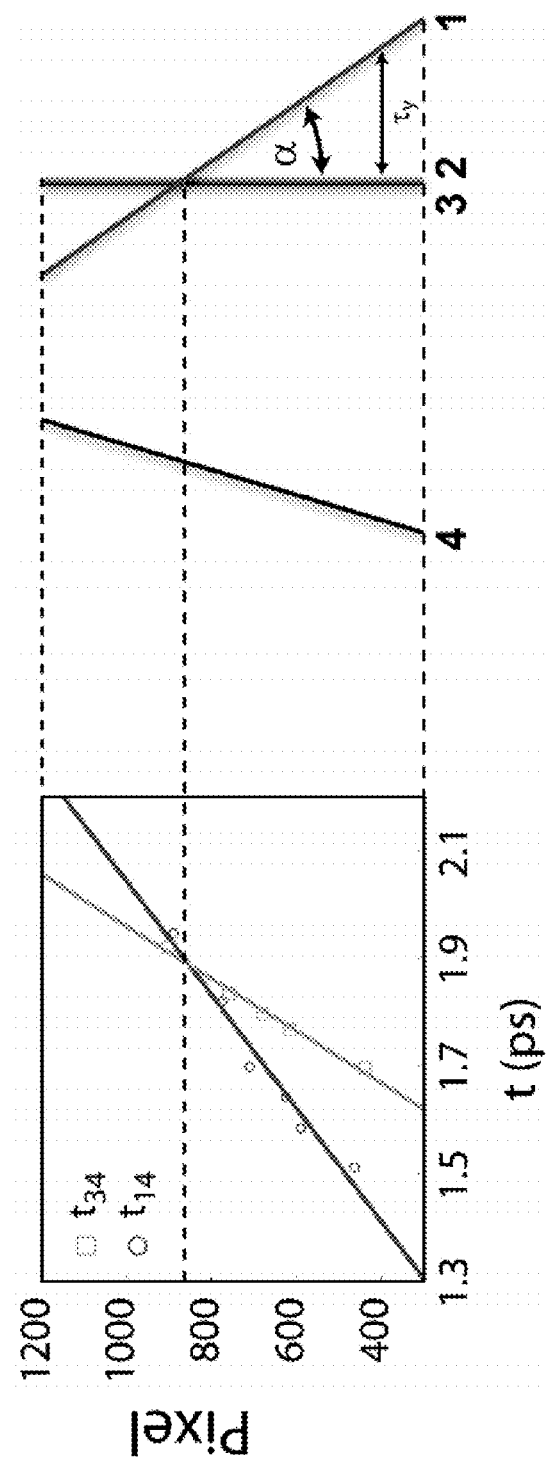
FIG. 5 illustrates example pulse timings resulting from the configuration of FIG. 4. Spatially encoded pulse timings are determined by analyzing the interferogram resulting from scatter between beams 1 and 3 with beam 4 at the position of the sample. Scatter points with high fringe contrast are selected for analysis by spectral interferometry to give $t_{34}(y)$ (squares, the curve of which intersects the t-axis at ~1.6 ps) and $t_{14}(y)$ (circles, the curve of which intersects the t-axis at ~1.3 ps). Linear regression plots determine the temporal gradients of beams 1 and 3 relative to beam 4 (right-most vertical solid line and right-most tilted solid line, respectively): $dt_{1,4}/dy=1.05\pm0.1$ fs/pixel and $dt_{3,4}/dy=0.48\pm0.05$ fs/pixel. The crossing point, $y_t$, at which $\Delta t_{14}(y_t)=\Delta t_{34}(y_t)$ defines $\tau=0$ assuming that $\Delta t_{34}(y)=\Delta t_{24}(y)$ at T=0. These timings serve to define the spatially encoded pulse sequence shown schematically on the right.

The relative timing between pulse pairs was derived by measuring the scatter of beams 1 and 3 at the position of the sample in the direction of beam 4. In an example, beam 2 was aligned such that it is parallel to beam 3 to within better than $2\times10^{-4}$ radians; this measurement provided a more accurate upper bound of $t_{23}(y)$ than possible with spectral interferometry in the presence of noise. Since the interference between the scattered light and beam 4 at the sample position was imaged onto the spectrometer slit and then spectrally resolved by a diffraction grating prior to detection by the CCD, it was possible to simultaneously measure several scattering events along the spatially encoded axis. This allowed the slopes of the temporal delays of each beam, 1 and 3, relative to beam 4 to be measured in a single-shot (see the left side of FIG. 5). Due to the non-uniformity of the scattering medium, in practice, only a few positions along y were useful for accurate spectral interferometric analysis. Knowledge of the pulse timings, $t_{i4}$ with i=1, 2, or 3, relative to a single pulse (i.e., beam 4) could then be used to uniquely determine the entire spatially encoded pulse sequence (see the right side of FIG. 5). The crossing point between lines $t_{14}$ and $t_{24}$ served to define the detector pixel along y that corresponds to $\tau=0$. From these timings, we obtained $\partial\tau/\partial N=0.57\pm0.05$ fs/Pixel and $\partial T/\partial N<0.01$ fs/Pixel, where N is pixels. This value of $\partial\tau/\partial N$ allowed frequencies as high as 11.0 rad/fs (170 nm) to be detected, well above the optical frequencies of visible light. A low value of a $\partial T/\partial N$ ensures that the population time across the sample remains constant. In the experiments here, the population time was constant to less than 4 fs across the sample, sufficient to resolve population dynamics of IR 144 in methanol. Because the focus at the sample is imaged onto the spectrometer slit by a 2× telescope and each camera pixel is 13.5 μm in height, this reading translated to $\partial\tau/\partial z=84.0\pm8$ fs/mm and a $\partial T/\partial z<1$ fs/mm at the sample. By adjustment of the beam 1 delay, the crossing point can be positioned anywhere across the unfocused beam waist. The crossing point was chosen such that the majority of the signal resulted from positive values (beam 1 before beam 2), which corresponded to rephasing signal pathways. The range of $\tau$ values selected to lie within the full-width half max (FWHM) of the beam waist along the spatially encoded direction was approximately $-50$ fs $<\tau<230$ fs. Negative values ensure that pulse overlap is taken into account. In some examples, purely non-rephasing signal is not collected because negative $\tau$ values also involve mixed T values in the $k_s=-k_1+k_2+k_3$ direction. In other examples, an additional mirror may be used to collect the non-rephasing signal for further analysis.

Photon Echo Signal

Figure 6:
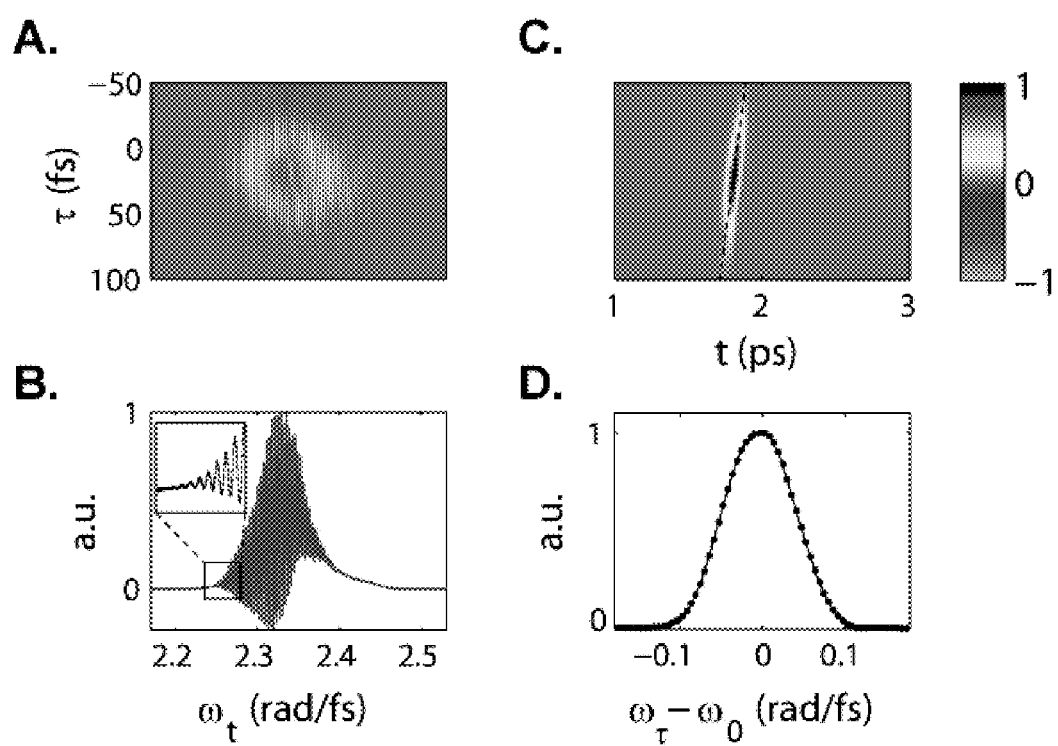
FIG. 6A illustrates a scatter-subtracted raw signal. The background subtracted heterodyned signal after Fourier interpolation (see text) is given by $I_S=I_{1234}-I_{124}-I_{34}+I_4$. The vertical pixel axis is converted to $\tau$ values according to measurements taken by spectral interferometry (see FIG. 5).
FIG. 6B illustrates a projection of the raw signal along $\tau$. An interferogram is formed by interference of the signal with the local oscillator. Oscillation frequency is given by the timing between pulse 4 and the signal. The inset shows an enlarged area of the heterodyned signal showing high fringe contrast and high signal-to-noise.
FIG. 6C illustrates a photon echo signal. Fourier transformation of the Fourier interpolated signal in FIG. 6A about $\omega_t$ results in a $\tau$-t plot containing the homodyne and photon echo signals. After windowing to remove the homodyne signal, an echo appears at roughly 1.8 ps after pulse 4.
FIG. 6D illustrates rotating frame detection. Fourier transformation of a cut through the photon echo signal (dashed line in FIG. 6C) about $\tau$ confirms that the signal in GRAPE is measured in the rotating frame. The linewidth of the signal is given by a convolution of the linear absorption spectrum and the laser spectrum.
Figure 11:
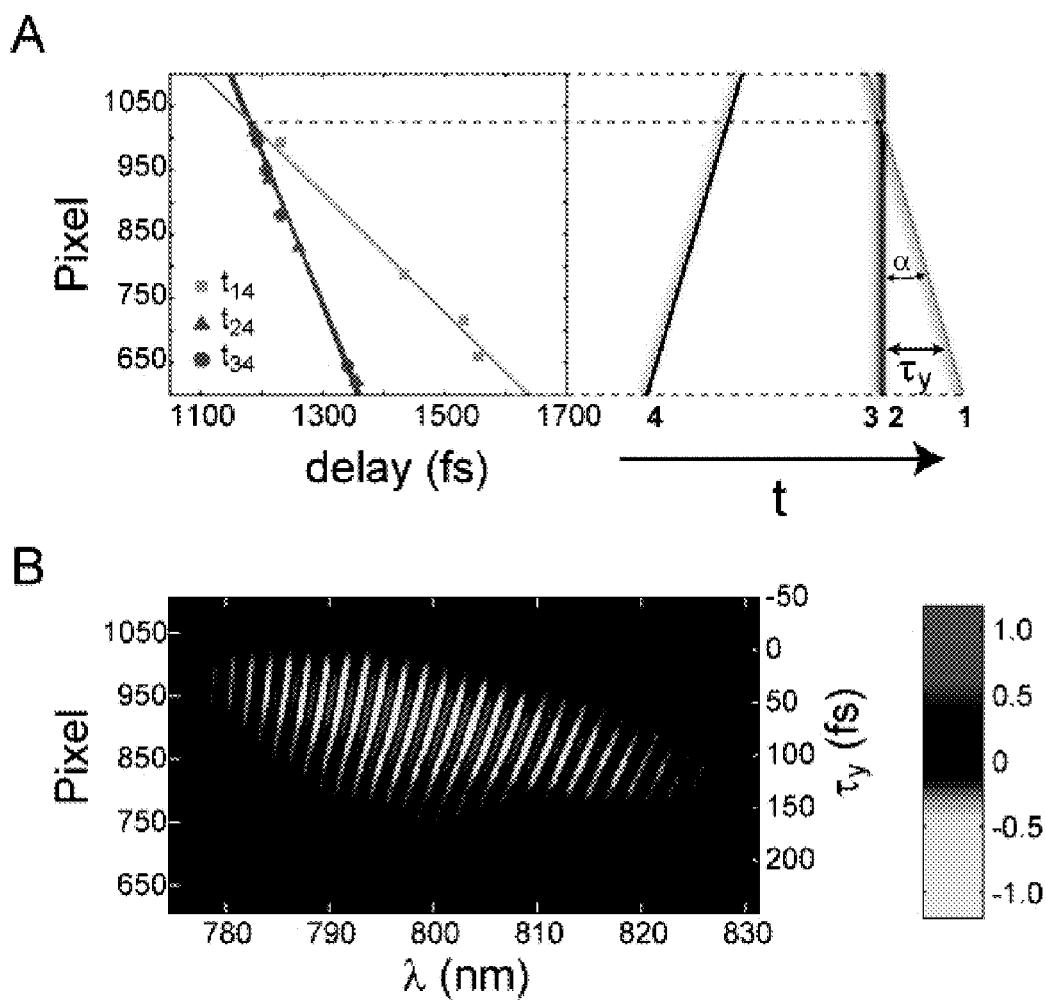
FIG. 11A illustrates a spatiotemporal gradient. Illustrated is a temporal delay between pulse 1, 2, and 3 relative to the local oscillator (4) as measured by spectral interferometry at T=0. The slopes of $t_{24}$ and $t_{34}$ (triangles and circles, respectively, left-most curve that intersects the x-axis at delay ~1360 fs) are kept identical to ensure a constant population time across the beam waist. The crossing point of $t_{14}$ (squares, curve that intersects the x-axis at delay ~1640 fs) and $t_{24}$ lines define the $\tau=0$ point. A schematic of the corresponding pulse ordering along the beam waist is shown to the right.
FIG. 11B illustrates a raw signal as recorded on the CCD camera after background and scattering subtraction for T=0 waiting time. The pixel axis is mapped with the $\tau(y)$ axis according to the interference patterns recorded in A.

The raw signal in the phase matched direction $k_s=-k_1+k_2+k_3$ was heterodyned with a reference beam, $k_4$ and imaged onto a CCD detector. The raw signal recorded by the CCD camera of IR 144 at ambient temperature is shown in FIG. 11B. To eliminate unwanted scatter contributions, we employed a sequence of shuttered images to record the scatter of beams 1, 2, and 3 in the direction of the signal. The scatter-subtracted heterodyne signal at T=0 as shown in FIG. 6A is given by $I_s=I_{1234}-I_{124}-I_{34}+I_4$ where the subscript indicates which beams were unblocked during the signal acquisition. The vertical stripes result from the interference between the third-order signal and the heterodyne pulse along each position in the sample. A horizontal cut through the heterodyned signal reveals the interference signal as shown in FIG. 6B. The time delay between the local oscillator (LO) and the photon echo signal determines the frequency of this signal. From the pulse timing data in FIG. 5, each pixel along the vertical axis maps to a unique $\tau$ value according to $\tau=N\times(\partial\tau/\partial N)$. To isolate only the photon echo signal which forms approximately $\tau(y)$ after pulse 3, the heterodyned signal must first be transformed into the $\tau/t$ domain. Because the signal is naturally recorded across a wavelength rather than frequency axis, we convert the linear wavelength axis to a linear frequency axis using Fourier interpolation as described previously in Dorrer, C.; Belabas, N.; Likforman, J. P.; Joffre, M. *Journal of the Optical Society of America B-Optical Physics* 2000, 17, 1795. Following the Fourier transformation along the t domain and appropriate windowing to remove the homodyne contribution to the signal, a photon echo as a function of $\tau$ is formed as shown in FIG. 6C. The integrated echo peaks at about $\tau=20$ fs as expected from previous photon echo peak shift studies on IR 144 samples. (See Hybl, J. D.; Ferro, A. A.; Jonas, D. M. *Journal of Chemical Physics* 2001, 115, 6606.) Due to pulse overlap effects, a signal at negative $\tau$ values is expected. For $\tau$ values larger than the pulse duration, coherent oscillations between ground and excited state of the molecule lead to formation of a photon echo signal that persists to about $\tau=100$ fs, again in agreement with previous studies of IR 144 in methanol at room temperature. Fourier transformation of the echo signal with respect to $\tau$ shows a peak centered near zero frequency as expected for rotating frame detection (FIG. 6D). A small deviation from zero results from a dynamic Stokes shift within the pulse temporal envelope at T=0.

In an example, a data analysis using a modified procedure of that used for multi-scan two-dimensional spectroscopy as described in detail by Brixner et al. Brixner, T., et al. 2004. Phase-stabilized two-dimensional electronic spectroscopy. J. Chem. Phys. 121:4221-4236), may be used. The scatter-subtracted heterodyne-detected signal is Fourier transformed in the wavelength dimension to create a time vs. $\lambda^{-1}$ data set containing the homodyne and photon echo. The scattering data is used to convert pixels in the y direction into $\tau$ values, and a Fourier interpolation algorithm is used to convert the wavelength dimension to evenly spaced time points. A windowing function is then applied to isolate the photon echo signal. A cut through the echo shows oscillations corresponding to phase evolution of the signal during the coherence time $\tau$ as expected. Due to the rotating frame detection scheme, only the difference frequencies in the oscillations are detected, rather than the optical frequency itself. Finally, a two-dimensional Fourier transform is applied to the entire $\tau$-t data set, resulting in a 2D spectrum for each population time. The absolute phase of the spectra was then determined by fitting to a separately recorded pump-probe signal.

Pump Probe

Unlike NMR, the relative phase of pulses comprising the 2D pulse sequence is generally unknown. Knowledge of the absolute phase of the spectra is necessary to separate dispersive and absorptive components of the lineshape. Since electronic spectra are generally very broad, eliminating dispersive lineshape contributions is necessary for optimizing spectral resolution, even in the present photon echo spectroscopy techniques where the homogeneous linewidth along the anti-diagonal direction is recovered. With NMR, 'phasing' procedures are routinely accomplished by multiplying the spectrum by a zero-order and first-order phase term until negative features disappear, indicating purely absorptive lineshapes. In the optical regime, manual phasing is generally more difficult because of four-level contributions of dipole products, which may give negative features even in the purely absorptive spectra. Also, the existence of excited state absorption in some systems leads to a decrease in signal, which manifests itself as a negative feature in the 2D spectrum, but which is not the result of phase mismatching. In order to phase 2D optical spectra, a projection-slice theorem may be used. This theorem states that the Fourier transform of a slice through the center of a function, f, is equal to the projection of the two-dimensional Fourier transform of f along a line parallel to that slice. If we consider our function to be $f(\tau, t)$, then the projection-slice theorem states that $$F_{t,\tau}P_{\omega_\tau}f(\tau,t)=S_{\tau=0}F_t f(\tau,t) \qquad (1)$$

where F, P, and S are Fourier transform, projection, and slice operators respectively. The term on the left is equal to the projection of the real part of the two-dimensional spectrum, $f(\omega_\tau, \omega_t)$, while the term on the right is equivalent to the spectrally resolved pump probe signal. Therefore, a separate measurement of the pump-probe signal provides an independent means of determining the absolute phase of the 2D spectrum.

Pump-probe signals tend to be very weak in the visible region of the spectrum because of the large probe background signal relative to the very small pump-probe effect. Therefore, one could resort to using a lock-in amplifier and monochromator to record weak pump-probe signals at each desired wavelength. However, such long integration times and slow point-by-point acquisitions makes this approach undesirable. Furthermore, it would largely negate the benefits of single-shot spectroscopy for anything but absolute value 2D spectra. Very poor signal-to-noise of a spectrally resolved pump-probe may be circumvented by employing a variation of the GRAPE method. In order to measure the pump-probe signal one can utilize beam 2 as the pump and beam 3 as the probe. Since the wavefronts of these two beams are parallel to one another at the sample, one can record a pump probe signal across the entire unfocused beam diameter rather than at a single focused point. The signal-to-noise ratio (SNR) then increases by a factor of roughly $\sqrt{R_y/R_x}$ where $R_x$ and $R_y$ are the beam diameters at the sample in the focused and unfocused directions, respectively. For the configuration of FIG.

Figure 7:
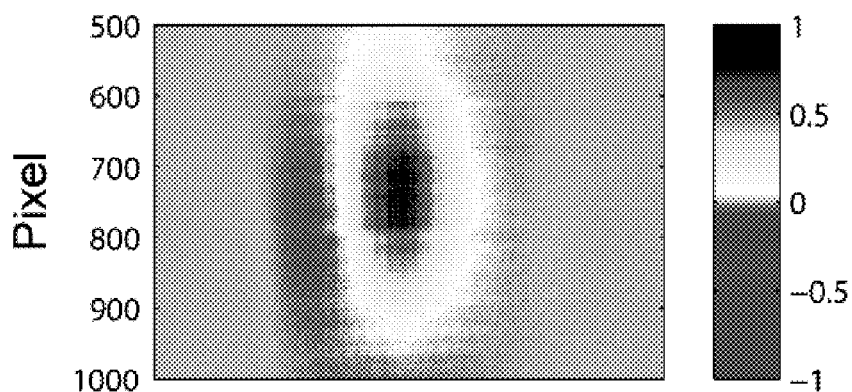
FIG. 7A illustrates a T=0 spectrally-resolved pump probe signal. Beams 2 and 3 are used as the pump and probe pulses, respectively. Since the wavefronts of beams 2 and 3 are parallel at the focus of the cylindrical lens, the entire illuminated region of the sample contributes to the spectrally resolved pump probe signal.
FIG. 7B illustrates phasing of 2D spectra. The projection of the real part of the 2D spectra (solid curve) is 'phased' to match the projection of the pump-probe image in FIG. 7A along the vertical axis of the detector (circles).
Figure 7:
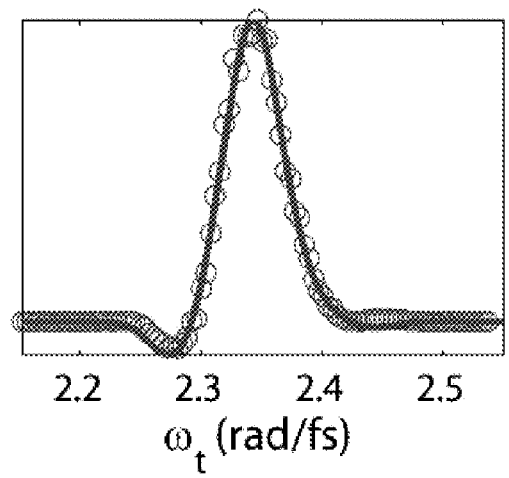

4, this approach yields a factor of 10 improvement in SNR or a factor of 100 in reduced signal averaging over a point-by-point approach. As shown in FIG. 7, each pixel on the camera along the axis of the sample contributes to the pump-probe signal. The uniformity of the signal for IR 144 at T=0, which has very fast dynamics relative to the pulse duration, confirms the absence of a significant ⅔ temporal gradient. Averaging the pump-probe signal over the vertical axis of the CCD area results in sufficient SNR for phasing even without signal averaging. Therefore, pump-probe measurements take about half the time to acquire as the 2D spectrum, which requires four individual measurements for each population time. Phasing the 2D spectrum then proceeds by multiplying the projection of the real part of the 2D spectrum by a phase factor, $$\Phi_0 + (\omega_\tau - \omega_0) d\Phi_1/d\omega + (\omega_\tau - \omega_0)^2 d^2\Phi_1/d\omega^2 \quad (2)$$

to match the pump-probe signal. The zero-order term corresponds to an overall phase constant correction, while the linear term corrects for uncertainties in the $t_{34}(y)$ timing. A small quadratic term is applied to correct for minor dispersive terms owing to pulse chirp and dispersion in the system. The real part of the 2D spectra and separately recorded pump probe spectra are in excellent agreement at all population times measured after this phasing procedure.

Unlike point-by-point methods, an additional phasing parameter is taken into account owing to the way in which the τ domain is sampled. Errors in determination of τ=0 from spectral interferometry result in additional phase roll in the $\omega_\tau$ dimension. By fitting the projection of the 2D spectrum along $\omega_\tau$ to the linear absorption spectra, phasing along that axis becomes possible. If excited state absorption is neglected, this approach is just another application of the projection slice theorem about a perpendicular slice at t=0. Although not strictly true because the absorption spectrum is a linear, rather than third-order process, this approach provides a reliable, practical means of phasing along τ. The phase correction takes the form $$\Phi'_0 + (\omega_\tau - \omega_0)\tau_c \quad (3)$$

where $\tau_c$ corrects for the timing error in the determination of τ=0.

2D Spectra of IR 144

Figure 12:
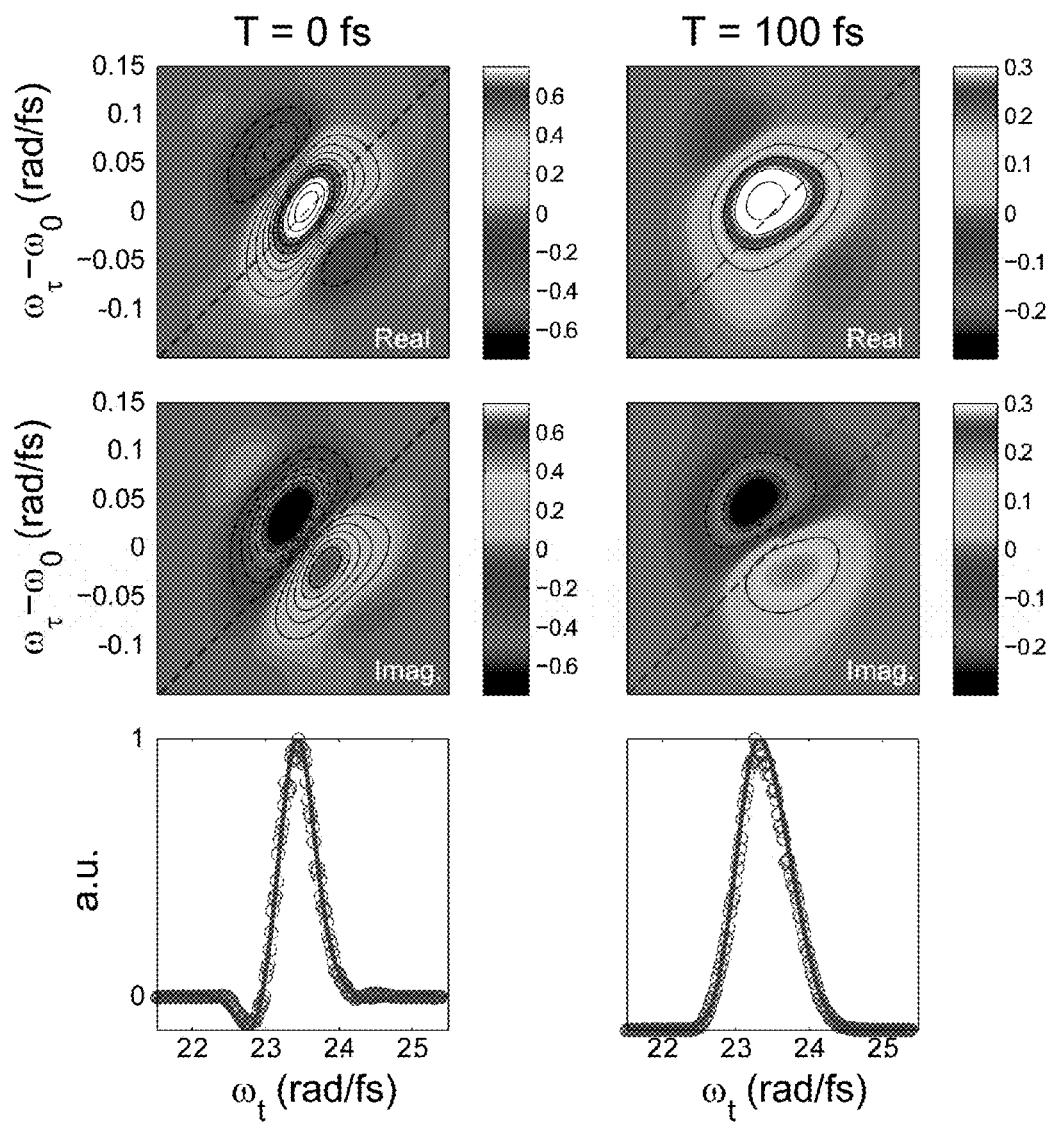
FIG. 12 illustrates Correlation Maps of the Electronic Structure. Rephasing real (top) and imaginary (middle) 2D spectra of 0.4 mM IR-144 in methanol at T=0 and T=100 fs are shown. Contour lines are shown at 10% increments of the T=0 real maximum signal. The data is phased (bottom) by matching the projection of the real part of the spectrum (curve) to spectrally resolved pump-probe measurements (circles).
Figure 13:
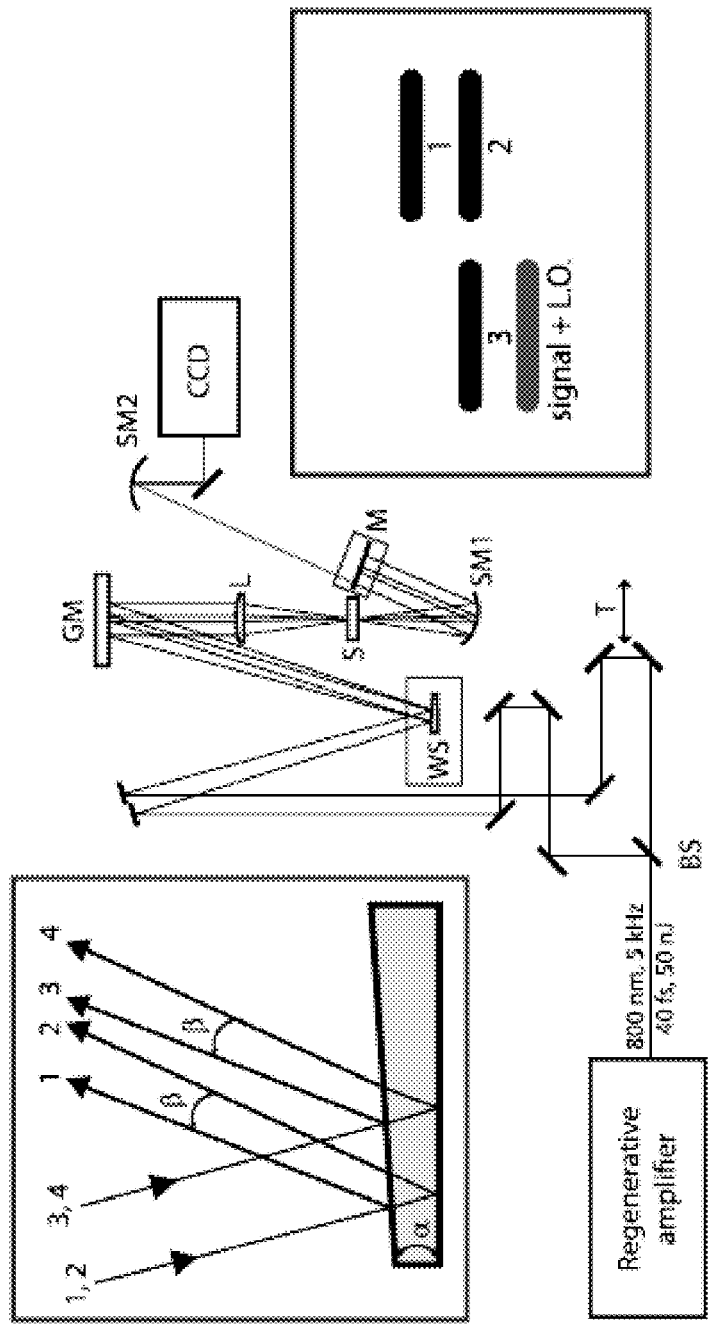
FIG. 13 illustrates an example optical setup of the GRAPE apparatus. The top left inset shows the generation of four pulses from the front and back Fresnel reflection of a wedged substrate, where α is 0.5 degrees and β is 1 degree. The right-most inset shows the beam geometry at the spatial filter.
Figure 14:
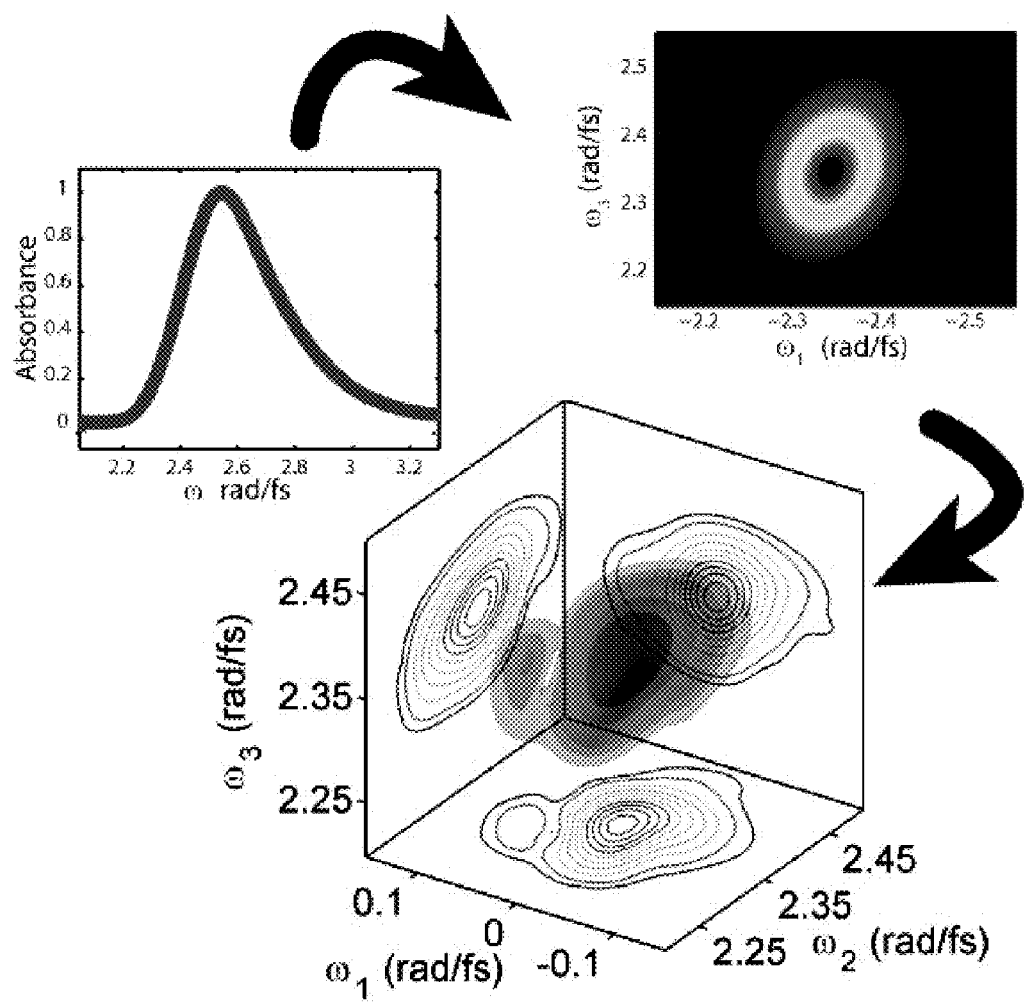
FIG. 14 illustrates the extraction of information from a linear (one-dimensional) absorption measurement, a two-dimensional Ultrafast Spectroscopy measurement, and a nonlinear coherent multidimensional spectroscopy measurement.

In an example implementation, the technique was used to measure the two-dimensional spectrum of a solvatochromic dye, IR 144 in methanol, for a range of waiting times. Because of the extensive studies on the ultrafast dynamics of dye molecules, IR 144 provides an important benchmark to compare the present techniques to the multi-scan acquisition schemes that have been employed in 2D optical spectroscopy in the condensed phase. The laser dye IR-144 was dissolved in methanol to create a 0.4 mM solution with an optical density of approximately 0.3 at 800 nm in a 200 µm flow cell. All measurements were taken at the ambient temperature of 21° C. The raw signal was recorded by the CCD camera of IR 144 at ambient temperature. The vertical stripes are a result of interference between the signal and the local oscillator, $k_4$, for each position along the unfocused beam diameter. A Fourier transformation along the horizontal frequency (or wavelength) axis of the CCD two-dimensional data lead to a τ–t plot that contains the spatially encoded photon echo. After appropriate apodization to remove the homodyne signal peak, a 2D Fourier transformation generates the 2D spectrum shown in FIG. 12 for T=0 and T=100 fs. Separately recorded pump-probe measurements allow phasing of the 2D spectrum to separate the real and imaginary contributions to the signal. Pump-probe fits show a nearly perfect fit to the projection of the real part of the 2D spectrum in accordance with the projection-slice theorem. In agreement with previous reports on IR 144, a small negative feature above the diagonal in the real part of the 2D spectrum at T=0 arises from four-level contributions that couple vibrationally excited states on the ground electronic surfaces. Due to fast relaxation resulting from strong coupling of the vibronic levels to the solvent, cross peaks connecting different vibronic levels are poorly resolved at T>0. The narrower linewidth in the antidiagonal direction compared to the homogeneous limit at T=0 demonstrates the ability to reveal features otherwise inaccessible in inhomogeneously broadened systems. As the system loses memory of its initial absorption frequency at T=100 fs the peak becomes rounder and less resolved although a very small negative feature is still visible above the main diagonal. Finally, the maximum of the center peak in the real part of the spectrum lies below the main diagonal as a result of a Stokes shift due to solvent reorganization. We also observed a small negative feature below the diagonal at T=0, which arose from four-level contributions with negative dipole moment products, but until now have not been seen in experiment. The ability to resolve this feature, which is attributed to solvent memory effects (vibrational narrowing) at very short times, results from the excellent signal-to-noise offered by the present techniques.

Only the rephasing contribution to the 2D spectra was recorded in this example. For IR 144, the nonrephasing signal contributes very little to the overall two-dimensional spectrum and as such effort was not made to collect it. Simulated 2D spectra of IR 144 show that non-rephasing signal is negligible for negative delays beyond the pulse overlap regime. In general, however, for other systems the nonrephasing contribution may be necessary for obtaining purely absorptive lineshapes, rather than phase twisted lineshapes that result from an unbalanced combination of coherence pathways. Unlike point-by-point acquisition, it is not possible, in general, to utilize the spatial region where τ<0 because this region contains mixed population times in the phase-matched direction $k_s^{r,p} = -k_1 + k_2 + k_3$. However, it is possible to observe directly the non-rephasing signal $k_s^{n,r,p} = -k_1 + k_2 + k_3$. We note that a nonrephasing signal can be easily recorded by interfering the emitted signal with a second local oscillator in the direction, $k_s = k_1 - k_2 + k_3$. Heterodyning this signal requires an additional local oscillator, but because of the single-shot nature of GRAPE, phase stabilization is no longer required. In fact, the wedged optic already provides a beam in the position of the phase-matched geometry corresponding to the non-rephasing signal. Therefore, incorporating an additional pulse is relatively straightforward. Furthermore, since only a small area of the CCD sensor is used for rephasing signal detection, another area of the sensor can be used to record the nonrephasing signal simultaneously. Owing to the reduced phase stability requirements needed with the GRAPE method, addition of a local oscillator does not require the use of common mirrors and can be done with conventional beam splitters and steering optics. An additional mirror may be introduced to collect the nonrephasing signal. This approach provides an additional savings in signal acquisition time.

2D Spectra of IR144

Figure 8:
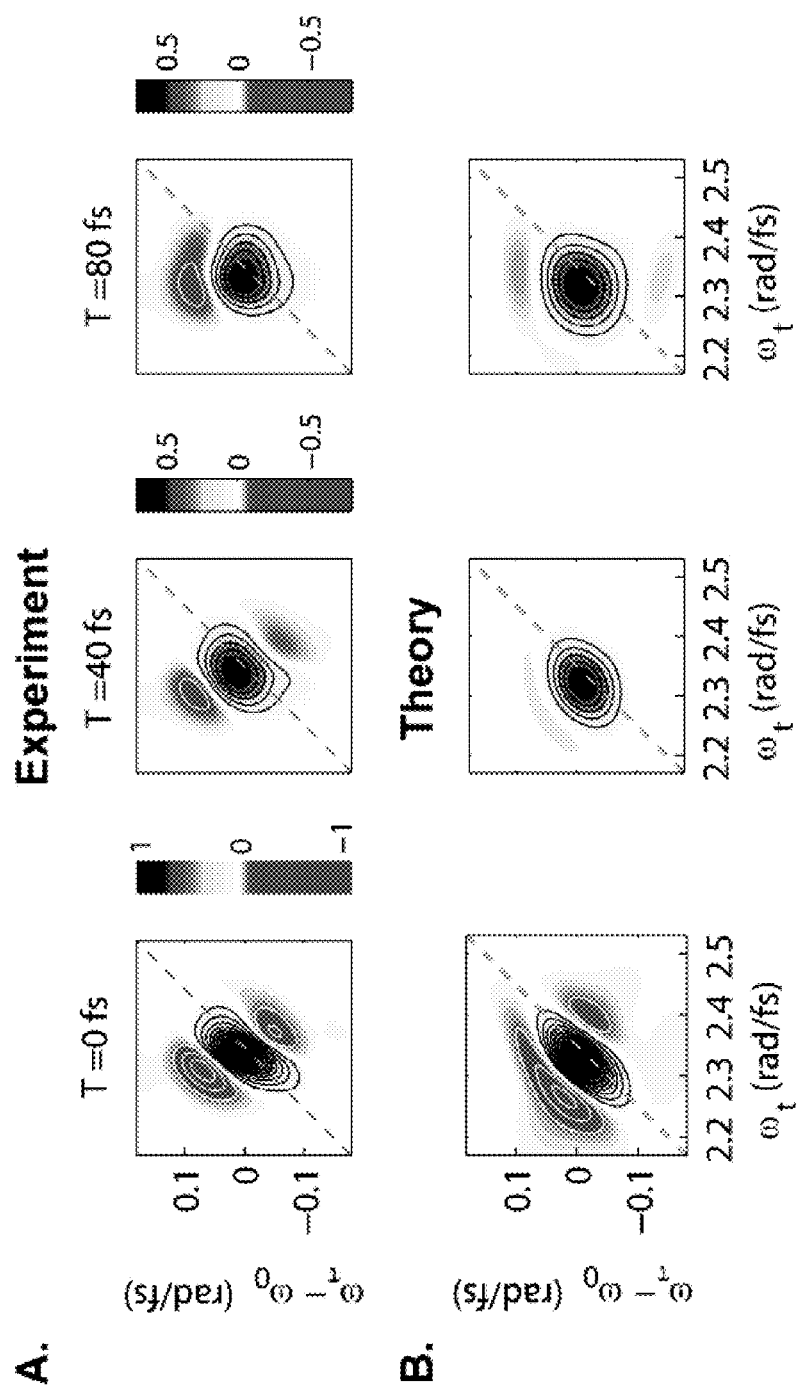
FIG. 8A illustrates the Experimental Rephasing 2D spectra. Real part of rephasing 2D spectra of 0.4 mM IR-144 in methanol at T=0, 40, and 80 fs. Contour lines are drawn at 10% increments of the T=0 real maximum. Negative amplitude is represented by dotted contours. The vertical dimension is given by $\omega_\tau - \omega_0$ because the coherence frequency is detected in the rotating frame. Deviation of the central peak from the diagonal (dotted line) results from a dynamic Stokes shifted emission.
FIG. 8B illustrates the theoretical rephasing 2D spectra. Calculated real part of the rephasing 2D spectra of IR-144 in methanol at T=0, 40, and 80 fs are shown. Contour lines are drawn at 10% increments of the T=0 real maximum. Negative amplitude is represented by dotted contours. The calculation used 40 fs transform-limited pulses centered at 807 nm.

Once the absolute phase of the spectrum is determined, the real part of the rephasing spectra is generated as shown in FIG. 7A and FIGS. 8A and 8B. In agreement with previous reports on IR 144, a small negative feature above the main diagonal is observed in the real part of the 2D spectrum at T=0. This feature can be attributed to four-level contributions that involve vibrationally excited states on the ground electronic surface. At room temperature, cross peaks are poorly resolved due to fast relaxation relative to the pulse duration resulting from strong coupling of the vibronic levels to the solvent. Because GRAPE employs a photon echo spectroscopy, a narrower linewidth in the antidiagonal direction is observed compared to the homogeneous linewidth at T=0. At T=40 fs, the system begins to lose memory and the diagonal peak becomes rounder. That is, transition energies during the initial excitation period quickly lose correlation as the bath motions induce spectral diffusion. By T=80 fs, transition energy correlation between absorption and emission completely disappears and the slope of the center peak nears zero. In FIG. 7B, simulations of the rephasing part of the 2D photon echo spectra are shown. The details of the numerical calculations of the third-order polarization are given elsewhere. Briefly, we model the chromophore as consisting of two electronic states. The transition energy correlation function is then modelled by considering contributions from the solvent as a collection of harmonic oscillators linearly coupled to the chromophore (i.e. a multimode Brownian oscillator model). The solvent contribution contains a fast inertial contribution, which we model as Gaussian, and two diffusive modes modelled as exponentials. The simulated spectra reproduce all the major features of the experimental data. A small negative feature is observed below the diagonal in both the experimental and simulated data at T=0. This feature has not been previously observed in experimental spectra of IR144 in methanol. Also, not observed experimentally, but reproduced in the simulations, are small negative features above the main diagonal for population times greater than T=20 fs. We believe our ability to resolve these features stems from the significantly higher SNR offered by GRAPE, primarily in the reduction of so-called multiplicative noise, compared to point-by-point acquisition protocols. In multi-scan 2D spectroscopy, parametric sampling of $\tau$ is susceptible to multiplicative or $t_1$ noise in the NMR jargon, so named because it primarily affects the indirect dimension (i.e. $\tau$ dimension in 2D PE or $t_1$ dimension in 2D NMR) of 2D spectroscopic experiments. Primarily in the form of phase errors, $t_1$ noise may be transferred to the emitted signal as a result of sample fluctuations, ultimately leading to line broadening and reduced signal-to-noise in the spectrum. GRAPE eliminates problems that arise from non-uniform temporal sampling or fluctuations in laser power, temperature, alignment, index of refraction, or laser spectrum. A quantitative analysis of $t_1$ noise in GRAPE versus multi-scan acquisition schemes will be the subject of a future publication.

Another potential artifact arises from the non-uniform spatial profile across the unfocused beam waist. Since the signal is proportional to the third power of the electric field, the beam profile will act to weight $\tau$ points differently. However, this effect can be corrected for in the post-processing, provided sufficient SNR. Furthermore, one can create flattop beam profiles, eliminating this effect entirely, and one can even exploit it as an apodization mechanism for enhanced resolution. For certain embodiments described herein, the spectrometer used to record the spectra was designed for spectroscopic rather than imaging applications. Therefore, the echo signal emitted from the sample in the form of a line and imaged onto the spectrometer entrance slit does not properly focus onto the imaging plane of the CCD camera. Curvature-of-field effects further distort the echo shape and ultimately give rise to spectral broadening in the 2D spectra. This effect can be minimized through use of a different spectrometer.

Pulse Power

While the present spectroscopy techniques herein are able to achieve a reduction in acquisition time by spreading the beam across the sample, there is a cost of increased pulse energy, in some examples. Owing to the reduced phase stability requirements needed with the GRAPE method, addition of a local oscillator does not require the use of common mirrors and can be done with only conventional beam splitters and steering optics. For example, for a 6 mm beam waist, the additional pulse energy required is a factor of 100 compared to a beam focused to 60 $\mu$m. However, since most 2D experiments operate in the weak-field limit, the additional pulse power is easily achievable. In the above-examples, the output power of the regenerative amplifier was attenuated by more than $10^4$. Therefore, even outside the fundamental laser frequency of the amplifier output, ample power exists to run GRAPE at other wavelengths after passage through an OPA, which typically achieves efficiency in the range 5%-10%.

We note that while the minimum exposure time of our CCD camera prevented acquisition of the 2D spectrum in a single laser-shot, GRAPE can achieve high SNR even in a single laser shot. For IR 144 at T=0, the signal-to-noise (SNR) exceeds 12,500 at the 5 kHz repetition rate of the laser, indicating that a single laser pulse generates an SNR exceeding 170. GRAPE offers several important advantages over multi-scan approaches. Besides the decrease in acquisition time by a factor of about 500, a gain in signal-to-noise of the single-shot 2D spectrum over the multi-scan 2D spectrum exists due to an actual reduction of the overall noise from the sample. In multi-scan 2D, the indirect dimension is susceptible to what is known in magnetic resonance (MR) as $t_1$ noise, so named because it primarily affects the indirect dimension (i.e. $\tau$ dimension in 2D PE) of 2D spectroscopic experiments. As a result of fluctuations of the sample due to the environment and of instability in the experimental apparatus, $t_1$ noise may be transferred to the emitted signal. This noise is especially important to consider in Fourier experiments where phase errors cause distortion of the spectrum, primarily in the form of line broadening and reduced signal-to-noise. These phase errors may arise from non-uniform temporal sampling or fluctuations in laser power, temperature, alignment, index of refraction, or laser spectrum. A quantitative analysis of $t_1$ noise in GRAPE versus multi-scan acquisition schemes will be the subject of a future publication.

GRAPE is inherently phase stable because of its single-shot nature. All other 2D methods to date must maintain phase stability of the pulses that generate the 2D spectrum to reduce the $t_1$ noise, either passively or actively, which can significantly increase the complexity of the experimental apparatus. The most pressing limitation of these multi-scan methods is the stringent environmental stability needed throughout the duration of the sampling, specifically with regard to temperature, humidity and vibration. GRAPE significantly relaxes the otherwise necessary environmental controls since all the simultaneously sampled points in the sample experience identical environments during any given laser pulse. Additionally, many important biological samples are either not viable for more than a few minutes at room temperature or demonstrate interesting dynamics on these timescales, precluding interrogation with multi-scan acquisition schemes. Combined with a significantly simplified optical setup, GRAPE has the potential to bring 2D optical spectroscopy into the kind of widespread use currently enjoyed by multi-dimensional magnetic resonance spectroscopy. Unlike MRI, which partitions the sample using magnetic field gradients, GRAPE spectroscopy achieves no loss in signal compared to multi-scan approaches. The orders of magnitude reduction in acquisition time will permit practical implementation of three-dimensional optical spectroscopy to resolve obscured spectral features as well as real-time monitoring of chemical dynamics with fast imaging detectors.

In some examples, the present techniques demonstrate a single-shot method to obtain two-dimensional electronic spectra in real-time. The acquisition time has been shortened from several minutes to a fraction of a second, without loss in signal. In addition, the present techniques are able to achieve a gain in signal-to-noise in the 2D spectrum, e.g., of IR 144, allowing one to observe features previously undetected using point-by-point methods. The inherent phase stability of the present techniques in some examples can eliminate the need for passive and active phase stabilization. Combined with a significantly simplified optical setup, the techniques have the potential to bring 2D optical spectroscopy into the kind of widespread use enjoyed by multidimensional NMR. The orders-of-magnitude reduction in acquisition time permits practical implementation of higher-order optical spectroscopy to resolve congested spectral features as well as real-time monitoring of irreversible chemical dynamics, adaptive materials, and photodamage with fast imaging detectors. Higher-order optical spectroscopy can be used to obtain diagnostic spectra for rapid determination of the presence of known compounds in a given sample. This could be used in security applications, for example. Additional exemplary applications are described in U.S. patent application Ser. No. 12/676,536, International patent application PCT/GB2009/050600, International patent application PCT/EP2009/003274, and U.S. Pat. Nos. 7,760,342 and 7,771,938, which are each incorporated by reference herein in their entirety.

The present techniques may be used for spectroscopic analysis of any number of sample materials. Examples include biologic materials and non-biologic materials, including carbon materials, semiconductors, and various crystalline structures. The techniques may be used to characterize samples formed of small molecules, such as metabolites, fragments of DNA, protein cofactors, as well as samples formed of large molecules, such as proteins, enzymes, double-stranded DNA, carbon nanotubes, and semiconductors nanocrystals. In other examples, sample materials include quantum dots, synthetic polymers, and solar cells.

Example 1

Dissecting Hidden Couplings Using Fifth-Order Three-Dimensional Electronic Spectroscopy We report the demonstration of single-quantum three-dimensional electronic spectroscopy. In an example, the GRAPE technique was used in which the fifth-order nonlinear polarization of the solvatochromatic dye IR144 corresponding to evolution through three sequential single-quantum coherences was measured. GRAPE, which allowed a two dimensional slice of data to be acquired in parallel, permitted a practical implementation of three-dimensional spectroscopy at optical frequencies in a matter of minutes instead of hours. By spreading frequencies into a third spectral dimension, features in the spectra that would otherwise be obscured could be resolved. For IR144, a previously unresolved cross peak originating from high frequency vibronic modes is observed in the spectrum. Theoretical modeling based on the cumulant expansion truncated at second order reproduces the main features of the experimental results. This experimental approach will enable further high dimensional spectroscopic experiments.

Coherent multidimensional optical spectroscopy resolves spectral features hidden or obscured in lower dimensional spectroscopies to access detailed information about couplings, energy transport, solvation dynamics, and coherent dynamics. Analogous to multidimensional NMR, multidimensional optical spectroscopy extracts electronic or vibrational molecular information by separating the polarization response into multiple spectral dimensions. The most common two-dimensional implementation measures correlations among transition energies. Coupled states can then be resolved using cross-peaks in distinct locations on the correlation diagram.

Two-dimensional optical spectroscopy is well established in the infrared spectral region. Infrared wavelengths relax the technical requirements for phase stability enabling higher-order (with respect to the electric field) correlation experiments. For example, transient 2DIR, which performs two-dimensional infrared spectroscopy of a non-equilibrium ensemble created by an actinic pulse, has been used to watch protein folding dynamics and to probe higher order-correlation functions involved in solvation dynamics. More recently, fifth-order three-dimensional experiments have probed high lying vibrational states to measure the anharmonicity in several model systems. Fifth-order three-dimensional spectroscopies offer superior spectral resolution by separating peaks that overlap in lower dimensional signals into a third spectral dimension, resolving individual contributions from overtones and combination bands. The information accessed in fifth-order three-dimensional experiments cannot be obtained from lower order measurements.

In the visible spectral regime, maintaining the required phase stability among all four pulses presents a challenge for three-dimensional Fourier transform spectroscopies due to the long acquisition time. In two-dimensional spectroscopy, phase stability must be maintained only within the first and second pairs of pulses, thereby relaxing experimental constraints. Many strategies have been developed to experimentally maintain phase stability for the duration of these experiments. Diffractive optics have been used to create pairs of phase locked pulses in passively phase stabilized systems, and active phase stabilization strategies using piezoelectric-actuated mirrors and a reference beam to compensate for phase errors have been used. More recently, a diffractive optic in conjunction with a pulse shaper was used to generate four coherent beams maintained for the duration of a ten hour experiment. These point-by-point acquisition strategies increment the time delays among pulses and, for three-dimensional experiments, require many hours of phase stability to collect the data.

FIG. 10 illustrates another example implementation of GRAPE technique. By tilting the pulse fronts of each beam relative to one another we can spatially encode a time delay across a homogeneous sample and spectrally resolve the resulting line of emitted signal onto a two-dimensional CCD array. We note that similar approaches using two pulses have been developed for pulse characterization in single-shot autocorrelators and single-shot frequency resolved optical gating. The present techniques include approaches incorporating multiple pulse and heterodyne detection for phase resolved measurements in the Fourier domain. Other single-shot methods also exist that can provide complementary information on coherence and population dynamics using directional filtering. The present techniques differ, in part, because they directly provide a means to acquire a fully phase-resolved two-dimensional electronic spectrum in a single acquisition. In an example, the GRAPE method enables two-dimensional slices of the signal to be acquired by averaging over a few laser shots. The acquisition rate may be limited by the frame rate of the camera rather than by the signal-to-noise of the data. A three-dimensional experiment therefore requires only eight minutes of phase stability to acquire an entire data set, instead of roughly sixteen hours using a point by point acquisition scheme.

The optical spectroscopy presented here is directly analogous to three-dimensional infrared methods but in the electronic regime. A six wave mixing experiment is conducted with only four pulses by exploiting multiple interactions with the pump beams. The first matter-field interaction promotes the system into a coherent superposition between the ground and excited state, which evolves for a time $t_1$. The second pulse directly converts the system to the conjugate superposition by interacting twice with the sample, which again evolves for a time $t_2$. The final pulse converts the system back to a third coherence which radiates the fifth-order polarization in the phase matched direction. Heterodyne-detection is used to measure the magnitude and phase of the emitted signal. Fourier transforming over the time delays results in a three-dimensional spectrum, which correlates the observed dipole oscillations during the three time delays. This process is succinctly represented by the double sided Feynman diagram shown in FIG. 15B for a two state system. We note that Nelson and coworkers have developed a third-order three-dimensional electronic spectroscopy, which correlates two one-quantum coherences with a double-quantum coherence, to probe electron correlation in GsAs quantum wells. The present techniques may involve only one-quantum coherence and are designed to observe couplings not evident in lower dimensional spectra.

Figure 15:
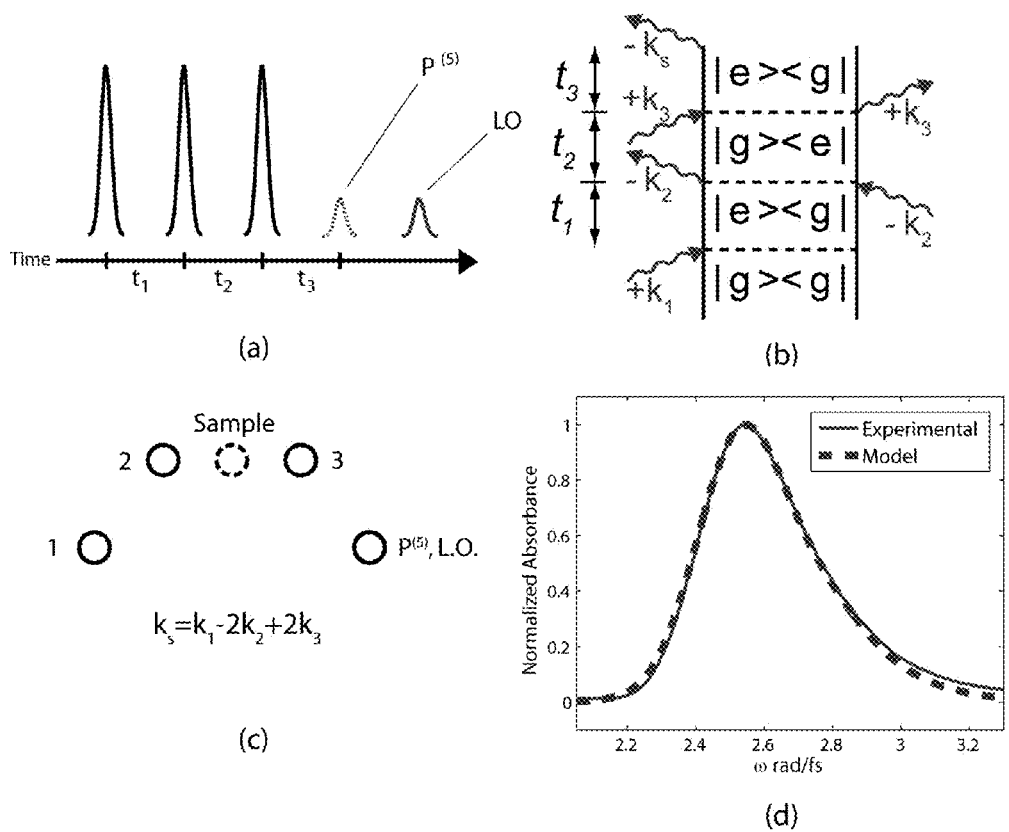
FIG. 15A illustrates an example of an experimental pulse sequence used to detect the fifth-order polarization in the phase matched direction $k_s=k_1-2k_2+2k_3$.
FIG. 15B shows a double-sided Feynman diagram for a two state system for the experimental pulse sequence, where the intermediate populations have been ignored.
FIG. 15C illustrates phase matching geometry and FIG. 15D illustrates absorbance spectra of the model system IR144 in methanol along with the model calculation of the absorbance spectra overlaid.

Experiments were conducted on the solvatochromic dye IR144 dissolved in methanol. The absorbtion spectrum of IR144 is shown in FIG. 15D. The broad tail on the blue side of the absorption spectrum results from coupling to high frequency intramolecular vibrational modes. The polar side chains of IR144 make it a particularly sensitive probe of solvation dynamics. This system has been heavily studied with many third-order spectroscopies, including transient grating, transient absorption, photon echo peak shift, and two-dimensional spectroscopy. These studies have yielded a rich understanding of the vibronic structure and spectral density of the solvent making this sample ideal for developing a new approach to dissect nonlinear polarization responses.

Figure 16:
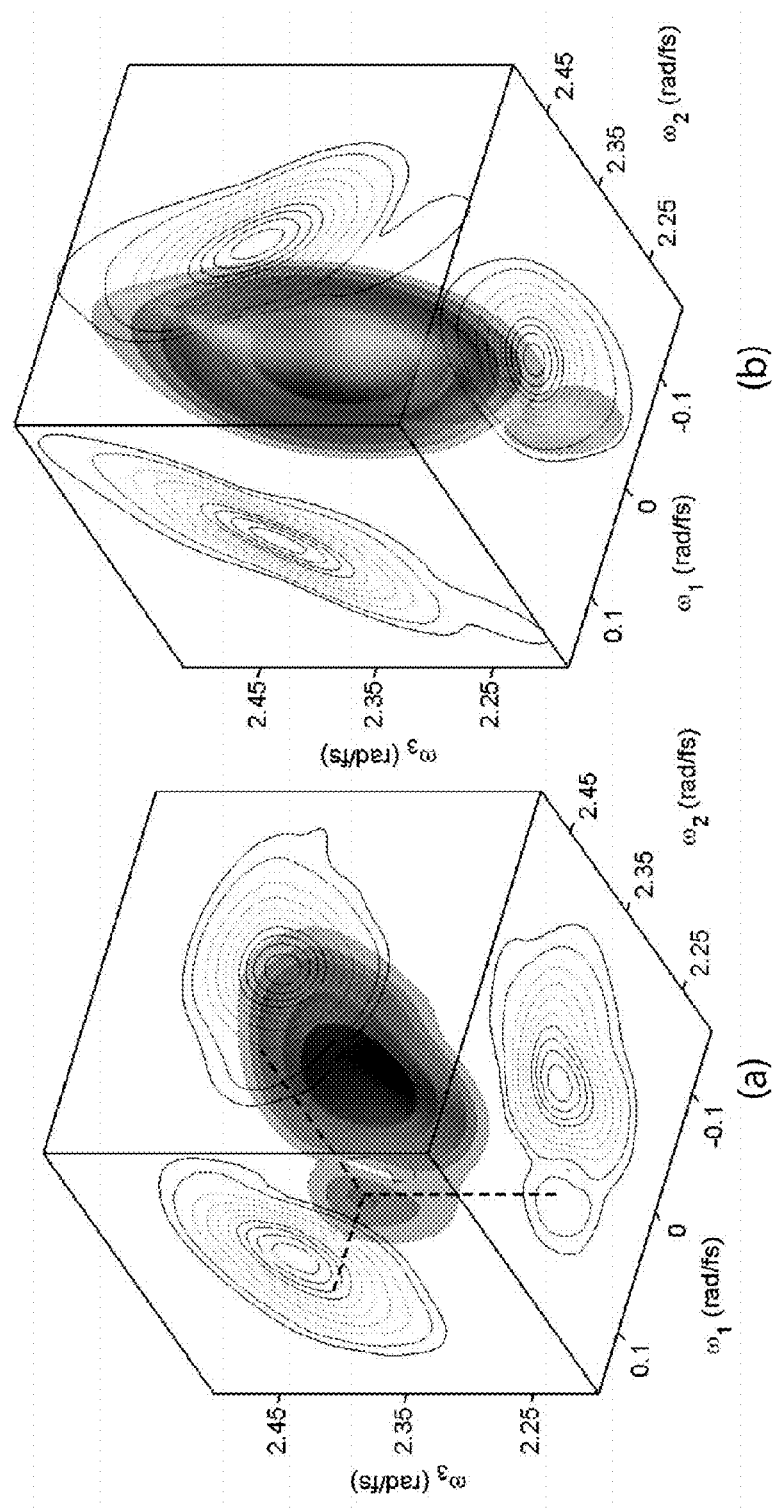
FIG. 16A and FIG. 16B illustrate experimental and simulated isosurfaces of the absolute value of the data, respectively. A vibronic cross-peak is resolved at (0.07,2.32,2.35) (rad/fs). Isosurfaces are shown at 10%, 15%, 20%, 40%, and 60% of the maximum of the absolute value of the signal. The model figure has an additional isosurface at 7%. Contour lines are drawn at 8%, 13% and then in 10% increments of the maximum value of each projection. The $\omega_1$ axis is detected in the rotating frame.[14]

Shown in FIG. 16 are isosurfaces of the absolute value of the data. Phase resolved data is necessary to enable the Fourier transform along the indirect dimensions even though the absolute value of the fifth order spectrum is presented here. This signal falls mainly on the diagonal, which indicates a strong autocorrelation. The slight displacement of the maximum from the diagonal results from a dynamic Stokes shift. A vibronic cross-peak located below the diagonal at ~20% of the maximum signal strength is fully resolved. This spectral feature, which was unresolved in lower dimensional spectra, indicates weak coupling of the electronic transition to high frequency vibrational modes. The cross peak arises when the system is in a vibrationally excited state during the first and second coherence times. Elongation of the signal along the diagonal indicates inhomogeneous broadening signifying that the absorption and emission events are strongly correlated through all three coherence periods. Just as two-dimensional spectroscopy is intimately related to pump probe through the projection slice theorem, a projection of a three-dimensional spectrum along the $\omega_2$ axis yields a zero population time fifth-order two-dimensional spectrum correlating absorption and emission events. We note that the vibrational cross peak is lost when integrating over the new dimension, appearing as a shoulder in the fifth-order two-dimensional spectrum.

Numerical simulations conducted based on Mukamel's response function formalism recreate this vibronic feature. The energy gap correlation includes contributions from intramolecular vibrational modes taken from resonance Raman studies as well as solvent contributions and successfully reproduces the linear absorption spectrum. We use the energy gap correlation function, along with the transition frequency, to calculate the fifth-order response function via the cumulant expansion truncated at second order. While fifth-order spectroscopies are in general sensitive to three point frequency correlation function, the second order cumulant expansion will be exact for systems displaying Gaussian statistics. We note that effects from anharmonic oscillators and higher-order correlations within the bath are not captured within this model. Inertial solvent dynamics are modeled as a Gaussian with a 160 fs time constant and coupling strength of 350 cm$^{-1}$. Diffusive solvent modes are treated as two exponentials with time constants 1400 fs and 11 ps with coupling strengths of 290 cm$^{-1}$ and 280 cm$^{-1}$ respectively. Previous resonance Raman studies are used for the intramolecular vibrational modes and coupling. We adjust the coupling strengths of the two highest modes to be 210 cm$^{-1}$ and 195 cm$^{-1}$. The vibronic contribution is altered to account for vibrational dephasing via the introduction of a phenomenological damping constant. The fifth-order polarization is then calculated with equation (4), in which we have assumed no population evolution within the pulse.

$$P^{(5)}(t_1, t_2, t_3) = \int_0^\infty \int_0^\infty \int_0^\infty R^{(5)}(\tau_1, \tau_2, \tau_3) E(t_3 + t_2 + t_1 - \tau_1 - \tau_2 - \tau_3) E(t_3 + t_2 - \tau_2 - \tau_3)^2 E(t_3 - \tau_3)^2 \quad (4)$$

Shown in FIG. 16 are isosurfaces of the absolute value of the model calculations. The vibronic cross-peak appearing in the signal is reproduced in the model, but the spectral location differs. We find that a single vibrational mode is required to produce the cross peak in our model. Physically, the cross peak arises when pathways involving three distinct coherence frequencies are observed, corresponding to an electronic state coupled to at least one vibrational states. Cross-peaks corresponding to lower vibrational states are most likely present as well, but are not separated sufficiently from the diagonal to be resolved.

Figure 17:
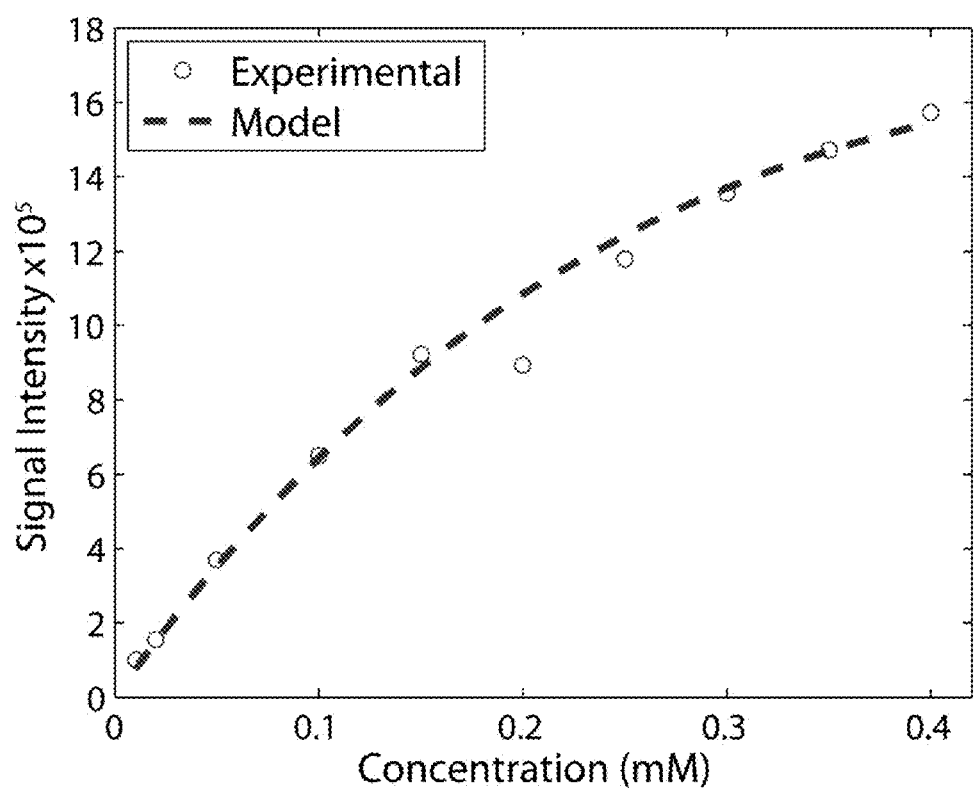
FIG. 17 illustrates the integrated signal strength versus. Agreement between the measured signal and theory indicates that cascades do not contribute significantly to the signal. The two parameter model takes into account the re-absorption of the signal as it propagates through the sample cell.

With any higher order experiment the possibility of competing cascades of lower order processes must be addressed. In fifth-order experiments, cascades occur when a third-order polarization response acts as a pump for a second third-order polarization response, which is radiated in the same phase matched direction as the desired fifth-order signal. In some instances these pathways can compete effectively with the signal such as in early fifth-order Raman experiments of neat liquids. Several strategies have been developed for dealing with lower order cascades. Cascades appear in the same phase matched direction as the desired signal, but the relative magnitude of the process is controlled by the phase matching geometry and optical density of the sample. The cascade pathway requires interactions with two different chromophores; therefore, minimizing the optical density of the sample reduces the contributions from unwanted cascades. The concentration dependence also provides a definitive test for the relative contribution of lower order cascades because cascades increase quadratically with sample concentration while the desired fifth-order signal is linearly dependent on the concentration, for a fixed path length. Our signal intensity as a function of concentration (FIG. 17) definitively shows that cascades do not contribute significantly to the measured signal. Re-absorption of the nonlinear signal as it propagates through the sample causes the deviation from linearity at high concentrations. The plotted theoretical fit to the data includes absorptive effects and provides a good agreement between the measurement and model. While the cascades will be 180 degrees out of phase with the fifth-order signal, and thus destructively interfere with the signal, a simple calculation shows that cascades will contribute less than 3% to the signal at the highest optical density of 0.3. We conclude that, as in the case of resonant fifth-order IR experiments, in the limit of low optical densities, higher-order resonant polarizations in the electronic regime will not be significantly contaminated by lower-order cascades.

Multidimensional optical spectroscopy provides a useful method for peering underneath featureless absorbance spectra to extract detailed dynamical and coupling information. This work shows that higher order experiments can further increase spectral resolution by separating peaks that overlap in lower order multidimensional spectra. Application of this technique to more complicated multichromophoric systems should reveal couplings between electronic states. For example, in photosynthetic light harvesting complexes, high symmetry leads to many degenerate and near degenerate states. This technique improves resolution and permits detailed interrogation of patterns within the static and dynamics disorder. Combining imaging techniques with spectroscopic methods enables a practical implementation of more sophisticated experiments by greatly reducing the acquisition time. Extension of this method by the addition of two more pulses would allow for non-zero population times and extraction of kinetic data. This data permits interrogation of pathway-specific energy transfer mechanisms.

Experimental Details

A seeded Ti:Sapphire regenerative amplifier (Coherent, Legend Elite USP) was used to produce near transform-limited pulses centered at 800 nm (FWHM 30 nm) and of 37 fs duration. The energy per pulse was 220 nJ, and the flux onto the sample was 62 uJ/cm$^2$. The pulse was characterized using FROG to ensure the pulse was free of spatial chirp and pulse front tilt. We note that GRAPE spatially images the pulse front of the beam, implying that spatial pulse distortion effects will result in lower quality spectra if not resolved. IR144 was obtained from Exciton; and a 0.4 mM solution in methanol was prepared immediately before measurements to avoid sample degradation. The flowing sample was pumped through a 200 μm path length flow cell, resulting in an optical density of 0.3. All measurements were performed at ambient temperature of 21 degrees. Timings between pulses were measured using spectral interferometry. A scattering element was placed at the sample location and was then vertically translated to measure the time delay across the sample. This method proved to provide a more accurate measure of the timings as opposed to a single scattering element to measure the timings simultaneously. All timings were measured with respect to beam 4. We note that any error in measuring the temporal gradient between the first two beams simply results in an error in the scale of the frequency axis that is spatially resolved ($\omega_1$) and errors in the timing between beams 3 and 4 results in a rotation of the spectra along the $\omega_2$ axis. The varying spatial intensity across the beam acts as an apodization function, and this effect can be largely removed in post-processing of the data. Unlike point-by-point scanning techniques, the timing between beam three and the local oscillator is not constant due to geometric phase matching conditions. While this difference could be eliminated by routing the local oscillator around the sample, such an approach would result in a more complicated apparatus and would be detrimental to the phase stability.

Model

The response function for a two-level system for the phase matching condition $k_s=k_1-2k_2+2k_3$ has previously been reported. The response associated with all phase-matched fifth-order Feynman diagrams was calculated under the assumptions of the rotating wave approximation, Condon approximation, and the cumulant expansion truncated at second order. The electric fields of the pulses were modeled as 35 fs Gaussian, transform-limited pulses. Population evolution within the pulse is neglected, as well as contributions from higher-order correlation functions. Vibronic contributions were modeled as harmonic coherent nuclear motion with the introduction of a phenomenological damping constant to represent dephasing. In this model, the second order cumulant expansion is exact. Anharmonicity would result in higher-order correlation functions being non-zero.

Example 2

Single-Shot Ultrabroadband Two-Dimensional Electronic Spectroscopy of the Light-Harvesting Complex LH2

Here we present two dimensional electronic spectra of the light harvesting complex LH2 from purple bacteria using coherent pulses with bandwidth of over 100 nm FWHM. This broadband excitation and detection has allowed the simultaneous capture of both the B800 and B850 bands using a single light source. We demonstrate that one laser pulse is sufficient to capture the entire two-dimensional electronic spectrum with high signal-to-noise. At a waiting time of 800 fs we observe population transfer from the B800 to B850 band as manifested by a prominent cross-peak. These results will enable observation of the dynamics of biological systems across both ultrafast (<1 ps) and slower (>1 ms) timescales simultaneously.

In some embodiments, the GRAPE techniques acquire the entire 2D spectrum of a compound 2-3 orders of magnitude faster than by 'conventional' point-by-point methods without any sacrifice in signal and lower overall noise. In these initial reports, we averaged around one thousand laser shots on the CCD to generate high signal-to-noise. In this report, we demonstrate sufficient detection sensitivity to acquire the signal in a single laser pulse which completely eliminates all errors caused from phase instability. We demonstrate this capability by acquiring the 2D photon echo spectrum of the photosynthetic complex, LH2 from purple bacteria at room temperature. In addition, because of the single-shot nature of the GRAPE technique, we are able to utilize unstable coherent light sources to serve as both pump and probe pulses. Using supercontinuum generation we extend the spectral bandwidth of our Ti:Sapphire laser system to over 100 nm FWHM from 30 nm FWHM, sufficient to capture the dynamics between the B800 and B850 rings of the LH2 complex.

Figure 20:
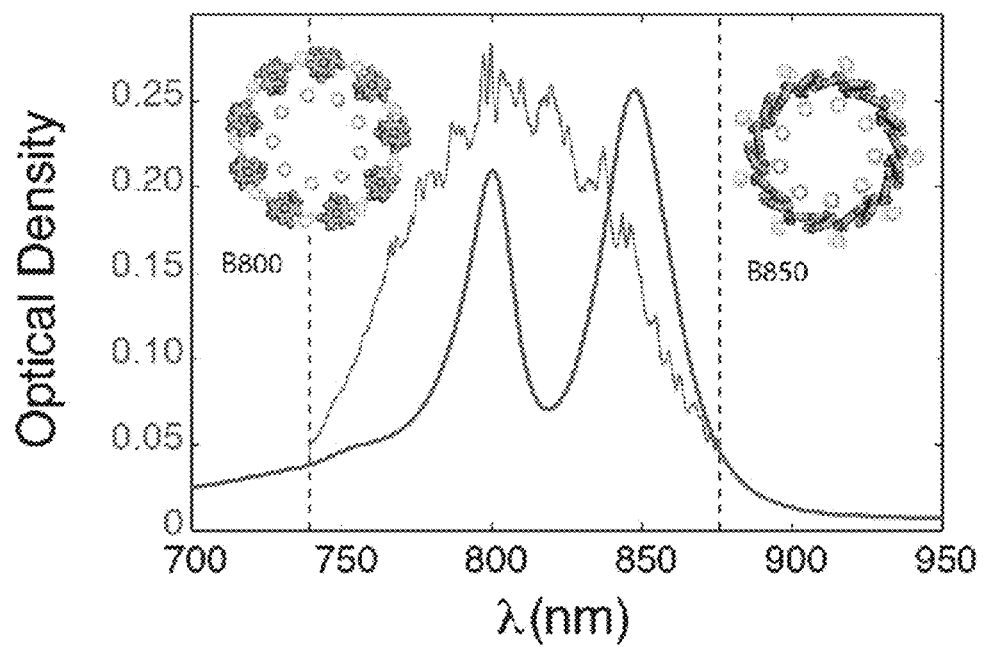
FIG. 20 illustrates an LH2 linear absorption spectrum at room temperature. B800 and B850 bands from the light harvesting complex of the photosynthetic bacterium *Rhodobacter sphaeroides* at room temperature are shown. The continuum-generated pulse spectrum is shown in the top curve. Dashed lines correspond to limits of detections for the grating and CCD combination used in these experiments.

As shown in FIG. 20, the absorption spectrum of LH2 consists of two prominent bands at roughly 800 and 850 nm. These bands are attributed to two rings composed of bacteriochlorophyll molecules sandwiched between the alpha and beta apoproteins of the LH2 nonamer. The B800 ring consists of 9 BChls which lie parallel to the membrane plane, while the B850 ring consists of 18 strongly-coupled BChls which lie perpendicular to the membrane plane. The LH2 complex serves as a broadband accessory antenna to absorb energy from the sun and transfer excitation to the reaction center (RC) where charge separation occurs. Light absorbed at 800 nm is funneled from the B800 ring to the B850 ring before transfer to the LH1/RC complex.

To capture population transfer between these two rings with two-dimensional photon echo spectroscopy, our laser bandwidth must exceed the typical output of a Ti:Sapphire regenerative amplifier system which is roughly 30 nm FWHM. To increase the bandwidth of our excitation, we employ a supercontinuum light source from which we select the spectral range of 750-850 nm. Typically, such a light source would be detrimental to Fourier transform spectroscopy due to poor power and spectral stability. However, using the GRAPE approach shot-to-shot fluctuations are eliminated by capturing the two-dimensional spectra in one laser shot.

Figure 18:
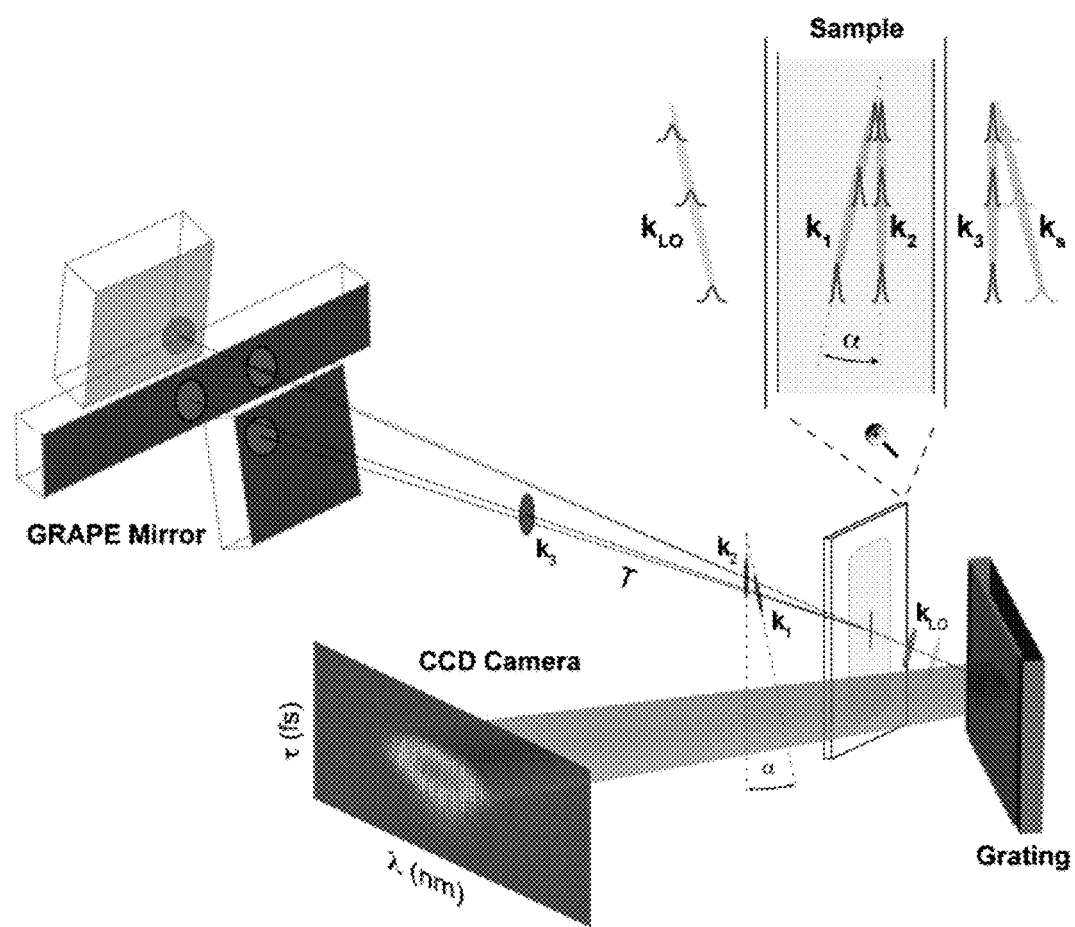
FIG. 18 illustrates a schematic of the GRAPE apparatus in accordance with an example. Four pulses are reflected off three mirrors and focused using a 250 mm cylindrical lens (not shown) onto a 200 μm thick sample cell. The spatially encoded 2D photon echo pulse sequence is shown in the upper-right. The tilt of the wavefronts of each pulse defines the temporal gradient along the beam waist.

Another example implementation of a GRAPE spectroscopy technique is shown schematically in FIG. 18. A single 6 mm diameter pulse from the output of a Titanium Sapphire laser (40 fs, 5 kHz, 800 nm) is focused into a flowing stream of argon gas with a backing pressure of approximately 5 psi to generate a supercontinuum of coherent light. After collimation, the continuum pulse is compressed to under 25 fs using chirped mirrors. The pulse is split into two beams by a beam splitter with a variable delay, T, introduced between the pulses by a standard delay stage. Each of these beams is further split using Fresnel reflections from uncoated glass wedges. The four resulting beams impinge on a mirror assembly in a distorted boxcar geometry. The energy density at the sample was measured at approximately 200 $\mu J/cm^2$ per pulse to avoid multi-exciton generation.

The timings between pulses were determined using spectral interferometry as described by Lepetit et al. Using non-resonant transient grating measurements, we found no evidence for spatial chirp. The timing of beam 1 with respect to beam 2 was set to create a temporal gradient from approximately −200 fs to 400 fs across the beam waist, corresponding to approximately 0.6 fs/pixel at the detector. In this example, we created a larger gradient across the beam waist than is required by the maximum rephasing time to avoid artifacts caused by the near-Gaussian intensity profile of the pulse wavefronts. Here, the intensity profiles of all beams are relatively flat near the 0 fs to 150 fs region of the spatially encoded temporal gradient. Beam 3 was aligned parallel to beam 2 to keep population time constant for each single-shot experiment. Finally, beam 4 was aligned to have an opposite gradient relative to the sample compared to beam 1, in accordance with the necessary phase-matched geometry. These four beams define the photon echo pulse sequence shown in the upper right portion of FIG. 18. The first pulse, $k_1$, creates a single-quantum coherence between ground and excited states of the molecule. After a variable delay time, $\tau$, a second pulse, $k_2$, converts the quantum state of the system into a zero-quantum coherence which reflects population dynamics during a waiting time, T. Finally, a third pulse, $k_3$, excites the system back into a single-quantum coherence but with opposite phase relative to the coherence created during the first evolution period. This particular phase matching choice in the $-k_1+k_2+k_3$ direction creates a macroscopic polarization in the sample which is emitted as an echo signal. The signal is then interfered with a local oscillator pulse to retrieve the complex phase evolution during the coherence times. The interference pattern is then spectrally-resolved and detected by a CCD camera. The signal, which is now emitted as a line, is imaged onto the slit of the spectrometer and a two-dimensional map $S(\tau,T,\lambda)$ is recorded. After suitable data analysis which includes removing homodyne components of the signal, Fourier transformation about the coherence time axis results in a two-dimensional photon echo spectrum $S(\omega_\tau,T,\omega_t)$.

LH2 was isolated from *Rhodobacter sphaeroides* cultures as described by Frank et al. Sufficiently pure samples suitable for spectroscopic investigation required two sequential runs through a DEAE-Sephacel column and elute between 500-600 mM NaCl. Samples were subsequently concentrated down to 0.2-0.3 OD at 850 nm in a 200 $\mu$m cuvette. A single pulse from the regenerative amplifier was triggered by manually firing the output Pockel cell inside the amplifier cavity. The camera shutter was open for 1 second to allow capture of the signal with only manual triggering.

Figure 19:
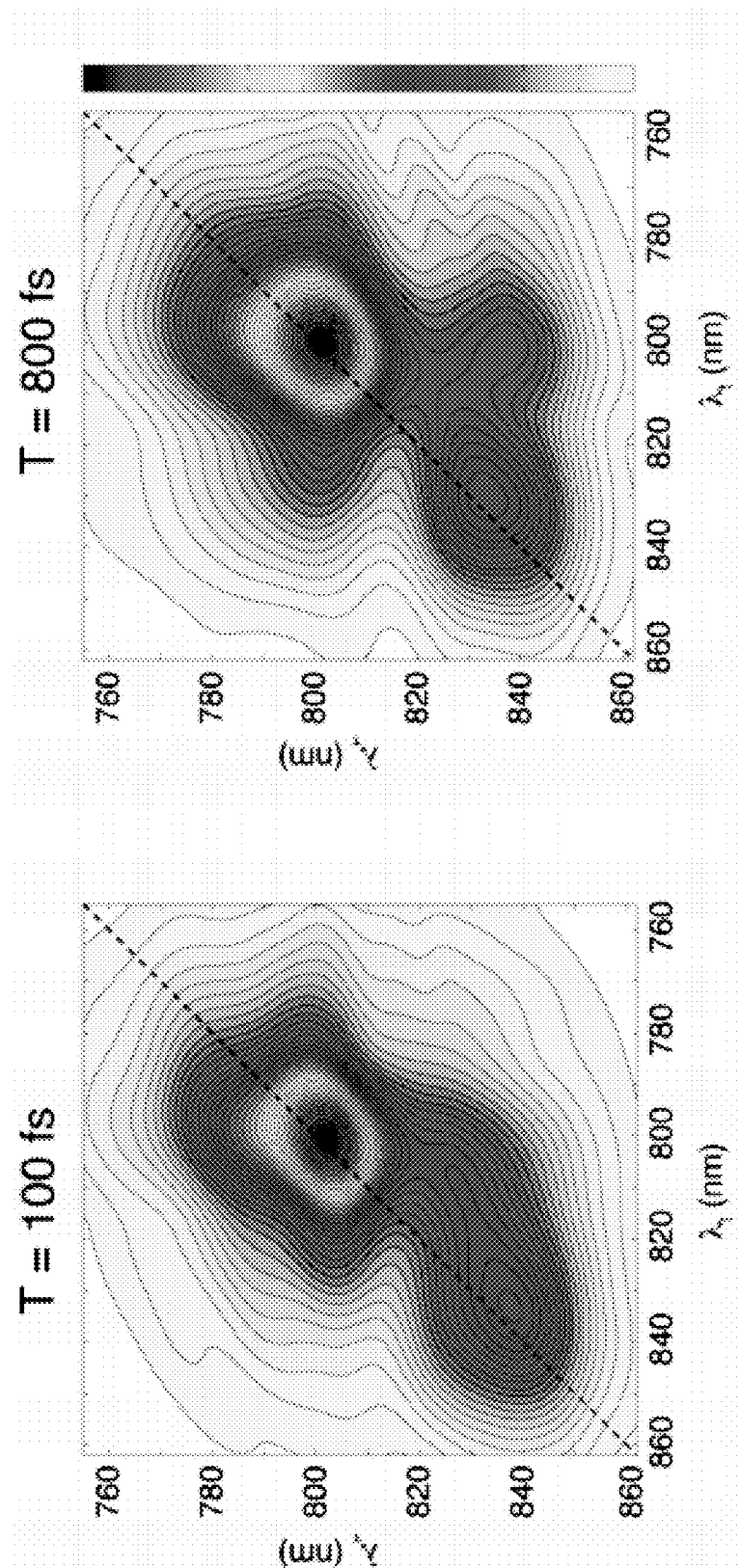
FIG. 19 illustrates rephasing two-dimensional electronic spectra of light harvesting complex 2 (LH2) recorded at T=100 fs and T=800 fs in one laser shot. Absolute value spectra are shown. With spectrally-resolved pump-probe measurements (not recorded here), the absorptive and dispersive portion of the response could be separated. The coherence axis is recorded in the rotating frame.

The two-dimensional rephasing spectrum of LH2 is shown in FIG. 19 at two waiting times, 100 fs and 800 fs. Qualitatively, these spectra are in good agreement with those obtained under lower power and with 100 milliseconds of averaging at 5 kHz. The peaks along the diagonal of the spectrum are representative of the linear absorption spectrum of LH2 convolved with the laser spectrum. A slight shift of the peaks away from the diagonal is representative of a Stokes shift. Note that the coherence frequency was measured in the rotating frame such that uncertainty in the carrier frequency $\omega_0$ led to uncertainty in the position of the diagonal of the 2D spectrum. Use of a well-characterized sample such as Rb vapour should provide an unambiguous determination of the coherence frequency axis and future application of a reference should remove this uncertainty. Consistent with transient gradient measurements on LH2 from *Rhodobacter sphaeroides*, we observed energy transfer between the two rings, B800 and B850, in 0.8 ps as manifested by the appearance of a prominent cross peak in the lower right of the 2D spectra. While we did not perform a quantitative signal-to-noise comparison with other 2D acquisition methods protocols because of the drastically different experimental arrangement of the GRAPE apparatus, the spectrum appeared clean and free of any significant artifacts that would otherwise be expected with a point-by-point acquisition protocol. It should also be noted that the signal-to-noise could be significantly improved by shortening the exposure time to its minimal value. This change would decrease the noise significantly and allow more moderate pulse powers to be used. While only the rephasing spectrum was recorded in these experiments, in principle, GRAPE is capable of recording the non-rephasing spectrum in parallel by utilizing another area of the CCD detector and a separate local oscillator in the appropriate phase matched direction.

Thus, for this example, the first 2D photon echo spectrum simultaneously capturing both the B800 and B850 bands for LH2 was achieved. The use of GRAPE spectroscopy allows for the acquisition of the spectrum in only one laser shot, completely eliminating the need for phase stability and opening up the opportunity of excitation by continuum-generated pulses. Such broadband excitation will allow a host of new applications where broad linewidths have precluded the use of multidimensional optical spectroscopy to date. Furthermore, GRAPE spectroscopy requires no specialized optical components such as diffractive optics, pulse shapers, and active or passive phase stabilization. We see this simplification as a large step in making multidimensional spectroscopy accessible to a broader scientific community. Future work will focus on using fast frame rate cameras to capture 2D spectra in real time to observe changes of electronic structure during photodegradation on a millisecond timescale.

Example 3

Supermolecular Interferometry Through Quantum Interference in Photosynthetic Light Harvesting The light harvesting antenna complexes transfer energy from sunlight to the photosynthetic reaction center where charge separation drives cellular metabolism. During the initial events following absorption, pigments transfer excitation energy efficiently in a complex choreography of coherent and incoherent processes mediated by the surrounding protein and solvent environment. Using the photosynthetic apparatus as a model, significant efforts are currently being directed toward creating artificial systems for solar energy conversion applications. Efforts to increase the quantum efficiency of synthetic devices stand to benefit greatly from understanding the interplay between pigment, protein, and solvent interactions in natural photosynthetic organisms. In this example, we directly reveal that the LH2 of purple bacteria acts as a molecular interferometer by using quantum mechanical interference between different energy transfer pathways at room temperature. By analyzing long-lived quantum coherence beating patterns between the well-separated ring-like subunits of LH2 of purple bacteria, we constructed spectrally resolved maps of the detuning, dephasing, and the amplitude and phase of electronic coupling between excitons that act cooperatively to optimize the efficiency of transfer in this pigment-protein complex. We observed that relaxation pathways carry different phase, and that these phases can interfere at a product state. This observation suggests a new paradigm to enhance the quantum efficiency of transfer in synthetic systems by exploiting quantum mechanical interference.

LH2, the peripheral antenna pigment-protein complex of *Rhodobacter sphaeroides*, a purple non-sulfur bacteria, is composed of two rings of BChl a pigments known as the B800 and B850 rings according to their respective room-temperature absorption bands in the infrared region of the spectrum (FIG. 20). These pigments are held in place by noncovalent interactions with pairs of low-molecular weight apoproteins. In most bacterial species, the LH2 complex consists of eight or nine of these protein heterodimers ($\alpha\beta$) arranged in a ring with a remarkable degree of structural symmetry and organization. LH2 increases the effective cross-section for photon absorption from the solar spectrum in the membrane of purple bacteria. The energy absorbed by LH2 passes through another light-harvesting complex (LH1) tightly associated with the photosynthetic reaction center, wherein a stable charge separated state forms that ultimately drives the production of ATP.

Numerous time-resolved experiments have measured energy transfer from the B800 to B850 ring in under a picosecond at room temperature. Förster resonance energy transfer (FRET) theory estimates a much slower transfer time by approximately a factor of 5. Close examination of electronic coupling between pigments within each ring reveals, in part, the origin of this discrepancy. Studies on the excitation of the B850 ring indicate the existence of Frenkel excitons, delocalized excitations that persist across several pigment molecules depending on the degree of structural symmetry present. In the limiting case, excitation is delocalized across the entire ring implying that a fundamental assumption in FRET theory that the distance between donor and acceptor is large with respect to their size is no longer valid. A large number of theoretical works have modified Förster theory to treat the multi-chromophoric nature of the pigments in LH2. Most saliently, these works have identified the importance of system-bath coupling which acts to modulate the spectral overlap of donor and acceptor in optimizing the transfer efficiency. Many of these attempts use experimentally determined line shapes along with phenomenological models to determine electron-phonon couplings and extent of system disorder. Unfortunately, lineshape fitting assumes functional forms not necessarily appropriate for complex, multi-chromophoric systems. Ambiguities in the source of spectral broadening arise because different types of disorder (e.g. diagonal and off-diagonal) are consistent with the experimentally determined spectra. In addition, the line shape itself is highly susceptible to experimental artifacts arising from convolution with the laser field that may be difficult to disentangle. Despite these limitations, several attempts to reproduce the experimentally determined transfer rate between the B800 and B850 subunits of LH2 have been made. One notable study is a recent work by Jang and Sibley, which claims that the spectral position of the B800 and B850 bands is optimized for irreversible and rapid energy transfer. However, in part, because of the size and complexity of LH2, they modeled the B800 unit as a single BChl a molecule. Single-molecule work on individual LH2 complexes at 4.2 K show that the B800 unit consists of 5-6 individual bands, putting the validity of such an approximation in question. Furthermore, these theoretical works have ignored the effects of quantum coherence between, rather than within, the two rings. While such effects could, in principle, be incorporated into the models, experimental evidence for such coherence has until now remained elusive. The fact that several strikingly different models of energy transfer in LH2 do indeed reproduce the transfer rate is further proof that more experimental work is needed to understand which aspects of the theory are correct and which need modification. In this example, we report direct experimental evidence for long-lived electronic coherence between the B800 and B850 rings of LH2 at room temperature using single-shot two-dimensional electronic spectroscopy. We find that the strength of coupling between excitons on each ring shows near-perfect correlation to its rate of decoherence. The temporal evolution of the quantum-beating signal directly reveals that LH2 uses quantum mechanical interference to optimize the transfer efficiency.

In this work, we utilize a variant of two-dimensional photon echo spectroscopy (2D PES) to probe the electronic structure and dynamics of isolated LH2 complexes at room temperature. 2D PES spectrally resolves both the coherence and rephasing portions of the system response originating from the multiple Feynman pathways that contribute to the echo signal. In this work, we employ continuum generation to excite and probe the B800 and B850 bands simultaneously, coupled with a single-shot version of 2D PES, as the GRAPE technique, which mapped coherence delays onto a spatial axis of the sample resulting in a parallel acquisition of what would otherwise be individually collected data points. Besides a speedup in acquisition time by 2-3 orders of magnitude, the GRAPE spectroscopy technique was also compatible with supercontinuum-generated white light excitation. Instability in the continuum source leads to detrimental phase errors that hinder point-by-point acquisition schemes. This critical advantage of capturing the 2D spectrum in a single-shot results in a sufficient signal-to-noise ratio (SNR) to observe the small amplitude beating in our data.

Results

Figure 21:
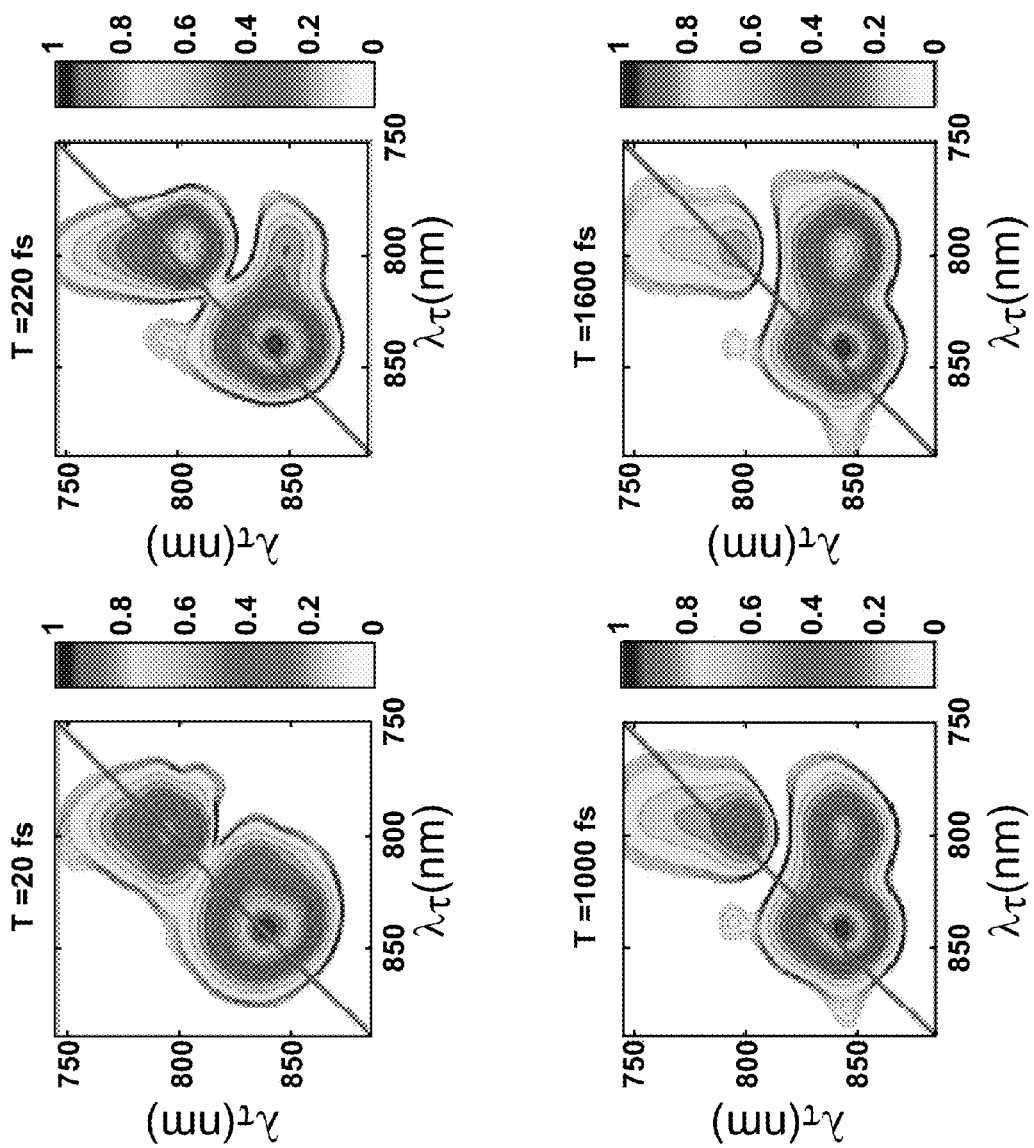
FIG. 21 illustrates a 2D Power Spectra of LH2 at select waiting times. The acquisition time for each spectrum is 200 ms and is displayed normalized to its highest peak value for ease of visualization. The contour lines are displayed in increments of 0.5% from 7.5% to 9.5% and in increments of 5% from 10% to 100% of the signal maximum for each waiting time. Only the absolute value of the 2D spectra is shown even though the complex third-order nonlinear signal is measured owing to ambiguity in the global phase term. This term does not affect the analysis because it is uniform across the 2D spectrum. From previous transient absorption measurements, the large tail of the 800 nm diagonal peak towards the blue edge of the spectrum arises from excited-state absorption. The deviation of the peak maximum near the diagonal of the spectrum is a result of an ultrafast Stokes shift due to solvent reorganization.

The 2D power spectra of LH2 at different waiting times are shown in FIG. 21. At all times measured, the B800 and B850 bands are clearly visible along the diagonal of the spectrum. At early times, features above and below the diagonal become visible. Approaching the energy transfer time, the B800 band diminishes relative to the B850 band concomitant with the appearance of a prominent cross-peak below the diagonal, reflecting downhill energy transfer between the rings. Analysis of the signal on the main diagonal and of the cross-peak below the diagonal is consistent with other time-resolved measurements on energy transfer in LH2 at room temperature (see FIG. 25 through FIG. 27 and discussions thereof). The cross-peak signal above the diagonal does not result from incoherent energy transfer. Rather, its presence lends strong support to electronic coupling between the B800 and B850 units. For a simple dimer system, the cross-peak above the diagonal is proportional to the magnitude of the local transition dipoles, the angle between them, and the degree of delocalization of the excited state, defined as $\kappa \equiv \cos\theta \sin\theta$ where $$\theta = \frac{1}{2}\tan^{-1}\left(\frac{2J}{\epsilon_1 - \epsilon_2}\right) \quad (5)$$

J is the electronic coupling strength between the two chromophores with energies $\epsilon_1$ and $\epsilon_2$.

In the limit of no electronic coupling, the cross-peak above the diagonal exactly vanishes. While this upper cross-peak could also arise from a vibrational manifold of the first electronically excited state in individual BChI a molecules composing the pigments in LH2, its influence on the beating signal at such large values of the detuning is expected to be negligible at room temperature. Finally, the cross peak and beating signals could, in principle, arise from higher excited states (e.g. $k=\pm 3, \pm 4, \ldots$) of the B850 ring because these may be expected to interact strongly with the lower $k=\pm 1$ states. According to the theoretical model of Kruger, Scholes, and Fleming (B. P. Krueger, G. D. Scholes, R. Jimenez, G. R. Fleming, *Journal of Physical Chemistry B* 102, 2284 (Mar. 19, 1998)) and calculations by Jang and Silbey (S. J. Jang, R. J. Silbey, *Journal of Chemical Physics* 118, 9324 (May 22, 2003)) only the upper band states match the energy level differences consistent with the beating frequencies observed in the cross-peak region in the 800-1000 cm$^{-1}$ range. However, all experimental and theoretical work on LH2 to date indicates that these states have negligible oscillator strength. Because the 2D photon echo signal is proportional to the product of four transition dipole moment elements, these higher excited states cannot give rise to a cross-peak with ~5% of the diagonal peak amplitude.

Figure 22:
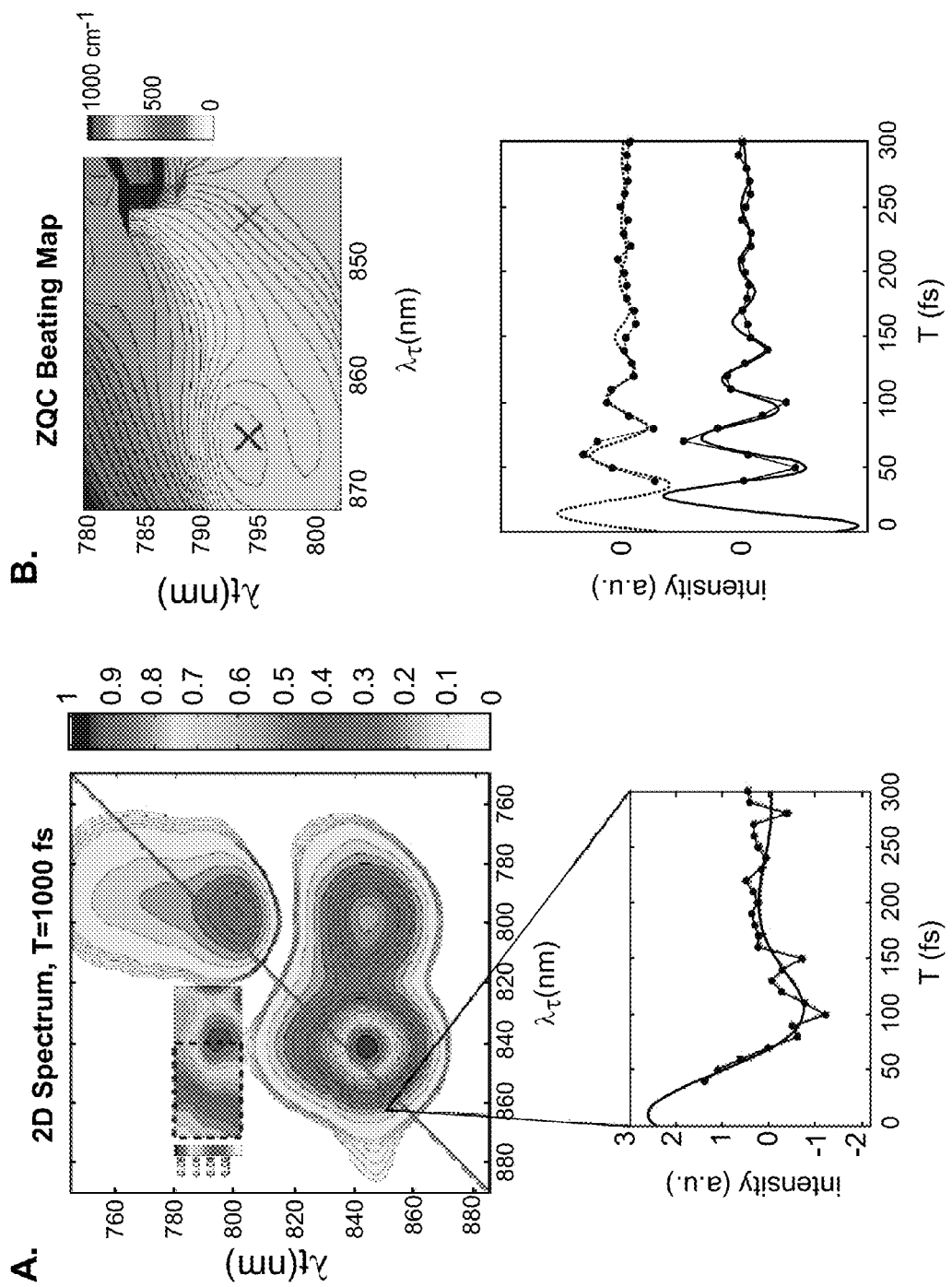
FIG. 22A illustrates a Quantum Beating Signal, with a 2D spectrum at T=1000 fs normalized to its maximum value. The cross-peak above the diagonal is displayed on an intensity scale to highlight features. The signal as a function of the waiting time is shown for the (860 nm, 852 nm) voxel along with a fit to an exponentially decaying sinusoidal function. See FIG. 13 for more information. The bottom of FIG. 22B illustrates the region inside the dashed box of FIG. 23A fit to an exponentially decaying sinusoidal function. At the top of FIG. 22B, the single frequency value of the fit is displayed as a zero-quantum coherence (ZQC) beating map. This map matches the theoretical prediction based on the detuning between coherence and rephasing frequencies to within experimental error. Residual signal (dots with solid curve fit) is plotted after subtraction of an exponential decay for two points in the region of B (x-marks).

A closer look at the upper cross-peak on a different scale is shown in FIG. 22. Contour lines are reliable to well-below the 1% value of the maximum signal in the spectrum. We analyzed the dependence of a portion of the cross-peak (dotted line in FIG. 22A) as a function of the waiting time, T, to look for signatures of quantum coherence. Analysis of only a subsection of the cross-peak above the diagonal is shown because the large amplitude of the diagonal peaks at the tails swamps the much smaller beating signal on the right and lower portions of the upper cross-peak. Analysis of the region marked by a dashed-line box shows strong amplitude beating after subtraction of a single exponential decay. The beating fits nearly perfectly at most regions to the product of a sinusoidal and exponentially decaying function (see FIG. 27 for the error bar map):

$$S'(\lambda_\tau,\lambda_t,T) = A(\lambda_\tau,\lambda_t)\sin(\Omega(\lambda_\tau,\lambda_t)T + \Phi(\lambda_\tau,\lambda_t))e^{-\Gamma(\lambda_\tau,\lambda_t)T} \quad (6)$$

where $A(\lambda_\tau, \lambda_t)$, $\Omega(\lambda_\tau, \lambda_t)$, $\Phi(\lambda_\tau, \lambda_t)$, and $\Gamma(\lambda_\tau, \lambda_t)$ are the amplitude, detuning, phase, and dephasing maps, respectively. Some regions of the upper cross-peak fit slightly better to a sum of two exponentially decaying sinusoidal functions, but we have not pursued this point further in the analysis below. The frequency of beating at each point in the map matches well with the detuning (within ~75%, not including the uncertainty in the carrier frequency of excitation), $$\Omega(\lambda_\tau, \lambda_t) \approx \Delta(\lambda_\tau, \lambda_t) \equiv c\left(\frac{1}{\lambda_\tau} - \frac{1}{\lambda_t}\right) \quad (7)$$

Figure 23:
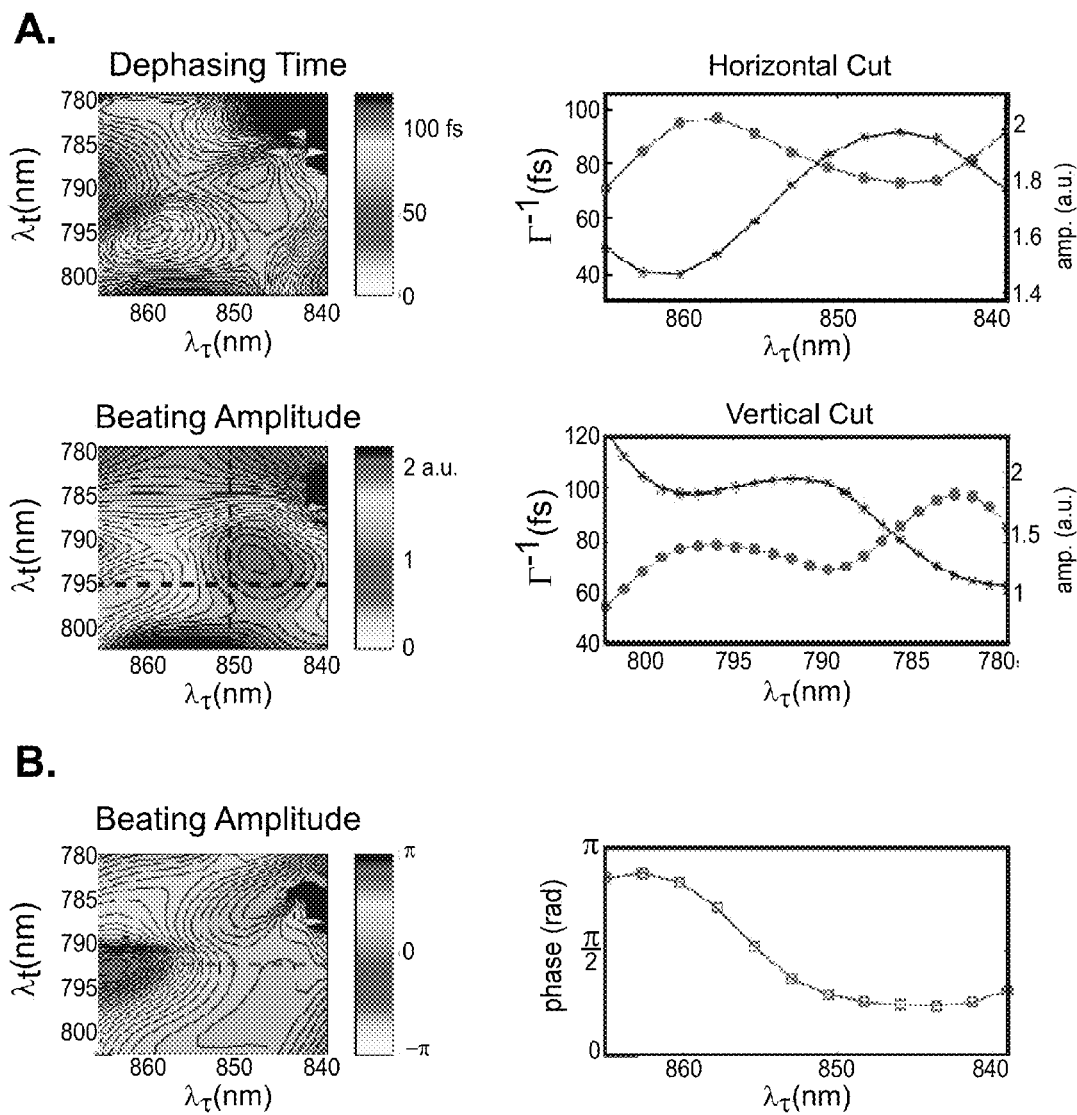
FIG. 23A illustrates some of the primary factors controlling energy transfer optimization in LH2. Dephasing and beating maps in the upper left cross-peak of the 2D spectrum are shown. Maps are derived from fitting each pixel in the 2D spectrum to the functional form described in the text. The dephasing map is a measure of the extent of system-bath interactions during the waiting period. The amplitude map is proportional to the strength of electronic coupling between excitons on each of the two subunits of LH2. Cuts through the dephasing time (top, dashed lines) and amplitude (center, dashed lines) maps showing strong anti-correlation.
FIG. 23B illustrates that the phase map modulates the quantum mechanical interference between different energy transfer pathways. A cut through a fixed value of the rephasing frequency at 794 nm is shown on the right.

In FIG. 23A, maps of the dephasing time ($\Gamma^{-1}$), amplitude, and phase of the fits are shown for the same region of the cross peak above the diagonal as in FIG. 22B. We observe a remarkable degree of structure in the dephasing and amplitude map, each showing multiple local extrema (FIG. 23A). Comparing the maps of amplitude and dephasing time, we observe near-perfect anti-correlation in the signals. The small deviation on the red end of the coherence axis reflects the contribution from the phase term in this region of the spectrum. Two prominent extrema are visible along the coherence frequency axis at 845 nm and 860 nm. Although a definitive assignment is not possible, these positions are close in energy with the $k^a = \pm 1$ excitons of the B850 unit observed by polarization-dependent single-molecule fluorescence excitation spectra at 4.2 K in *Rh. acidophila*. Supporting this assignment, we observe two distinct regions in the phase map shown in FIG. 23B indicating that the two features represent coupling to two different states. Several peaks are also evident along the rephasing direction although it is more difficult to assign these to features observed in the B800 band of single LH2 complexes because of the very short coherence times present at room temperature compared to 4.2 K. Future work at low temperature may help resolve these bands.

The amplitude map is indicative of electronic coupling. The beating signal in the upper cross-peak arises from interference between two Feynman response pathways, one from a ground-state bleach and the other from excited state absorption. These pathways carry opposite signs. In the absence of coupling, the pathways exactly cancel. The amplitude map, therefore, provides a mapping of the electronic coupling terms between excitons at a given frequency weighted by the dipolar interactions with the fields. Although the third-order response includes the product of dipole transition terms and contributions from finite pulse durations, these contributions weigh the photon echo signal relatively equally in this region of the 2D spectrum. Thus, the amplitude maps provides a relative measure of the off-diagonal elements in the coupling Hamiltonian between the two rings. The absolute coupling strength, however, remains an unknown parameter although previous theoretical work suggests that these values lie in the range of tens of wavenumbers.

The presence of the cross-peak above the diagonal is evidence only of an electrostatic coupling which gives rise to B800-B850 coherence at room temperature. However, the system is highly dynamic, such that external perturbations lead to modulations of the coupling strength and energetic detuning, which gives rise to a unique pattern of dephasing. Furthermore, because the system Hamiltonian is diagonal in the excitonic basis set, interactions of the system with its environment leads to nonzero, complex-valued elements in the coupling Hamiltonian. It is these terms that cause quantum-mechanical interference, and along with the specific pattern of decoherence, modulates the quantum efficiency of transfer. Such perturbations can arise from two main sources: the field-matter interaction or the system-bath interactions neither of which commute with the system Hamiltonian. The field-matter interaction persists only for the duration of the pulse, while the system-bath interactions are present at all times. To avoid complications arising from pulse overlap during the excitation, we neglected waiting times under 40 fs in our analysis. The system-bath interaction, in addition to inducing electronic coupling between excitons, also causes the quantum beating to dephase. The dephasing map, therefore, is a direct measure of the degree of decoherence between excitons owing to these interactions. The dephasing and amplitude map show very strong anti-correlation meaning that system-bath interactions which link particular excitons on each ring are also responsible for rapid decoherence. In essence, the bath fluctuations increase the coupling, which causes increase energetic splitting between the excitons and therefore induces dephasing. The environment can, in fact, assist in the efficiency of transport through an interplay of coherent effects and dephasing—an idea supported by recent theoretical work. Microscopically, the protein fluctuation either brings regions of BChl a pigments on each ring close together promoting exciton coupling or alternately gives rise to a change in the dielectric environment which promotes stronger coupling.

Classically, the probability of relaxation would simply be the sum of the probabilities of relaxation through each pathway. Quantum mechanically, the probability of relaxation will be the square of the sum of the amplitudes. This distinction gives rise to a new mechanism for control of excitonic dynamics. In essence, if the complex makes use of such interference, it is acting as a molecular interferometer. The interference is controlled by the phase of the coupling term and leads to a particular pattern of constructively and destructively interfering transfer pathways. Silbey et al. (J. S. Cao, R. J. Silbey, $Journal\ of\ Physical\ Chemistry\ A$ 113, 13825 (Dec. 17, 2009)), and separately, Plenio et al. (F. Caruso, A. W. Chin, A. Datta, S. F. Huelga, M. B. Plenio, $Journal\ of\ Chemical\ Physics$ 131 (Sep. 14, 2009), recognized the importance of the relative phase between coupling terms in simple model systems of closed loops and linear chains of coupled excitons. In particular, they found that systems incorporating closed loops require quantum mechanical pathway interference for maximum efficiency of trapping. By examining a cut through the phase map of FIG. 23B, we measure a phase change of approximately 95°±5° from the $\lambda_\tau$=850 nm region to the $\lambda_\tau$=860 nm region at a fixed value of the rephasing frequency near 800 nm. Based on tentative spectral assignments, we interpret this data to mean that relaxation through the energy transfer pathway to the $k^a$=+1 exciton is acquires approximately $\pi/2$ radians of phase relative to relaxation through the energy transfer pathway involving the $k^a$=−1 exciton. While these two states have mutually orthogonal transition dipole moments, such orientation contributions to the signal should give rise only to a change in amplitude, not phase in the beating signal. The absolute-value of the signal, rather than the complex-valued signal, is analyzed. While eliminating errors from a pump-probe phasing process, which can be oscillatory due heterodyned scatter, this analysis strategy does allow phase differences to appear based on the underlying constant background. Such a background signal cannot be completely excluded, but at short times we see no sharp features that could account for a $\pi/2$ radians phase shift, and we do not see phase evolution during the beating from population dynamics. Supporting this assumption, prior work on LH3 and other photosynthetic complexes consistently show broad, featureless excited state absorption in the upper diagonal region of the.

Figure 24:
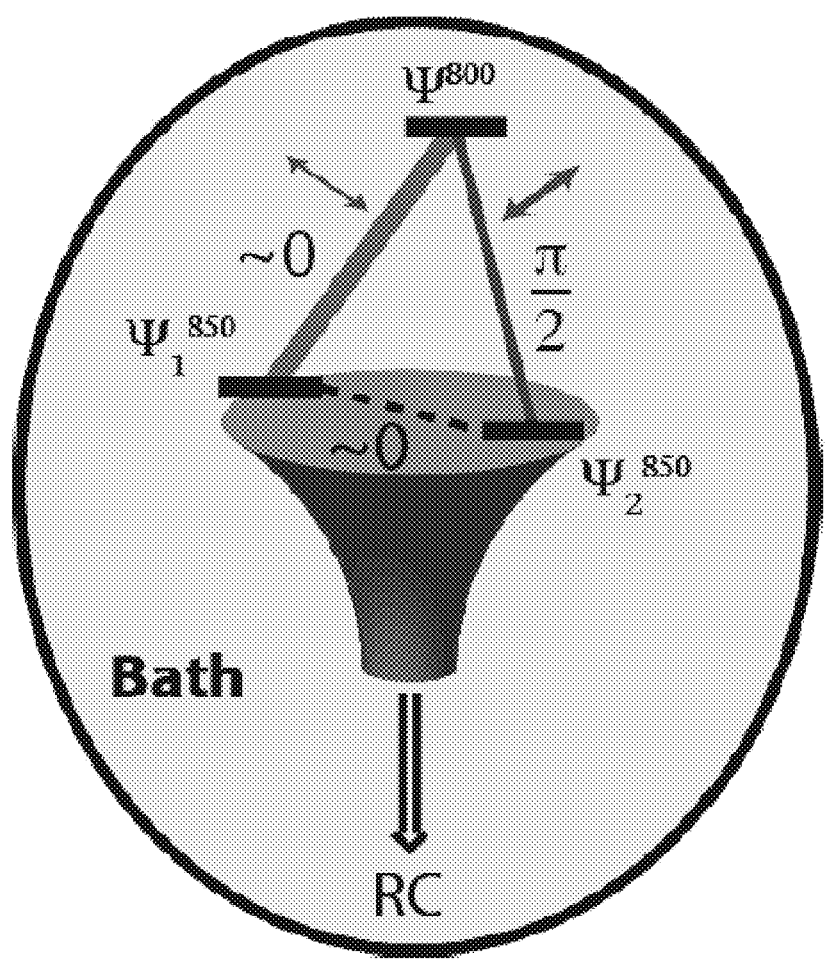
FIG. 24 illustrates a model of quantum phase interferometry. Shown is a three-site closed loop configuration employing the phases of mutual coupling terms that optimize energy transfer to the trap state—the photosynthetic reaction center (RC) or LH1/RC complex. The two states in the B850 ring are presumably coupled by a superexchange mechanism (dashed line), while each state independently couples through dipole coupling to the B800 state. The strength of the coupling is represented by the thickness of the line connecting the states. The arrows indicate the extent of system-bath interactions, which lead to coupling between states. The experimentally determined phase terms are indicated to within 0.1 radians of the values measured.

In the theoretical work of Sibley et al., the relative phase of mutual coupling terms in a three-site model forming a closed loop configuration was analyzed. They found that at large values of the detuning ($\Delta > \Gamma$), the minimal trapping time occurs when the phase of the coupling is either 0 or $\pm\pi$. In that particular case, two states were coupled to a single trapped state, while in the case of LH2 the B800 state couples to two trapped states in the B850 ring. We also observe beating between the two states in the B850 band at the correct different frequency as shown in FIG. 22, supporting the claim that these two states are coupled, presumably by a superexchange mechanism. The relative phase of this coupling term is equal within the margin of error to that between the $\Psi_1^{850}$ and $\Psi^{800}$ states. In addition to the importance of the phase term, we also observe that the two states are not equally coupled to the trap and show a larger dephasing rate with stronger coupling. Because the transfer time is dependent on the coupling strength, this anti-correlation allows the system to avoid back transfer from the trap state. A different coupling strength and dephasing rate connecting these three states will strongly affect the relative phase terms that give rise to maximum efficiency for trapping. Because the system-bath interactions determine the phase, amplitude, and dephasing rates, these results highlight the importance the protein has in optimizing transfer between pigments. A model of the supermolecular interferometery used by LH2 based on the scheme described above is shown in FIG. 24.

These results represent the first direct experimental evidence that LH2 capitalizes on both the phase and amplitude of coupling, on dephasing rate, and on detuning between the two subunits to maximize the transfer efficiency. This strategy very closely resembles the interferometric analogy proposed by Silbey et al. and Plenio et al. wherein two separate paths constructively or destructively interfere at a target site. The phase map of quantum beating signals within LH2 identifies the relationship between various energy transfer pathways that result in efficient trapping at the B850 ring. Because the dephasing time is relatively short compared to the energy transfer time, the transfer is likely dominated by an incoherent mechanism. Nonetheless, quantum mechanics still plays a vital role. More importantly, LH2 offers a paradigm from nature that suggests quantum interference may be of benefit in artificial systems. While it is not obvious whether or not other solutions exist that capitalize on environment interactions for efficient transfer, the particular scheme utilized by nature for LH2 provides near 100% quantum efficiency and represents a successful design strategy for photosynthetic organisms. Further theoretical work will have to examine the efficiency of this scheme relative to correlated or uncorrelated amplitude and dephasing maps. The non-uniformity of the phase maps linking the B800 and B850 units of LH2 hints that optimal design strategies may be utilized to enhance energy transfer in artificial systems using non-intuitive structure-function relationships between the pigments and their surroundings.

In an example implementation, the output of the regenerative amplifier (40 fs, 5 kHz, 800 nm) is focused into a flowing stream of Argon gas to generate a high-power continuum pulse. Using low GVD dielectric mirrors, the 750-870 nm region of the white light spectrum is selected. After collimation, the pulse is compressed by two pairs of chirped mirrors (total GVD is −360 fs2). Single-shot non-resonant transient grating measurements off an optical flat estimate the pulse duration at fewer than 40 fs with a slight degree of positive chirp. Chirp affects the line shapes of the 2D spectrum only slightly for population times less than the pulse duration (45) To minimize the effects of chirp during the coherence time, we discarded the first 25 fs of the spatially encoded $\tau$ points.

After compression, the ultrabroadband pulse is split by a 50:50 beam splitter, and the delay between the two beams, corresponding to the population time, T, is controlled by a motorized translation stage. Using of Fresnel reflections from the front and back surfaces of an uncoated wedged optic, we further split each pulse into a pair by the. Optical flats are employed to balance the dispersion in each path. These four beams are then incident on a mirror assembly to form a distorted boxcar geometry. The LO beam is attenuated by approximately three orders of magnitude and adjusted to arrive ~1.5 ps prior to the signal. After focusing in the horizontal direction due to a cylindrical lens, the four beams are vertically aligned such that the overlap at the sample generates tilted wavefronts that spatially encode the temporal delays across the sample and permit acquisition of the echo signal in the rotating frame. An imaging spectrometer resolves the resulting heterodyned signal onto a 2048×2048 pixel thermoelectrically cooled CCD camera. The resulting interference pattern allows the determination of the phase and magnitude of the third-order rephasing signal. The timings between pulses were determined using spectral interferometry as described by Joffre et al. (Lepetit L, Cheriaux G, & Joffre M (1995) Linear techniques of phase measurement by femtosecond spectral interferometry for applications in spectroscopy. *J Opt Soc Am B* 12(12):2467-2474.). Our data analysis uses a modified procedure of that used for multi-scan two-dimensional spectroscopy as described in detail by Brixner et al. (Brixner T, Mancal T, Stiopkin IV, & Fleming GR (2004) Phase-stabilized two-dimensional electronic spectroscopy. *J Chem Phys* 121(9):4221-4236.). However, without adequate pump-probe data or another external reference, we cannot assign absolute phase to the 2D spectrum. Due to the sensitivity of the third-order response to the laser fluence, we can only present absolute value spectra with confidence. We also note that an inherent uncertainty exists in the absorption frequency axis using GRAPE spectroscopy because tilting the wave fronts to create the pulse delays results in phase evolution in the rotating frame, meaning that the frequencies appearing during the coherence period are measured relative to the carrier frequency of the excitation. While the carrier frequency is straightforward to measure for well-characterised pulses, it has proven difficult to measure for continuum pulses. Nonetheless, we have estimated its value from other measurements on well-characterised systems (e.g. IR144 in methanol) with a negligible or known Stokes shift and assumed little to no change between measurements.

Sample Preparation. LH2 was isolated from *Rhodobacter sphaeroides* cultures as described by Frank et al. Sufficiently pure samples suitable for spectroscopic investigation required two sequential runs through a DEAE-Sephacel column and eluted between 500-600 mM NaCl. Samples were subsequently concentrated down to 0.2 OD at 850 nm in a 200 µm cuvette.

Figure 25:
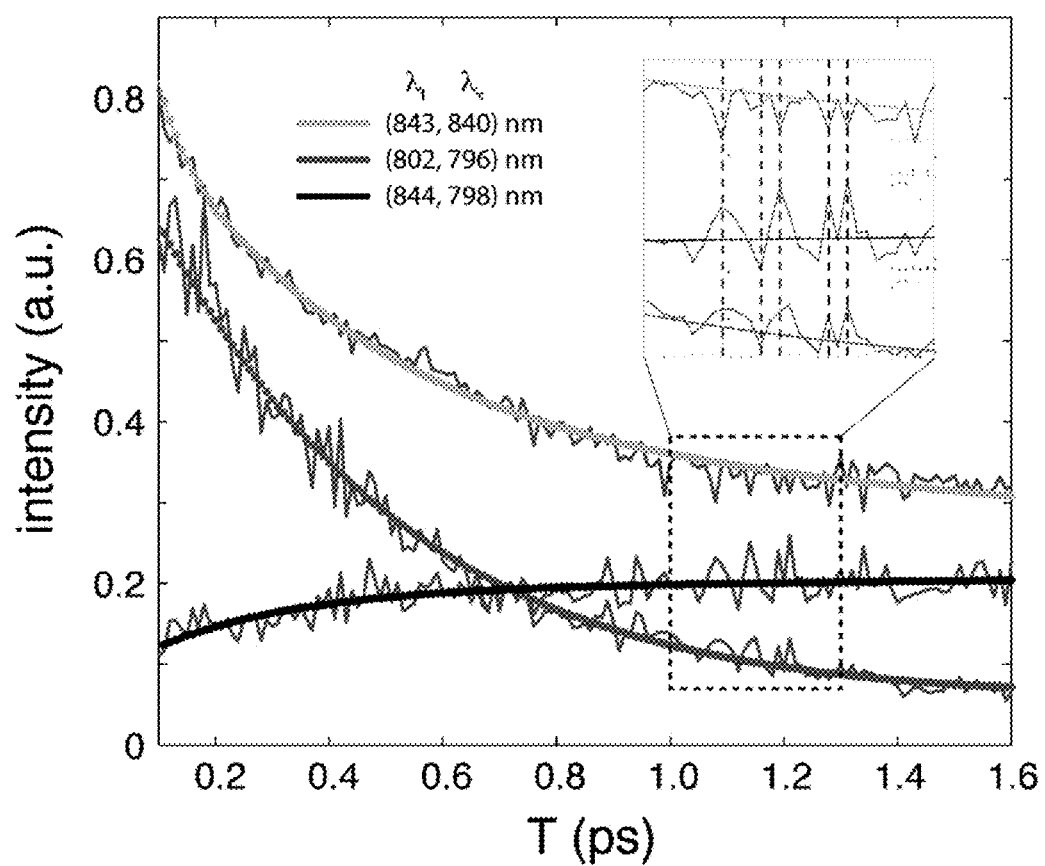
FIG. 25 illustrates the decay of B800 (lower concave up curve) and B850 (upper concave up) bands with waiting time. Fit of B800 to B850 energy transfer (concave down curve). Inset: effects of laser spectral and intensity fluctuations on the 2D spectrum during the waiting time.

Diagonal and Lower Cross-peak Analysis: The waiting time dependence of the diagonal and lower cross-peak are shown in FIG. 25 along with fits to a sum of two exponential decays and a single exponential growth. The 2D spectrum represents the nonlinear response convolved with the laser spectrum, which causes a red shift in the position of the B850 bands. The first 150 fs of the signal are discarded in the fits because of large Stokes' shifts arising from solvent reorganization following excitation. These decay curves are in good agreement with previous transient absorption measurements on LH2 with excitation at 800 nm and either a white light continuum probe or 850 nm probe.

The inset of FIG. 25 shows the effects of laser intensity fluctuations, which are correlated (or anti-correlated) at each waiting time. These arise because the waiting times are sampled parametrically so that at the instant the 2D spectrum is recorded, the spectrally resolved signal fluctuates with the laser intensity fluctuation at each frequency component of the pulse. We regularly observed both integrated laser intensity fluctuations as well as spectral profile changes during the course of the experiment. We estimated that these fluctuations result in roughly 10-20% change in the magnitude of the signal. The effects of such large signal variations would be magnified by orders of magnitude in a point-by-point sampling of the coherence times because the phase of the signal oscillates with the energy level difference between ground and excited states. This is in contrast to the amplitude changes observed during the waiting period, which oscillate with the energy level difference between excitons.

Figure 26:
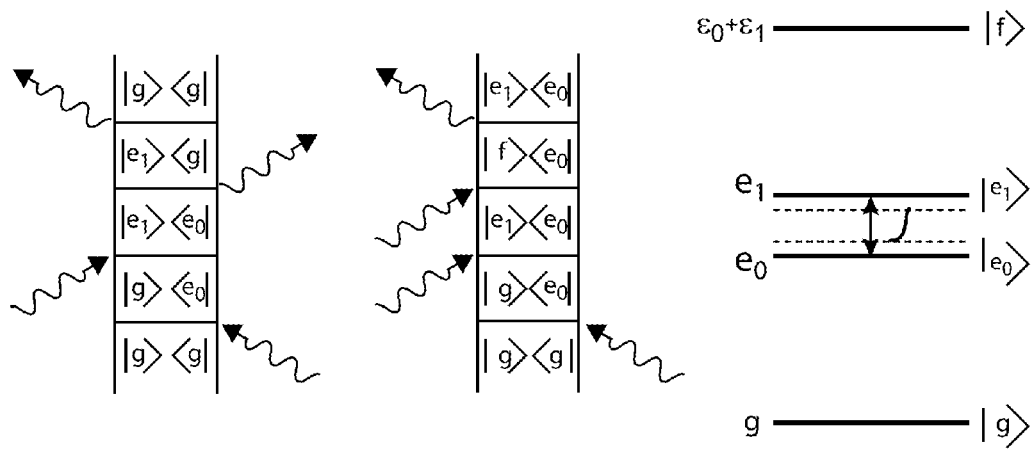
FIG. 26 illustrates Feynman diagrams contributing to quantum beats in the cross-peak of the 2D spectrum. Above pathways correspond to electronic coherence between two coupled exciton states, $|e_1\rangle$ and $|e_2\rangle$. $\in_1$ and $\in_2$ (dashed lines) correspond to the energies in the site representation, prior to electronic coupling. The two-exciton state, $|f\rangle$ has energy at the sum of the two single-exciton energies $f=e_1+e_2=\in_1+\in_2$. In the absence of coupling (J=0), the ground-state bleach and excited-state absorption pathways exactly cancel. The pathways in the bottom part of the figure correspond to pathways from a single chromophore with vibrational states in the ground and first excited electronic states. If the displacement of the excited state potential is zero, these pathways do not contribute to an observable signal.
Figure 26:
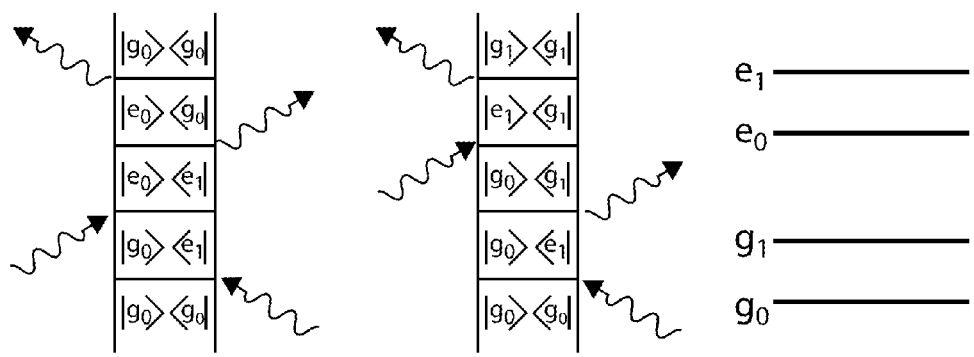

The quantum-beating signal at the upper diagonal cross-peak can arise from two fundamentally different sources—electronic coherence and vibrational coherence as shown in FIG. 26. The former originates from a superposition state of two or more excitons formed by coupled BChl a molecules. Vibrational coherences, which can arise from vibrational states on a single chromophore, also give rise to a quantum-beating signal. In general, these two pathways cannot be distinguished solely based on their spectral position on the 2D spectrum. In the case of LH2 we rule out the possibility of vibrational coherence for the following reasons: first, while vibrational coherence was observed in LH2 at 4.2 K, to the best of our knowledge amplitude oscillations above 200 cm-1 in any nonlinear optical measurement have never been observed at room temperature. There is no inherent reason why our measurement is more sensitive to the beating signal than other third-order measurements such as photon echo, transient absorption, and transient grating spectroscopy. In fact, because the single point detection capability of these methods, 2D spectroscopy, in comparison should be less sensitive when employed in a spectrally resolved fashion as was done here. The strong amplitude of our beating signal is at odds with these more sensitive measurements. Even for isolated BChl a in solution, vibrational coherence does not show beating frequencies greater than a few hundred wavenumbers even when higher frequencies are supported by the excitation bandwidth. While vibrational states on both the ground and excited surfaces are evident at higher energies from Raman spectra of BChl a solutions, the decay rate of nuclear coherent oscillations is expected to increase with higher vibrational modes, while the amplitude of the beating is expected to decrease. At room temperature, low frequency modes owing to the presence of intermolecular modes with clustered solvent molecules have been observed, but these only occur in the 100 cm-1 regime. In LH2 where twenty-seven BChl a molecules are present and there exists a non-negligible degree of static disorder in the vibrational spectrum, vibrational coherences would be even less likely to be observed owing to rapid dephasing. In summary, large amplitude quantum beating signals at room temperature that persist for up to 400 fs with frequencies that range from 800-1000 cm$^{-1}$ cannot arise from intramolecular vibrations on individual BCh a molecules or intermolecular modes resulting from solvent interactions. In LH2, vibrational coherences will decay even faster than for an individual chromophore, precluding their origin as the beating signal we observe in this work.

Figure 27:
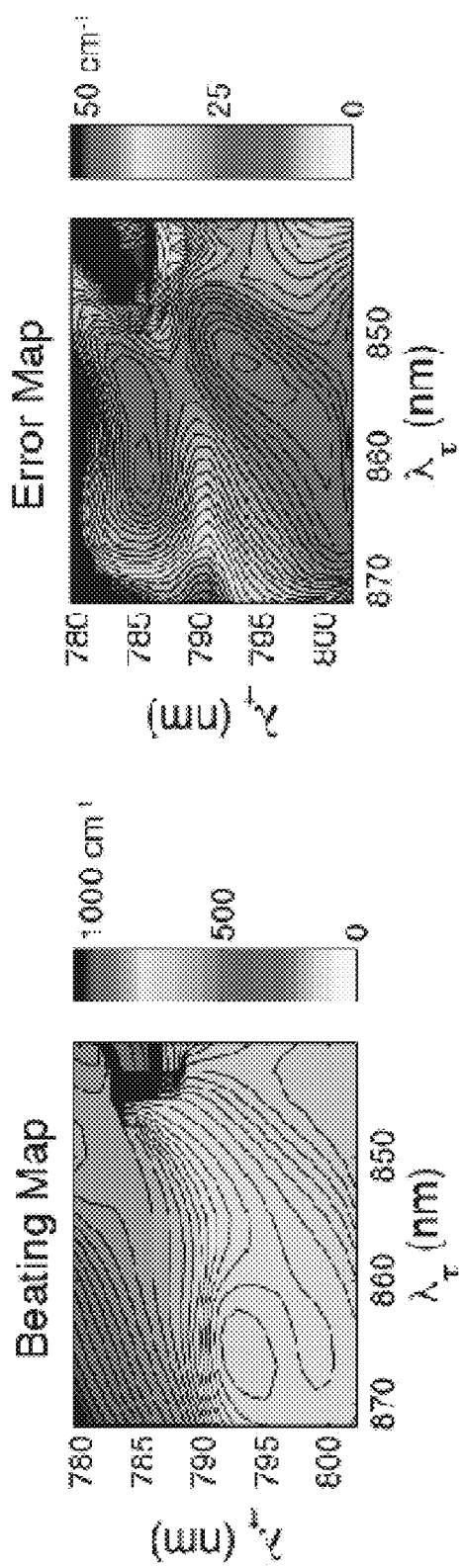
FIG. 27 illustrates a beating frequency map and associated error map corresponding to 90% confidence interval calculated for each point in the AD cross-peak of the 2D spectrum.

Fitting Procedure and Analysis: Each point in the 2D spectrum was first fit to a sum of two exponential decays and constant offset to account for slow dynamics. After discarding the first 40 fs of signal to avoid pulse overlap effects, the residual of the bi-exponential decay with the data was fit to a single exponentially decaying sinusoidal function with a single frequency and phase component. Including the first 40 fs of signal resulted in large errors in the fitting procedure, likely because the coupling induced by the field is much larger than that induced by the bath. The frequency was restricted to within +/−0.015 rad/fs of the difference frequency between the rephasing and coherence frequencies corresponding to a particular point in the 2D spectrum. The phase was bound to lie between −2π and 2π. The values of this initial fit were then used as an initial guess for an unbounded fitting using a nonlinear least squares algorithm. Confidence intervals and covariance matrices were calculated for each fit. An error bar map is shown in FIG. 27.

Example 4

Two-Dimensional Spectroscopy can Distinguish Between Homogenous and Inhomogeneous Dephasing of Zero-Quantum Coherences Recent experiments on a variety of photosynthetic antenna systems have revealed that zero-quantum coherences among electronic states persist longer than previously anticipated. In an ensemble measurement, the dephasing of a coherent state can be explained through a combination of homogeneous and inhomogeneous mechanisms. Distinguishing between these two mechanisms experimentally is paramount for understanding the role that quantum coherence may play in energy transfer through these complexes. In another example, we show that two-dimensional electronic spectra can distinguish these two mechanisms by examining how the quantum beat frequency changes within a cross peak. We find that for the antenna complex LH2 isolated from *Rhodobacter sphaeroides*, coherence between the B850 and B800 rings can be characterized as inhomogeneously broadened, while in the FMO complex from *Chlorobium tepidum* coherence between the first two excitons is homogeneously broadened. Thus, the observed coherence lifetime sets a lower bound for the LH2 complex and both an upper and lower bound for the FMO complex.

Photosynthetic antenna complexes absorb radiation and guide the excitation energy to the reaction center where the energy results in charge separation that ultimately drives cellular metabolism. While the molecular structure of reaction centers is highly conserved across many different species, antenna complexes vary greatly, and the underlying mechanisms of how energy is guided through these systems is currently not fully understood. Recent phase sensitive experiments in a variety of antenna complexes have revealed that coherent mechanisms, in which the system is found in a superposition of excited electronic states, may contribute to the overall transfer efficiency of the complex, and coherence has been shown to persist longer than the initial timescales for energy transfer even at physiological temperatures.

As time progresses, the phase relationship between different members of the ensemble will be lost resulting in a decay in the coherent signal, which is referred to as dephasing. The ensemble experiments contain two mechanisms that contribute to the observed dephasing rate. Static disorder across the ensemble, caused by differences in the microenvironments of the chromophores that do not vary appreciably over the timescale of the experiment, results in a distribution of transition frequencies and is referred to as inhomogeneous broadening. In contrast, homogeneous broadening occurs from interactions of the system with the environment occurring on timescales faster than or commensurate with the experimental timescale, causing the transition frequency of all members of the ensemble to appear identical. This form of broadening provides a true measure of the lifetime of the coherence in question. In contrast, inhomogeneous dephasing implies that although the ensemble dephases rapidly, individual elements of the ensemble, if measured separately, might dephase much more slowly. Distinguishing whether the coherence is inhomogeneously or homogeneously broadened will reveal if the measured coherence lifetime represents either a lower bound or both an upper and lower bound for the timescale of the dephasing. This distinction will aid in the understanding of the relative contribution of coherent mechanisms in photosynthesis.

Various spectroscopic methods are capable of directly quantifying inhomogeneity for excited states in the single-quantum coherence manifold. Hole-burning spectroscopy and the closely related fluorescence line narrowing spectroscopy have been used at low temperatures to measure the inhomogeneous linewidths for a variety of samples. These techniques rely on the approximation of slow spectral diffusion (which is not applicable at room temperature) where homogeneous linewidths tend to dominate broadening in the condensed phase. Photon echo peak shift experiments have also been shown to be capable of separating homogeneous and inhomogeneous spectral diffusion by rephasing of the static inhomogeneity. In some examples, the present techniques use a closely related method, two-dimensional spectroscopy, which correlates absorption events with emission events as a function of a waiting time. Briefly, four non-collinear femtosecond laser pulses are incident on the sample, generating a degenerate four-wave mixing signal in a phase matched direction. During the first time delay the system is prepared into a superposition between the ground and resonant electronic excited states, which evolve phase as a function of coherence time, τ. The next pulse promotes the coherence to a population or zero-quantum coherence which is then allowed to evolve for a waiting time, T. The finial pulse stimulates the emission of the third order response and the time delay between the final pulse and emitted signal is detected a time, t, later. The timings between beams are then parametrically scanned and a two-dimensional Fourier transform is performed over τ and t to generate a two-dimensional correlation spectrum. Coherent signatures between electronic states can be observed in this spectrum by examining how the cross peak amplitude changes with waiting time. If coherence is maintained, the cross peak amplitude will beat at the frequency difference between the excited states damped by the dephasing rate in addition to decaying or growing due to population dynamics (incoherent energy transfer).

Examining how the beat frequency changes at different points within the cross peak can reveal whether the zero-quantum coherence is homogeneously or inhomogeneously broadened. For homogenous dephasing processes, we expect that beating within a cross peak should beat with a single frequency at all points within the cross peak, since we observe only the ensemble average of the beating frequency: $S(T) = \langle \exp(i(\omega_\tau - \omega_t)T) \rangle$. In the homogeneous limit, fast dynamics cause a complete loss of correlation between the observed transition frequencies during the first and third time periods causing the observed difference frequency between them to remain constant. For an inhomogeneously broadened system we considered the slower degrees of freedom in the system that give rise to a static distribution of transition frequencies during the experiment. In this case, the signal is not only a function of time, but also of the observed single-quantum transition frequencies: $S(\omega_\tau, T, \omega_t) = \langle \exp(i(\omega_\tau - \omega_T)) \rangle_{fast}$. In essence, different members of the ensemble show different beat frequencies, and the two dimensional photon echo spectroscopy can resolve these subensembles based on their transition energies. Interestingly, for inhomogeneous dephasing processes, the frequency of the beating should follow the energy difference between the $\omega_\tau$ and $\omega_\tau$ axes. In general, broadening will occur via both mechanisms. By examining the quantum beating at all points across the off-diagonal feature in a 2D electronic rephasing spectrum, we can distinguish between the two processes. For a purely inhomogeneously broadened peak we expect to measure a change in the beat frequency commensurate with the size of the feature, while a purely homogeneously broadened peak will show no dependence of the beat frequency on the location in the cross peak.

Figure 28:
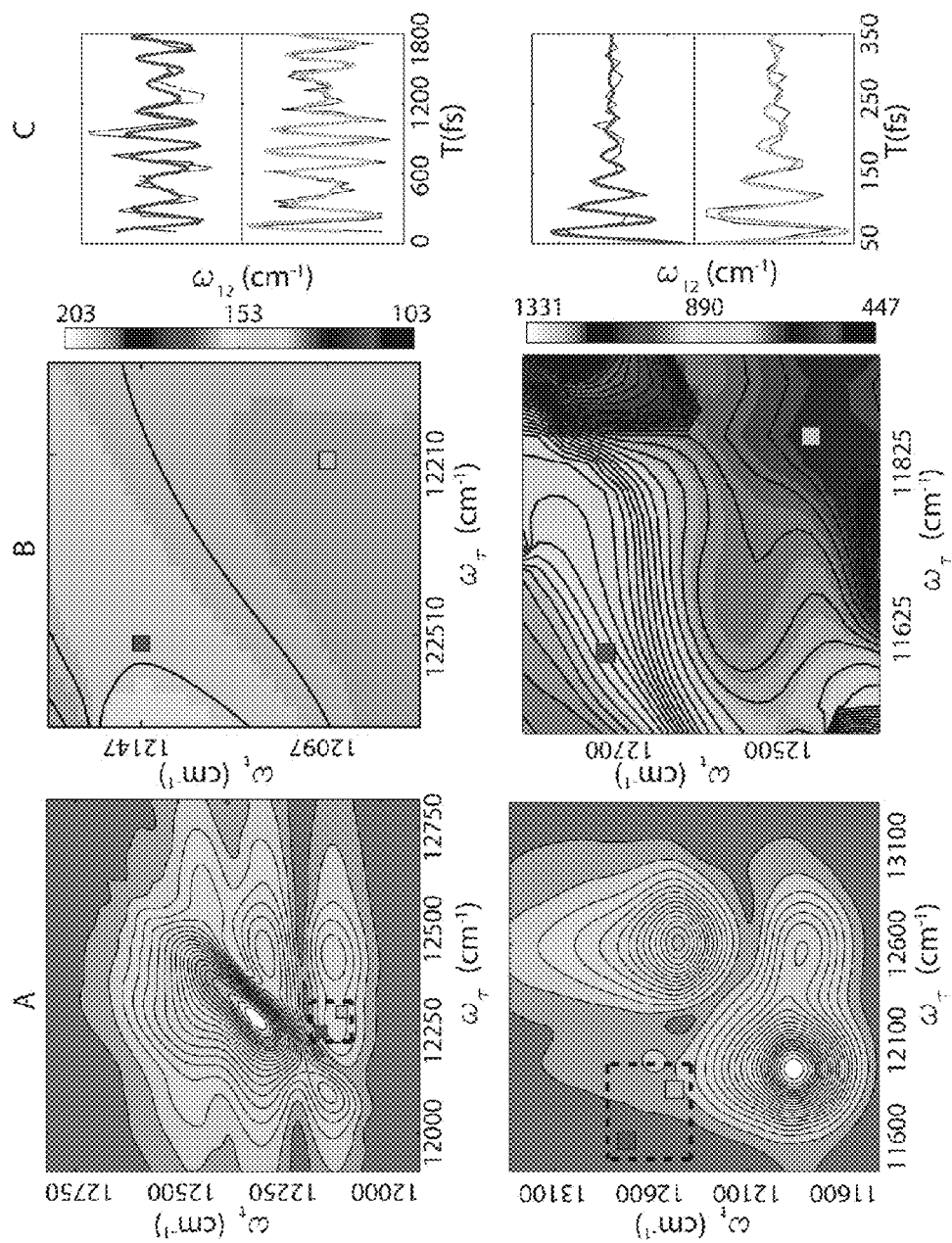
FIG. 28A illustrates representative two-dimensional spectra of FMO from *Chlorobium tepidum* taken at 77 K and a waiting time of 1870 fs (upper) and of LH2 from *Rhodobacter sphaeroides* taken at 294 K and a waiting time of 390 fs (lower). For FMO the beating signal in a 100 cm$^{-1}$×100 cm$^{-1}$ region highlighted around the exciton 1-2 cross peak is analyzed to determine the 1-2 beat frequency throughout the cross peak region. For LH2 the beating signal in a 450 cm$^{-1}$× 430 cm$^{-1}$ region highlighted near the upper B800-B850 cross peak was analyzed to determine the beat frequency throughout the cross peak.
FIG. 28B illustrates the exciton 1-2 beat frequency (upper) throughout the cross peak with contour lines drawn for every 2 cm$^{-1}$ interval, and the grayscale colorbar axis indicates the range expected for a purely inhomogeneous dephasing process. The B800-B850 beat frequency is shown throughout the cross peak (lower), contour lines are drawn for every 15 cm$^{-1}$ interval, and the grayscale colorbar axis indicates the range expected for a purely inhomogeneous dephasing process.
FIG. 28C illustrates beating signals extracted from two representative points within the region and show little changes in the beat frequency for FMO (upper) and a change in frequency for LH2 (lower).

Shown in FIG. 28 is data taken from the FMO antenna complex of green sulfur bacteria *Chlorobium tepidum* at 77 K. A 100 cm$^{-1}$×100 cm$^{-1}$ region centered around the exciton 1-2 cross peak was then investigated, using the exciton values of Hayes and Engel. (Dugan Hayes, Gregory S. Engel, Extracting the Excitonic Hamiltonian of the Fenna-Matthews-Olson Complex Using Three-Dimensional Third-Order Electronic Spectroscopy, Biophysical Journal, 100(8), 20 Apr. 2011). Slow population dynamics were first removed by fitting to two exponential decays and subtracting the fit from the signal. The residual was then fit to two exponentially decaying sinusoids corresponding to the 1-2 and 1-3 coherence and this procedure was repeated for every point within the selected region. A two-dimensional beating map can then be created, which reveals how the beating frequency changes throughout the selected region of the cross peak. Examining the 1-2 beat frequency fit reveals that over the 100 cm$^{-1}$ square the beat frequency changes by only ~9 cm$^{-1}$ which is 9% of the predicted inhomogeneous range. We therefore conclude that at 77 K, the zero-quantum coherence between excitons one and two can be characterized as predominantly homogeneously broadened.

A different pattern is evident in 2D spectra from the LH2 antenna complex from purple bacteria at ambient temperature, also shown in FIG. 28, where we have recently observed coherence maintained between the B800 and B850 rings. The coherent beating signal extracted from a cross peak above the diagonal shows strong coherence beating. Slow population dynamics were similarly removed by fitting to two exponential decay functions. The residual was then fit to a single exponentially decaying sinusoid; two representative fits are shown. In LH2, we observe a strong dependence of the beat frequency on the location within the cross peak with the beat frequency changing by ~300 cm$^{-1}$, which is 71% of the inhomogeneous theoretical range. We conclude that the inhomogeneous linewidth contributes significantly to the observed dephasing. This inhomogeneous broadening implies that, for an individual member of the ensemble, coherence persists longer than can be experimentally observed. In essence, the coherence appears artificially shortened due to inhomogeneity in the sample. Therefore, although it appears that quantum coherence disappears in 350 fs, coherence may well affect dynamics at longer timescales.

Figure 29:
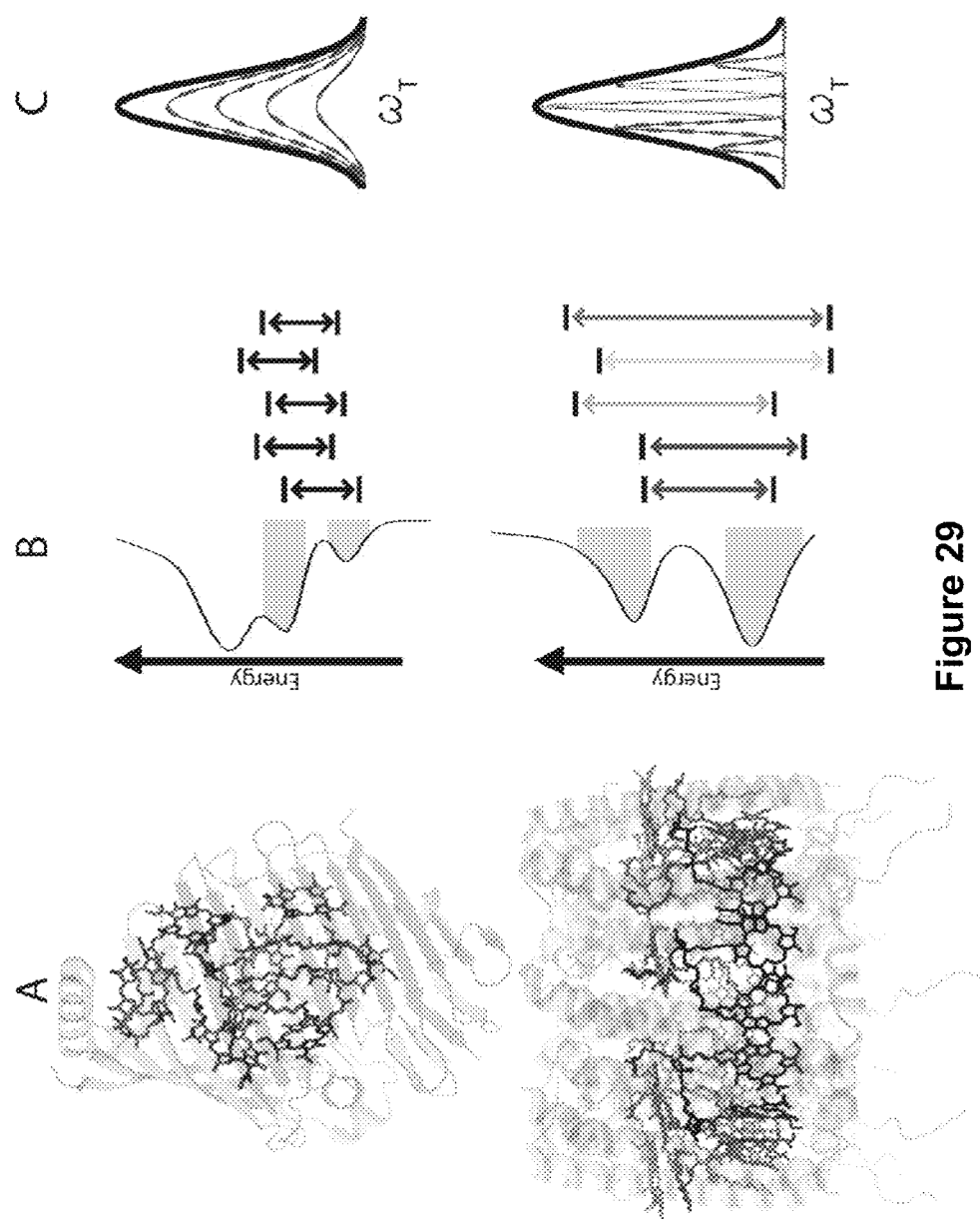
FIG. 29A illustrates Crystal structure of FMO (upper) and LH2 (Lower) to scale.
FIG. 29B illustrates for FMO, different members of the ensemble differ in exciton energy levels, but the relative gap remains constant, while for LH2 the energy gap does not remain constant. Also shown is the linear absorbance spectrum where the coherence between the highlighted regions is investigated.
FIG. 29C illustrates that the correlation of the energy gap across the ensemble leads to homogeneous broadening for FMO and inhomogeneous broadening for LH2.
Figure 30:
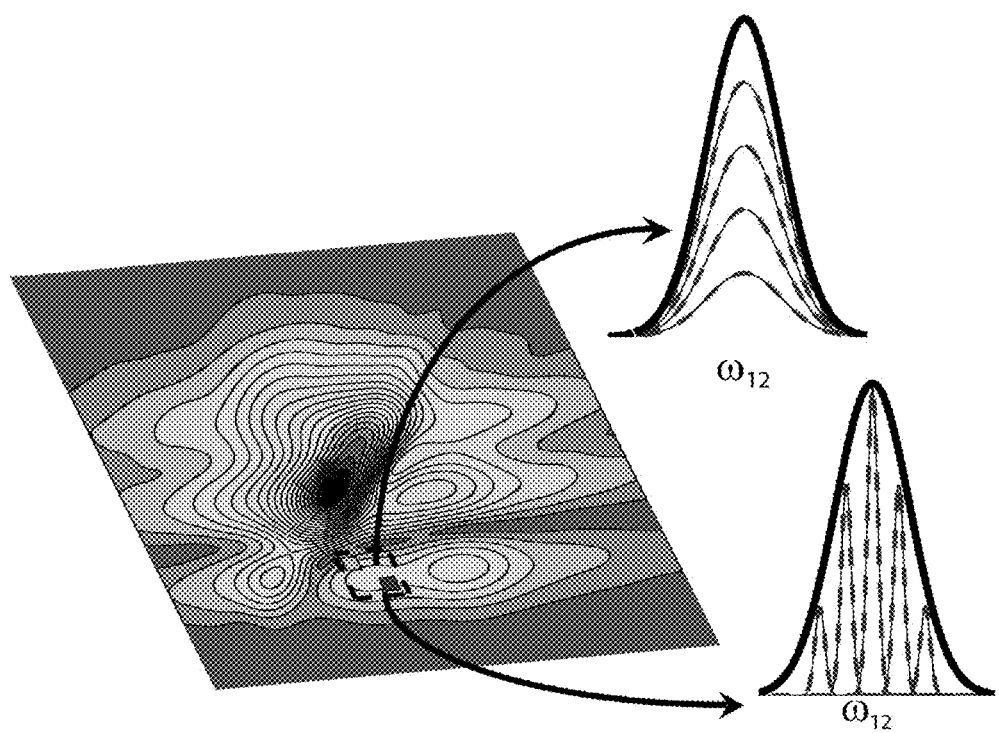
FIG. 30 illustrates homogeneous and inhomogeneous broadening.

The amount of inhomogeneous broadening in the zero-quantum manifold is a measure of the static degree of correlation between the excitonic transitions, as shown in FIG. 29. The FMO complex, in which we observe little change in the beat frequency, requires that while different members of the ensemble have different mean energy levels, the gap between them remains roughly constant across the ensemble. Thus, the states are highly correlated across the inhomogeneous ensemble. For LH2, the static disorder between the B800 and 850 states appears uncorrelated, causing the energy difference between these states to change appreciably for different members of the ensemble. We attribute this difference between FMO and LH2 to be largely due to the remarkably different molecular structure. In FMO, the average chromophore separation within a monomer is ~12 Å, while in LH2 the closest separation between the B850 and B800 chromophores is ~18 Å and can be as far as 60 Å. Further the protein environment for the B850 and B800 chromophores are quite different, varying in their degree of exposure to the solvent and differing nearby residues, while for FMO the chromophores are held within a similar environment, all being pinned between two large beta sheets. In this way, the protein environment in FMO correlates the static excitonic energy levels, causing the energy difference to remain constant.

In some aspects it is not entirely surprising that the coherence in FMO is homogeneously broadened while it is inhomogeneously broadened in LH2 if we consider the relative contributions to the single-quantum manifold. The homogeneous linewidth of FMO has previously been found to be 245 cm$^{-1}$ which is significantly greater than the inhomogeneous contribution to the linewidth of ~100 cm$^{-1}$. LH2 is in the opposite regime, where the homogenous and inhomogeneous linewidths have both been found to be on the order of ~200 cm$^{-1}$. In this respect, we conclude that the relative ratio of inhomogeneous to homogenous broadening does not vary significantly in the zero-quantum manifold from the one-exciton manifold. This notion is consistent with the idea that the signal emanates from the entire ensemble. Alternately, if the coherence beating signal should originate from some sub-ensemble, then this sub-ensemble does not vary significantly from the ensemble in this regard.

Dephasing of zero-quantum coherences sets a lower bound for the timescales of coherent quantum dynamics, and two-dimensional spectroscopy can determine if this lower bound also represents an upper bound for the coherence lifetime or not. While we can distinguish between the limiting cases, our spectroscopy currently cannot directly measure the homogeneous and inhomogeneous linewidths. It should be possible to rephase the zero-quantum coherence at short time delays, for example in a higher-order MUPPETS-like experiment, in much the same way that two-dimensional spectroscopy rephases the one-quantum coherences. This approach would permit complete characterization of the relative contributions to the dephasing of the zero-quantum coherence.

Experimental Methods

FMO isolated from *C. tepidum* in a 800 mM tris/HCL buffer was dissolved in 35:65 vol/vol glycerol water solution with 0.1% laurydimethylamine oxide detergent resulting in an optical density of 0.32 at 809 nm in a 200-μm fused silica cell. A cryostat was used to cool the sample to 77 K and 2D spectra were collected using a diffractive optics based setup utilizing the output from a regenerative amplifier resulting in an energy of 1.6 nJ/pulse with 38 fs per pulse. For each spectrum the coherence time was sampled from −500 to 500 fs with a step size of 4 fs and the waiting time was sampled in steps of 20 fs. Scatter subtraction and data analysis have been described previously.

LH2 was isolated from *Rhodobacter sphaeroides* and dissolved in a 20 mM Tris-HCl Solution with 1.3% LDAO resulting in an optical density of 0.2-0.3 in a 200-μm fused silica flow cell. The output from a regenerative amplifier was focused into argon to produce a spectrally broadened pulse spanning from ~750-850 nm that was compressed to 25 fs with chirped mirrors. The GRAPE technique was then used to acquire rephasing two-dimensional spectra with the waiting time sampled at 10 fs. Scatter subtraction and data analysis have been described previously.

Example 5

Revealing the Hidden Electronic Structure of Semiconductor Nanocrystals with Nearly-Degenerate States Quantum dots exhibit rich and complex electronic structure that makes them ideal for studying the basic physics of semiconductors in the intermediate regime between bulk materials and single atoms. The remarkable nonlinear optical properties of these nanostructures make them strong candidates for photonics applications. In another example, we experimentally probe the fine structure and ultrafast dynamics of a colloidal solution of PbS quantum dots through their nonlinear optical response despite extensive inhomogeneous spectral broadening. Using continuum excitation and detection, we observe electronic coupling between nearly-degenerate exciton states split by intervalley scattering at low exciton occupancy and a sub-100 fs Stokes shift presumably due to electron-hole exchange. At high excitation intensities, we observe multi-exciton effects and sharp absorbance bands indicative of exciton-exciton coupling. Our experiments directly probe the nonlinear optical response of nearly-degenerate quantum confined nanostructures despite extensive line broadening caused by the finite size distribution found in colloidal solutions.

Semiconductor nanocrystal quantum dots (QDs) have received considerable attention in recent years because they lie in the intermediate regime between atoms and bulk semiconductors. Despite containing hundreds or even thousands of individual atoms, these materials exhibit quantum mechanical effects such as highly tuneable photoluminescence (PL) based on the spatial confinement of excitations. In lead chalcogenide QDs, strong-confinement effects are readily observed because of the relatively large electron and hole radius (e.g. ~10 nm in PbS), compared, for example, to CdSe (ah ~1 nm and ae ~3 nm). The complex electronic structure of these materials which manifests itself in the nonlinear optical response is being explored for a host of applications from solar cells to optical gain media. However, the interaction between QDs and light is poorly understood compared to bulk semiconductors because of the complexity of the interactions among excitons and the interactions between excitons and phonons that govern the optical properties and dynamics of the system.

Understanding these interactions has proven especially difficult because the states of the QDs are often degenerate or nearly so. In the lead-salt QDs, the direct-band gap lies at four equivalent L points in the Brillouin zone, creating a 64-dimensional excitonic manifold when spin is included. At the band edge, minor deviations from spherical symmetry as well as band anisotropy may give rise to splitting of degenerate energy levels, especially for small QDs. Intervalley coupling and interband coupling as well as electron-hole Coulomb and exchange interactions offer additional splittings of the excitonic energy levels. None of these interactions, however, can be resolved in the absorption spectrum because of the large degree of inhomogeneous broadening caused primarily by the finite size distribution of the QD ensembles. At present, there exists a gap in our ability to measure the nonlinear optical properties of highly degenerate systems in which fast dynamics and electronic structure must be probed simultaneously.

We exploit ultrabroadband excitation coupled with femtosecond temporal resolution to reveal the electronic structure of ~2-3 nm colloidal PbS quantum dots. Using multidimensional optical spectroscopy, we demonstrate that beneath the seemingly featureless absorption spectrum lies a rich and complex electronic structure with dynamics on an ultrafast timescale. Additionally, we find that the energy level structure and ensuing dynamics is highly sensitive to the excitation intensities, thus necessitating a new approach for facile collection of two-dimensional electronic. Our results motivate the need for new theoretical models that incorporate realistic exciton-phonon coupling and many-body exciton interactions to explain the nonlinear optical properties of these nanostructures.

Figure 31:
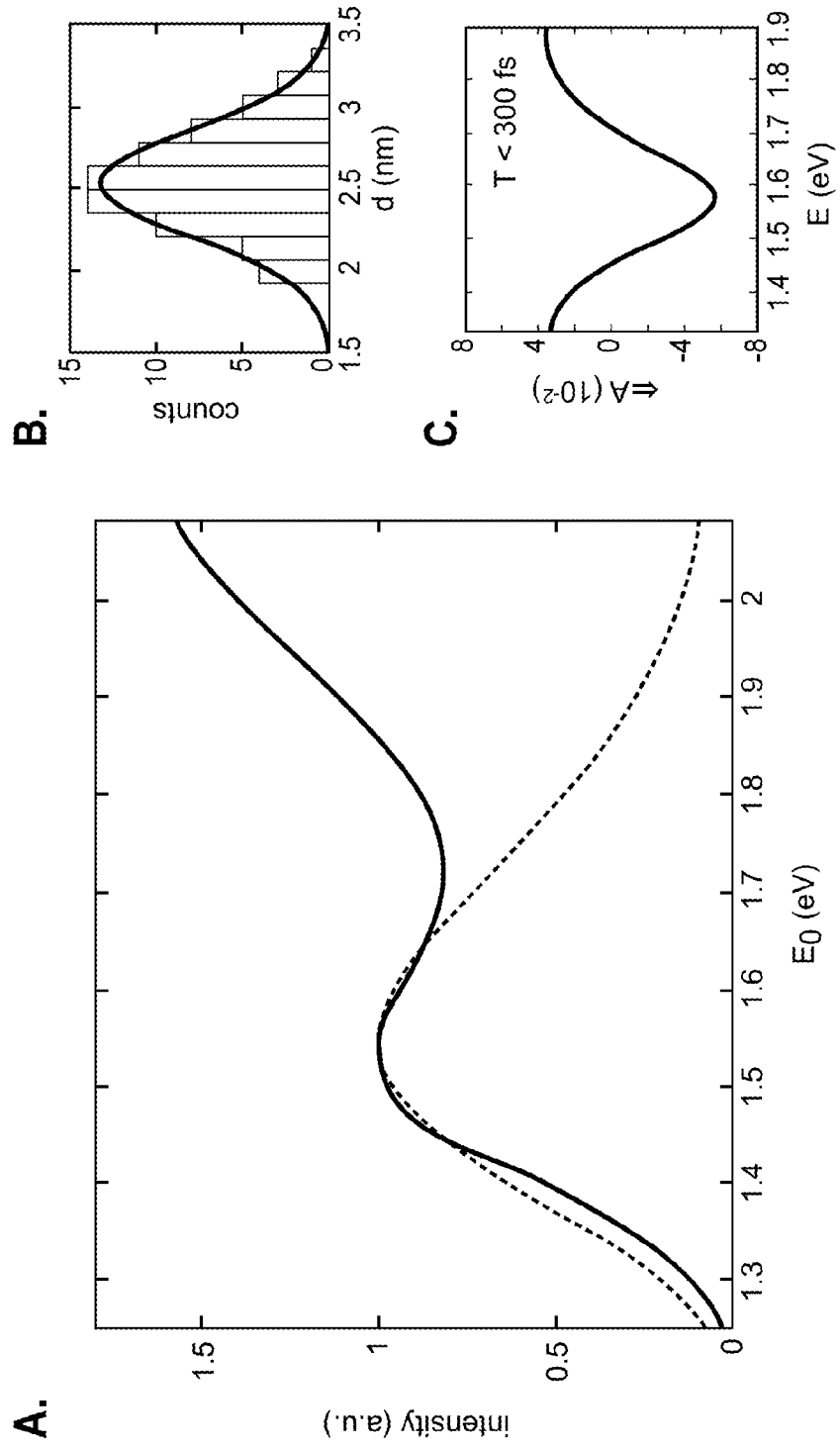
FIG. 31A illustrates a source of inhomogeneous broadening in the absorption spectrum of PbS quantum dots, particularly a linear absorption spectrum of PbS near the band gap at the 1S$_e$-1S$_h$ transition (solid curve). The dashed curve is the calculated band gap for a distribution of quantum dot sizes as determined by TEM as shown in FIG. 31B, and reveals the dominant source of inhomogeneous broadening in ensemble measurements of the sample of PbS quantum dots.
FIG. 31C illustrates a representative transient absorption spectrum upon 775 nm excitation at early population times (T<300 fs).

The linear absorption spectrum of 2-3 nm PbS quantum dots is shown in FIG. 31 alongside the distribution of sizes as determined by transmission electron microscopy (TEM). At the band edge, near 1.55 eV, only a broad absorption band is visible. The distribution of dot sizes as determined by TEM measurements (FIG. 31B) results in significant inhomogeneous broadening as predicted by the known band gap dependence on the dot size. The broad absorption spectrum acts to completely mask any splitting of the excitonic energy levels (<100 meV) or exciton-biexciton transitions (<50 meV red shift) which are significantly smaller than the >300 meV absorption line width at the band edge. Transient absorption (TA) measurements (FIG. 31C) also fail to reveal any excitonic fine structure, again due to the large degree of inhomogeneous broadening in the linear absorption, precluding the use of this technique in elucidating many of the most important features of the dynamics.

Figure 32:
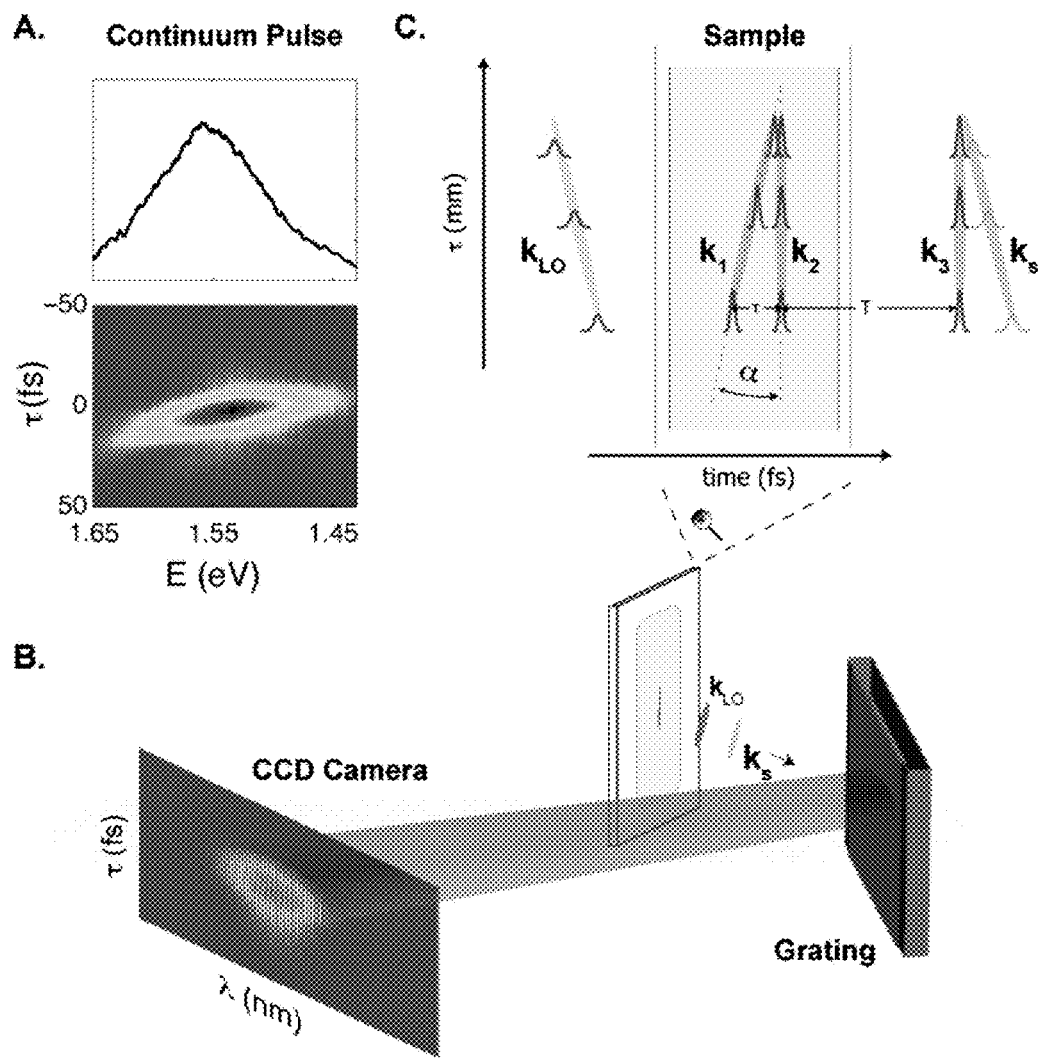
FIG. 32A illustrates ultrabroadband GRAPE spectroscopy, specifically a single-shot transient grating profile of a continuum source generated by focusing the output of a Ti:Sapphire amplifier into Argon gas showing the spectral as well as temporal characteristics of the pulse.
FIG. 32B illustrates a principle of GRAPE spectroscopy showing the emitted signal and local oscillator dispersed off a grating and imaged by a two-dimensional CCD detector.
FIG. 32C illustrates that a spatially encoded 2D photon echo pulse sequence can sample all relevant coherence times along the unfocused axis of the beam waist. The relative angle between k$_1$ and k$_2$ determines the strength of the temporal gradient.

In an example, a single-shot approach of the GRAPE techniques relaxes the phase stability requirement of conventional multidiversified techniques by 2-3 orders of magnitude, allowing us to utilize continuum generation that covers over 200 meV of bandwidth compared with <60 meV with conventional kHz amplified laser sources. Another example of the GRAPE technique is shown schematically in FIG. 32. Encoding all the requisite temporal delays (i.e. coherence times) of the 2D pulse sequence along a spatial axis of a macroscopically homogeneous sample is shown. The emitted photon echo signal is then imaged onto the slit of an imaging spectrometer and detected with a two-dimensional CCD. The resultant 2D spectrum, obtained after Fourier transformation along the temporally encoded spatial axis, achieves a 2-3 order of magnitude reduction in acquisition time at a higher SNR than is achievable with multi-scan methods (see the discussion below in this Example for details of the experimental setup). The 2D spectrum, generated by the third-order nonlinear polarization of the system links the dipole oscillation frequency during an initial coherence period, $\tau$, with that of a final rephasing period, t, for each population time, T. Peaks that appear on the diagonal provide a measure of the 'memory' of the system, while cross-peaks provide information on electronic coupling. As a function of the population time, the 2D spectrum measures system relaxation such as energy transfer or spectral diffusion originating, for example, from exciton-phonon interactions.

Figure 33:
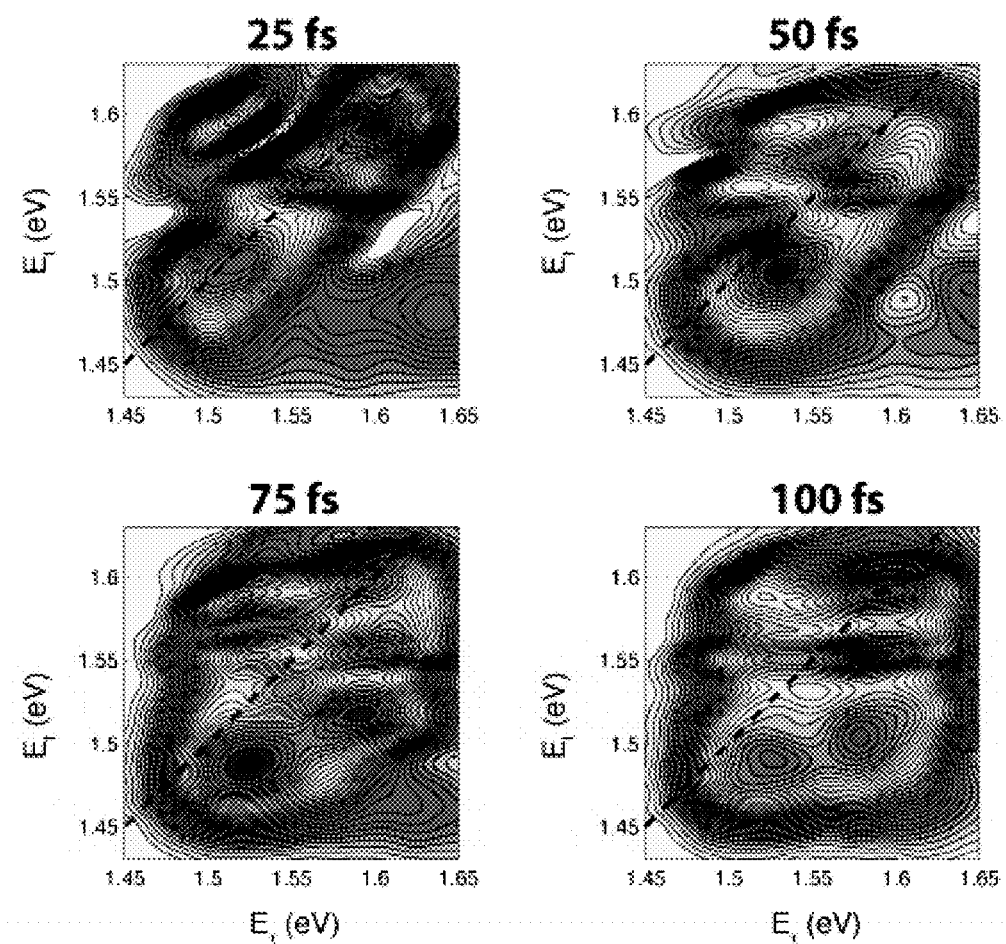
FIG. 33 illustrates ultrafast dynamics of PbS quantum dots at low excitation power. The absolute value of the rephasing part of the two-dimensional photon echo spectrum at T=25, 50, 75, and 100 fs at 40 μJ/cm$^2$ per pulse is shown. The dotted line shows the diagonal of the 2D spectrum in which absorption and stimulated emission/excited state absorption are identical. Note that the coherence frequency, E$_\tau$, recorded in the rotating frame, includes the contribution from the carrier frequency in the plot.

The sub-100 femtosecond nonlinear dynamics of PbS in pure decane (see the discussion below in this Example for details of synthesis) at low excitation intensities corresponding to a single exciton per QD per pulse (<N>pulse<1) are shown in FIG. 33. The T=0 spectrum was discarded owing to interference from the non-resonant third-order response of the solvent in the pulse overlap regime. At 25 fs, three bands are seen along the main diagonal of the spectrum with varying degrees of ultrafast relaxation dynamics as measured by the orientation of the peak shape. This observation may seem surprising given that the linear absorption spectrum and transient absorption spectrum shows only one featureless band. However, we note that absorption still occurs across the entire bandwidth of the pulse since the bands overlap across the ET direction. The observation that each band has a different rate of relaxation allows for spectral differentiation in the 2D spectrum at early times. The lowest and highest energy peaks are significantly elongated along the diagonal indicating a large degree of inhomogeneous broadening, while the central peak shows sub-25 fs spectral diffusion arising from dynamical disorder, i.e. exciton-phonon interactions that cause the transition energy to sample values within the line width. The degree to which the lowest and highest energy bands contaminate the central feature line shape appears to be minimal as its shape changes only slightly during the range of population times measured. The appearance of multiple peaks along the diagonal is consistent with recent calculations by Zunger (A. Franceschetti, J. M. An, and A. Zunger, Nano Lett 7 (2007).) that suggest intervalley splittings in small PbSe QDs on the order of 80 meV for 3 nm dots, whereas for PbS, these splittings are expected to be smaller for the same size dots. Specifically, we find that the lowest energy band undergoes a dramatic Stokes shift of about 24 meV in under 50 fs following formation of the initial exciton state. Although we could only measure dynamics up to 3 ps using an example, it appears that this peak approaches the steady-state fluorescence frequency as supported by TA measurements that show little-change up to 100 ps. Moreover, intraband relaxation to the band edge states in lead-salt nanocrystals is complete within about 1-3 ps depending on the nanocrystal size. At longer times, the transition energies of the lowest energy peak experience significant dynamic disorder as manifested by a round peak shape, which may arise from exciton-phonon interactions. The highest-energy peak becomes unresolved underneath the broad tail of the central peak at [1.57, 1.55] eV at a population time of 50 fs. By 75 fs, several prominent features appear both above and below this peak. The cross-peak appearing at [1.60, 1.55] eV is consistent with transfer of energy from the higher energy level to a lower energy band originating from intervalley splitting. Since the higher energy band is undergoing rapid relaxation, its change in dipole moment likely allows coupling to the band-edge state and facilitates ultrafast energy transfer. Another cross-peak at [1.59, 1.51] eV appears to form between the lowest energy peak that is experiencing the Stokes shift and both high energy peaks. Its position midway between the position of the two possible cross-peaks, and its movement to lower stimulated emission energy with the Stokes shifted peak supports this assignment. After 100 fs, the 2D spectrum does not show significant changes for at least 3 ps, the maximum population time measured.

Figure 34:
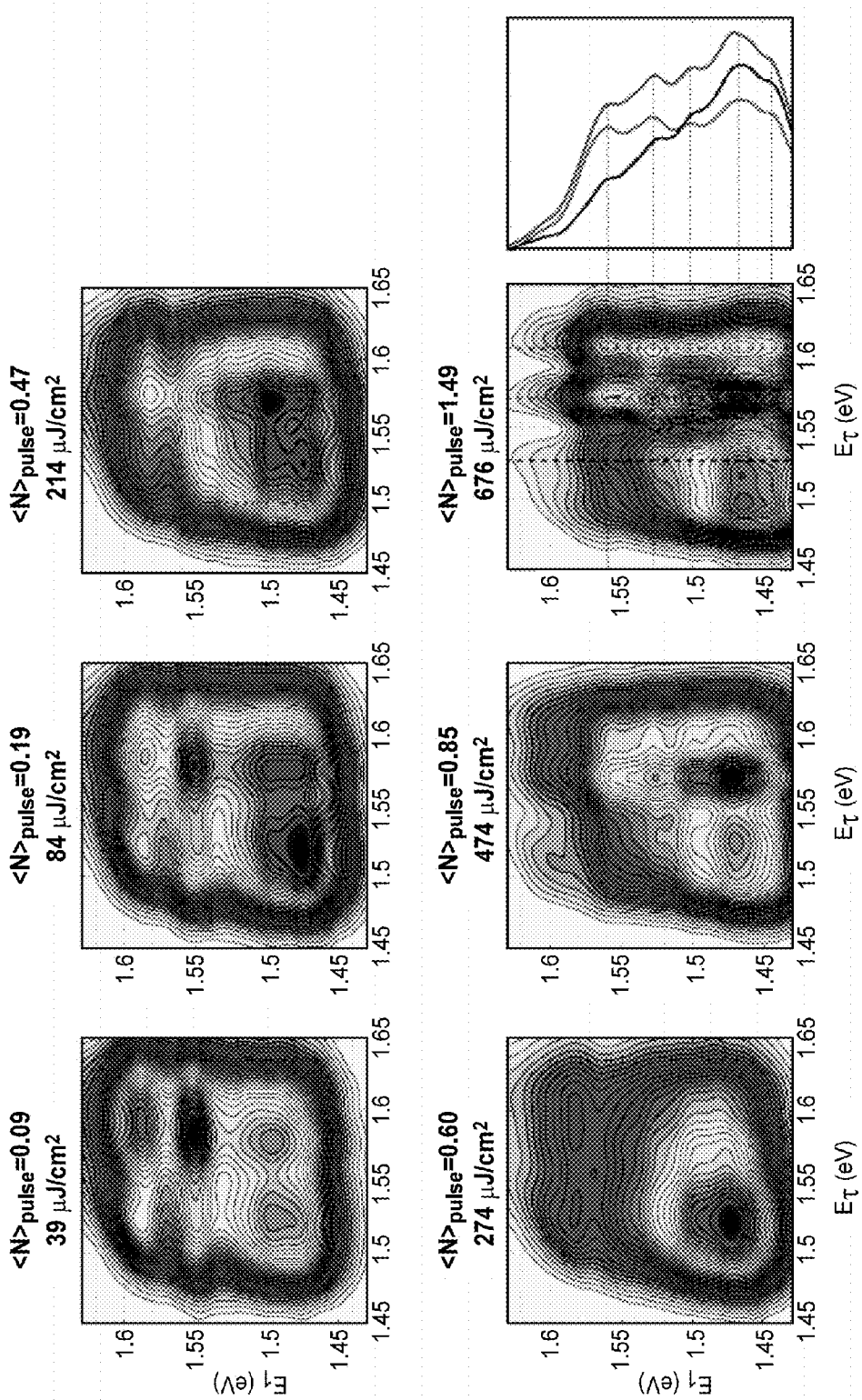
FIG. 34 illustrates the intensity-dependent 2D rephasing electronic spectra of PbS quantum dots at T=200 fs. Distinct spectral changes are observed as a function of mean exciton occupancy (<N>). At low intensities, the 2D spectrum reveals an excitonic fine structure and electronic coupling between distinct states. At higher intensities, distinct absorption bands are revealed indicating exciton-exciton interactions. Cuts through different absorption bands at <N>=1.49 are shown to the right of the 2D spectrum. <N>$_{pulse}$ was determined by taking into account the absorption cross-section per dot and the bandwidth of the continuum-generated excitation pulses.

The electronic structure of quantum dots is highly sensitive to the number of excitons per particle because the confined nature of the nanostructure results in strong Coulomb interactions between them. FIG. 34 shows 2D spectra at a population time of 200 fs for different excitation intensities from <N>pulse=0.08 to 1.5. We see significant qualitative differences as a function of excitation intensities. The spectra appear to evolve in a quasi-continuous fashion from sharp stimulated emission features at low excitation probability to well-resolved absorptive bands at high exciton densities. At low pulse powers, the 2D spectra consist of several well-resolved peaks as discussed earlier. The narrow stimulated emission bands are a result of relatively long-lived single-quantum coherences experienced by the lone exciton. As the excitation density is increased, the band-edge peak begins to disappear and, remarkably, by <N>=0.60, almost no absorption is seen except for a broad feature at low energy. As the pulse power is increased further towards <N>=1.49, new absorption bands clearly emerge. The data would suggest that the transition frequency of one exciton experiences perturbations arising from the field created by another, separate exciton, causing an energy splitting during the coherence period of the 2D pulse sequence. Coulomb interactions between excitons in PbS are expected to be on the order of meV to tens of meV depending on particle size, within the range of the observed splitting in the absorption band of 36 meV. We also observe that structure exists along the emission axis, showing four or five peaks spaced apart by 22-35 meV. The two absorption bands near 1.57 eV and 1.61 eV show a nearly identical structure, again consistent with the splitting of a degenerate exciton state. The emission is significantly broadened from rapid decoherence (<50 fs) during the rephasing time compared to the low exciton density data.

In conclusion, we demonstrate that beneath the broad, featureless absorption spectrum of PbS nanostructures lies a rich electronic structure. In qualitative agreement with a large body of theoretical work on the electronic structure of quantum confined nanostructures, the fine structure of both excitons and biexcitons governs the system nonlinear optical response. Until now, the fine structure of nearly-degenerate systems with severe inhomogeneous broadening has proven difficult to observe experimentally. By using continuum generation with single-shot 2D photon echo spectroscopy, we are able to probe a sufficiently broad spectral range to capture the exciton dynamics without losing the requisite temporal resolution. The use of a single shot 2D method allows us to capture snapshots of the electronic structure at well-defined mean exciton occupancy for the first time. While we cannot assign all the features in the 2D spectrum because of the complexity of the electronic structure of PbS quantum dots, we believe that this data will motivate and guide new theoretical efforts towards this goal.

In an example, the output of the regenerative amplifier (40 fs, 5 kHz, 800 nm) is focused into a flowing stream of Argon gas to generate a high-power continuum pulse. Using broadband dielectric mirrors, only the 750-870 nm (1.42-1.65 eV) region of the white light spectrum is selected. After collimation, the pulse is compressed by two pairs of chirped mirrors (total GVD is −360 fs2). Single-shot non-resonant transient grating measurements off an optical flat estimate the pulse duration at fewer than 40 fs with a slight degree of positive chirp. Chirp affects the line shapes of the 2D spectrum only slightly for population times less than the pulse duration. To minimize the effects of chirp during the coherence time, we discarded the first 25 fs of the spatially encoded τ points.

After compression, the ultrabroadband pulse is split by a 50:50 beam splitter, and the delay between the two beams, corresponding to the population time, T, is controlled by a motorized translation stage. An uncoated wedged optic further split each pulse into a pair by the use of Fresnel reflections from the front and back surfaces of the optic. These four beams are then incident on a mirror assembly to form a distorted boxcar geometry. The LO beam is attenuated by approximately three orders of magnitude and adjusted to arrive ~1.5 ps prior to the signal. After focusing in the horizontal direction by a cylindrical lens, the four beams are vertically aligned such that their wavefronts overlap at the sample generating the spatially encoded temporal delays and permitting acquisition of the echo signal in the rotating frame. The timings between pulses were determined using spectral interferometry as described by Joffre et al. An imaging spectrometer resolves the resulting heterodyned signal onto a 2048×2048 pixel thermoelectrically cooled CCD camera. The resulting interference pattern allows the determination of the phase and magnitude of the third-order rephasing signal. Our data analysis uses a modified procedure of that used for multi-scan two-dimensional spectroscopy as described in detail by Brixner et al. However, without adequate pump-probe data or other external reference, we cannot assign an absolute phase to the 2D spectrum. Due to the sensitivity of the third-order response to the laser fluence, we can only present absolute value spectra with confidence. We should note that there is an inherent uncertainty in the absorption frequency axis using GRAPE spectroscopy because tilting the wave fronts to create the pulse delays results in phase evolution in the rotating frame, meaning that the frequencies appearing during the coherence period are measured relative to the carrier frequency of the excitation. While, the carrier frequency is straightforward to measure for well-characterized pulses, it has proven difficult to measure for continuum pulses. Nonetheless, we have estimated its value from other measurements on well-characterized systems (e.g. IR144 in methanol) with a negligible or known Stokes shift and assumed little to no change between measurements.

Transient absorption measurements were performed using a 2 kHz amplified Ti:Sapphire laser with a white light probe pulse produced in a 2 mm-thick sapphire plate and a tunable pump pulse generated using an optical parametric amplifier. Data was collected from −500 fs to 200 ps and probed from about 1.3 eV to 1.9 eV across a wide range of pump fluencies (0.08-1.36 mJ/cm2) and energies (1.46 to 1.60 eV).

Sample Preparation. 2-3 nm PbS nanocrystals were synthesized by dissolving 0.452 g of lead oxide (99.999%, Aldrich) in a mixture of 1.25 mL oleic acid (90%, Aldrich) and 20 mL of 1-octadecene (90%, Aldrich) in a 100 mL 3-neck flask and degassing at 105° C. under vacuum for 1 hour. The solution was then heated to 135° C. under nitrogen atmosphere and 0.21 mL of hexamethyldisilathiane (TMS2S, Aldrich) dissolved in 10 mL of dried 1-octadecene was injected into the reaction mixture. The solution temperature was decreased to 120° C. and the reaction continued for 3 min before quenching by rapid cooling to room temperature. PbS nanocrystals were isolated by rinsing with hexane and precipitating with ethanol followed by centrifugation. Washing was repeated twice and the nanocrystals were stored in chloroform in a −20° C. freezer. The optical density of the sample in a 200 μm cuvette was approximately 0.12 at 1.55 eV.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method for forming a two-dimensional electronic spectrum of a sample, the method comprising:
   illuminating a line within a homogeneous portion of the sample with four laser pulses, wherein each of the four laser pulses is directed to illuminate the line upon incidence;
   tilting the relevant wavefronts of at least some of the four laser pulses, such that along the entire line the difference in the arrival times between the first and second laser pulses varies as a function of the position on the line and the difference in the arrival times between the third and fourth laser pulses is constant along the entire line; and
   performing a spectroscopic analysis of a resulting pulsed output signal from the illuminated line.

2. The method of claim 1, wherein at least one position on the line the second laser pulse arrives before the third laser pulse and wherein at least one other position on the line the second laser pulse arrives after the third laser pulse.

3. The method of claim 1, wherein along the entire line the first laser pulse arrives before all of the second, third and fourth laser pulses.

4. The method of claim 1, wherein along the entire line the first laser pulse arrives after all of the second, third and fourth laser pulses.

5. The method of claim 1, wherein along the entire line the fourth laser pulse arrives after both the second and the third laser pulses.

6. A method for forming a two-dimensional electronic spectrum of a sample, the method comprising:
   illuminating a line within a homogeneous portion of the sample with four laser pulses, wherein each of the four laser pulses is directed to illuminate the line upon incidence;
   tilting the relevant wavefronts of at least some of the four laser pulses, such that along the entire line the interval between the arrival of the first laser pulse and the arrival of the third laser pulse varies, along the entire line the interval between the arrival of the second laser pulse and the arrival of the third laser pulse varies, and along the entire line the interval between the arrival of the third laser pulse and the arrival of the fourth laser pulse is constant; and
   performing a spectroscopic analysis of a resulting pulsed output signal from the illuminated line.

7. The method of claim 6, wherein along the entire line, the interval between the arrival of the first laser pulse and the arrival of the third laser pulse is greater than the interval between the arrival of the second laser pulse and the arrival of the third laser pulse.

8. The method of claim 6, wherein along the entire line, the first laser pulse arrives before the second, third and fourth laser pulses.

9. The method of claim 6, wherein along the entire line, the fourth laser pulse arrives after the first, second and third laser pulses.

10. The method of claim 6, wherein at certain positions along the line, the second laser pulse arrives before the third laser pulse, and at other positions along the line, the second laser pulse arrives after the third laser pulse.

11. The method of claim 6, wherein performing a spectroscopic analysis comprises filtering out the first, second and third laser pulses, and collecting and binning the pulsed output signal along the line using a grating and spectrometer.

* * * * *